(12) United States Patent
Hay

(10) Patent No.: US 9,536,236 B2
(45) Date of Patent: Jan. 3, 2017

(54) COMPUTER-CONTROLLED, UNATTENDED, AUTOMATED CHECKOUT STORE OUTLET AND RELATED METHOD

(71) Applicant: Ronny Hay, Encino, CA (US)

(72) Inventor: Ronny Hay, Encino, CA (US)

(*) Notice: Subject to any disclaimer, the term of this patent is extended or adjusted under 35 U.S.C. 154(b) by 0 days.

(21) Appl. No.: 14/321,573

(22) Filed: Jul. 1, 2014

(65) Prior Publication Data

US 2014/0316916 A1    Oct. 23, 2014

Related U.S. Application Data

(63) Continuation-in-part of application No. 14/247,739, filed on Apr. 8, 2014, which is a continuation-in-part of application No. 13/912,006, filed on Jun. 6, 2013.

(60) Provisional application No. 61/809,756, filed on Apr. 8, 2013, provisional application No. 61/657,566, filed on Jun. 8, 2012.

(51) Int. Cl.
| | |
|---|---|
| *G06Q 20/18* | (2012.01) |
| *G06Q 20/20* | (2012.01) |
| *A47F 9/04* | (2006.01) |
| *G07G 1/00* | (2006.01) |
| *G07F 11/00* | (2006.01) |
| *G06F 7/00* | (2006.01) |

(52) U.S. Cl.
CPC .............. *G06Q 20/18* (2013.01); *A47F 9/048* (2013.01); *G06Q 20/20* (2013.01); *G06Q 20/204* (2013.01); *G07F 11/002* (2013.01); *G07G 1/0036* (2013.01)

(58) Field of Classification Search
USPC .......................................................... 705/17
See application file for complete search history.

(56) References Cited

U.S. PATENT DOCUMENTS

| | | | |
|---|---|---|---|
| 2,905,926 | A | 9/1959 | Aid |
| 3,716,697 | A | 2/1973 | Weir |
| 4,317,604 | A | 3/1982 | Krakauer |
| 4,573,606 | A | 3/1986 | Lewis et al. |
| 4,866,661 | A | 9/1989 | de Prins |
| 5,339,250 | A | 8/1994 | Durbin |
| 5,478,989 | A | 12/1995 | Shepley |
| 5,703,785 | A | 12/1997 | Bluemel et al. |
| 5,728,999 | A | 3/1998 | Teicher |
| 5,905,653 | A | 5/1999 | Higham et al. |
| 6,039,467 | A | 3/2000 | Holmes |
| 6,102,162 | A | 8/2000 | Teicher |
| 6,131,399 | A | 10/2000 | Hall |
| 6,409,027 | B1 | 6/2002 | Chang et al. |
| 6,556,889 | B2 | 4/2003 | Rudick et al. |

(Continued)

FOREIGN PATENT DOCUMENTS

| | | | |
|---|---|---|---|
| JP | 2002032865 A | 1/2002 | |
| JP | 2007087290 A | 4/2007 | |

*Primary Examiner* — Garcia Ade
(74) *Attorney, Agent, or Firm* — Fulwider Patton LLP; Jacob S. Zodieru

(57) ABSTRACT

A computer-controlled, automated checkout store outlet comprises at least one bay. A normally locked door is associated with each bay, and provides access to items within the bay by customers approved by a computer of the automated store outlet. At least one tray is disposed within at least one bay, and adapted to hold items to be stocked by the bay. A sensor system is configured to detect the removal of an item from the bay and identify the removed item, such as when a customer is removing the item for purchase.

44 Claims, 27 Drawing Sheets

(56) References Cited

U.S. PATENT DOCUMENTS

| | | |
|---|---|---|
| 6,640,159 B2 | 10/2003 | Holmes et al. |
| 6,848,114 B2 | 1/2005 | Mueller et al. |
| 7,006,893 B2 | 2/2006 | Hart et al. |
| 8,028,822 B2 | 10/2011 | Braunstein |
| 8,140,187 B2 | 3/2012 | Campbell et al. |
| 8,191,719 B2 | 6/2012 | Van Ooyen et al. |
| 8,482,429 B2 | 7/2013 | Aguren |
| 2002/0186133 A1 | 12/2002 | Loof |
| 2002/190845 A1 | 12/2002 | Moore |
| 2003/0197061 A1 | 10/2003 | Din |
| 2005/0067426 A1 | 3/2005 | Holdway et al. |
| 2006/0164247 A1 | 7/2006 | Overhultz et al. |
| 2007/0185615 A1 | 8/2007 | Bossi et al. |
| 2008/0188980 A1* | 8/2008 | Home .................... G07F 17/12 700/244 |
| 2009/0306820 A1 | 12/2009 | Simmons et al. |
| 2010/0138037 A1* | 6/2010 | Adelberg ............. G06Q 10/087 700/241 |
| 2010/0262282 A1* | 10/2010 | Segal .................... G06Q 30/02 700/241 |
| 2012/0004769 A1 | 1/2012 | Hallenbeck et al. |
| 2012/0029690 A1 | 2/2012 | Bruck et al. |
| 2012/0029691 A1 | 2/2012 | Mockus et al. |
| 2012/0130535 A1 | 5/2012 | Kropp et al. |
| 2013/0030566 A1 | 1/2013 | Shavelsky et al. |
| 2013/0035787 A1 | 2/2013 | Canter |
| 2014/0025391 A1 | 1/2014 | Knowles et al. |

\* cited by examiner

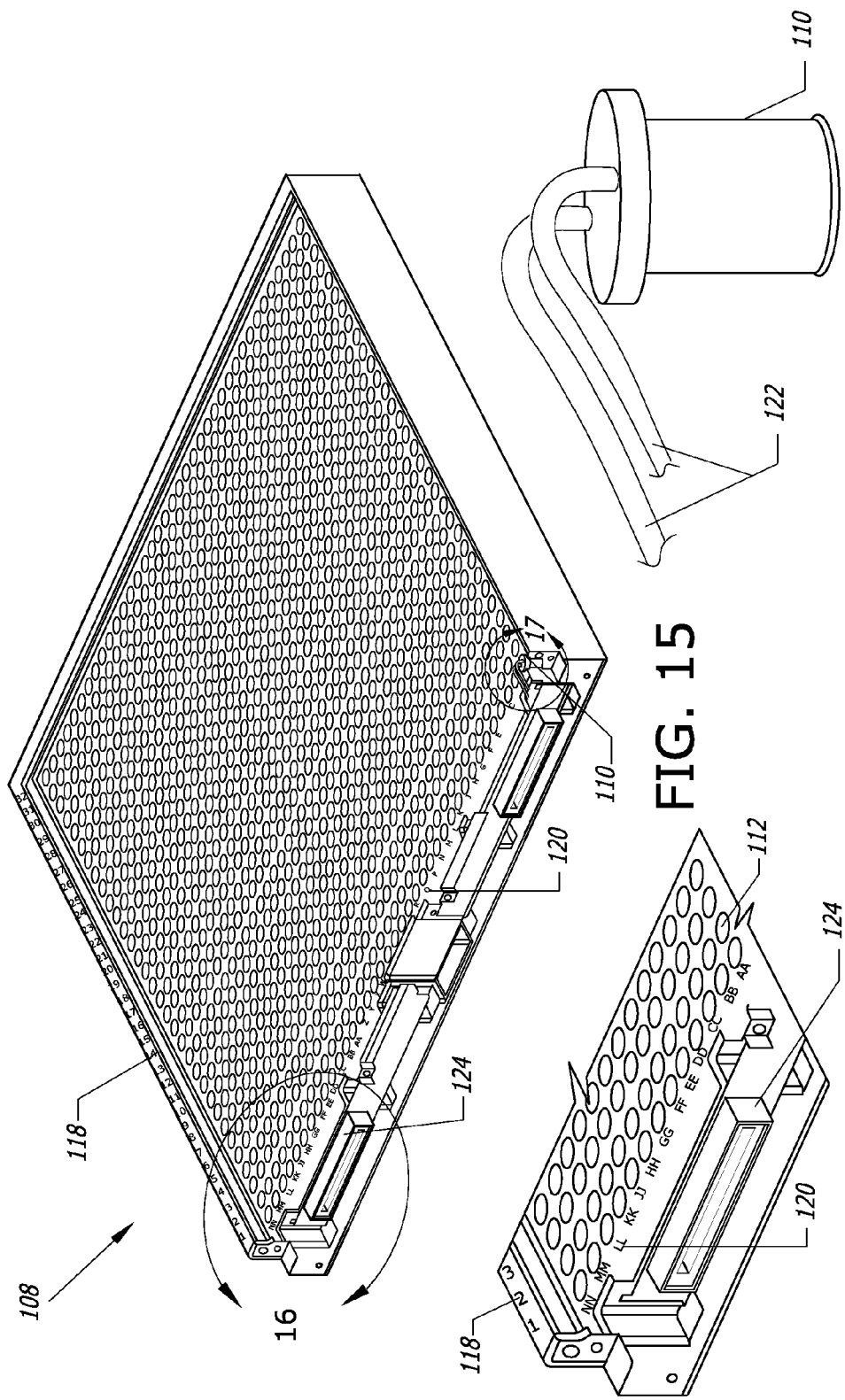

COMPUTER-CONTROLLED, UNATTENDED, AUTOMATED CHECKOUT STORE OUTLET AND RELATED METHOD

RELATED APPLICATION

This application is a continuation-in-part application of U.S. application Ser. No. 14/247,739, filed Apr. 8, 2014, which is a continuation-in-part application of U.S. application Ser. No. 13/912,006, filed Jun. 6, 2013, which claims priority to U.S. Provisional Application Ser. No. 61/809,756, filed Apr. 8, 2013 and U.S. Provisional Application Ser. No. 61/657,566, filed Jun. 8, 2012.

BACKGROUND OF THE INVENTION

The present invention generally relates to an unattended, automated checkout store outlet, and its related method. This automated store outlet system can be used as an unattended automated checkout kiosk or micro-market, as well as any other unattended automated checkout mini-market or neighborhood store, where consumer goods are displayed behind closed glass doors and are a sold "off the shelf".

Typically, kiosks or micro-markets as well as mini-markets or neighborhood convenience stores require the presence of clerks and other employees and may be limited to specific hours of operation. Such requirements and limitations increase the cost of operation and the limited hours of operation affect the actual revenue.

Some recent unattended micro-markets are operated within a company's break-room and are offering food and beverages "off-the-shelf" using the honor system. In such micro-markets, consumers can pick up items off the open and unsecured shelves and then the consumers are required to scan the barcodes of each item at the barcode scanner located on the local automated computer kiosk. Such open shelf micro-markets are limited to only highly secured locations and are subject to losses due to theft. Therefore, such micro-markets must be located only within the company's break-room or in such areas where the identity of the customers are known and the potential theft is mitigated.

Additionally, this invention can also be an alternative to common vending machines that are currently used to vend products which are stored within the machine. Typically, vending machines are coin-operated, although many vending machines accept varying denominations of paper currency (such as a one-dollar or a five-dollar bill), and some vending machines now accept credit or debit cards. Vending machines are often placed where people gather, pass by, or wait, such as public buildings and transportation hubs including subways and airports, hospitals, schools, etc.

In the common vending machine, after the appropriate number of coins or bill payment is made, and the good selected, the good is typically dropped or delivered into a built-in bin which is accessible to the customer for retrieving the product. Such vending machines are very limited to a low number of products and to a very small selection. Vending machines are typically associated with selling high-sugar, low-nutrient snacks and drinks, such as candy bars, potato chips and soft drinks. Furthermore, the ordinary metal square vending machine, in most cases, is not appealing and does not have an attractive appearance. Nowadays the bad reputation and the negative social stigma of vending machines are counted as some of the main reason that a large percentage of consumers are avoiding the use of conventional vending machines. Furthermore, vending machines are not allowing consumers to examine or return the items into the machine and reverse the sale. The sale process is unfriendly and upon vending the product each sale becomes final.

Traditional vending machines also do not have many security measures, other than tamper-proofing. Thus, pranksters and thieves can damage the vending machine, and in some cases remove the money deposited within the vending machine. There is no live twenty-four hour surveillance of such vending machines.

Yet another drawback of company micro-markets and traditional vending machines is that there is no real time communication between the consumer and the operator of the micro-market or the vending machine, should problems or questions arise. The customer can attempt to call the operator of the micro-market or the vending machine, if the contact information of the operator is even posted. Otherwise, more typically, the customer is unable to contact such operators during such visits to the micro-market or the use of the vending machine.

Therefore, under the current situation and in most cases, if an individual desires to have something to eat or drink which is more substantial or healthier than a candy bar, soda, etc., or desires to buy any personal, toiletries or conventional items, that individual must either find and purchase such products at a grocery store, a restaurant or other type of convenience stores. In other cases, there are gift shops, coffee shops or the like which may be placed in the lobby of hotels or buildings or within the waiting area of an airport which will offer such products. However, these are typically only open during limited hours of each day and require one or more people to be present to handle the purchases from the consuming public.

Accordingly, there is a continuing need for automated checkout store outlets which feature an automated "off the shelf" selling method and system which is appealing and attractive in appearance and offers a wide selection of products. What is also needed is an unattended automated checkout store outlet which has security measures so as to prevent theft, tampering and vandalism. What is also needed is such an automated system which can offer better and more nutritious food than most vending machines without restriction to location or hours of operation. The present invention fulfills these needs, and provides other related advantages.

SUMMARY OF THE INVENTION

The present invention is directed to an unattended, automated checkout store outlet and a method for granting access to and tracking purchases from the computer-controlled, automated store outlet. The computer-controlled, automated store outlet of the present invention generally comprises a plurality of bays for holding items for purchase. A normally locked door is associated with each bay, and provides access to items within the bay by customers that have been approved by a computer of the automated store outlet. A lock is associated with each bay door. The lock is normally locked when the bay door is closed, and selectively unlocked by a computer of the automated store outlet when a customer or technician is given approval to open the door and access the bay. An access unit, having multi-scanning functionality, is associated with each bay door which is configured to receive customer identification for determination of approval of access to the bay. At least one tray is disposed within the one or more bays, the tray having a plurality of compartments adapted to hold the items. A sensor system is configured to detect the removal of an item from the bay and to identify the removed item.

The tray may comprise a peripheral wall having a plurality of spaced apart slots, a platform, and at least one divider removably insertable into the slots of the wall and over the platform, creating item compartments. The at least one divider comprises a combination of interconnectable horizontal and vertical dividers. At least a portion of the horizontal or vertical dividers includes slots formed therein for receiving a corresponding vertical or horizontal divider, such that the interconnected horizontal and vertical dividers form item compartments. The at least one divider may comprise a plurality of generally spaced apart and parallel dividers, having a push mechanism disposed in a space therebetween. The push mechanism is biased towards a front wall of the tray.

Alternatively, the tray may include prefabricated item compartments. The tray may comprise a sheet of material having a plurality of item compartments molded therein. The molded compartments generally conform to at least a portion of the item to be held within the compartment. At least a portion of the plurality of item compartments molded into the sheet of material may vary in dimension and configuration. A sensor may be associated with each compartment in such a way to ensure that the item covers the sensor when placed in the compartment. The sheet of material may be opaque, and include either an aperture or a non-opaque area in each compartment generally aligned with the sensor of the sensor system.

The sensor system may comprise a sensor array disposed relative to the tray such that a sensor is associated with each item compartment. In one form, the sensor array comprises a sensor rack disposed below the platform or tray and having a grid of apertures each configured to receive a sensor therein a location relative to each compartment of the tray. The sensor may comprise a photosensor which is activated when an item is removed from a compartment of the tray.

The sensor system may alternatively comprise a RFID (radio frequency identification device) tag attached to each item and a RFID reader or receiver configured to determine the location or proximity of the tag relative to the reader or receiver. Removal of items may also be detected by an image recognition system incorporating cameras which either detect the removal of an item or compare photographs of trays to detect removed items, such as by determining if the product is on or off the tray.

In one embodiment, a plurality of light emitting LEDs is disposed above the tray to illuminate the items on the tray and activate sensors associated with each compartment of the tray as an item is removed from that compartment. For example, the light emitting LEDs may be disposed on a bottom portion of the tray immediately above another tray. A polarized sheet of material may be used to permit light to enter light sensors below the items from only a predetermined range of angles. A portion of the LEDs disposed above the tray may comprise infrared LEDs. The sensors would comprise infrared light sensors. A dual-sided PCB (printed circuit board) board having infrared sensors on one surface thereof and infrared LED lights on an opposite surface thereof may be used. The infrared LEDs may be pulse illuminated, so as to illuminate and turn off in rapid succession, and the sensor system may be configured to correlate the detection of the pulsed illumination of the infrared LEDs to the removal of an item from a tray compartment to avoid false readings.

The automated store outlet typically may include a computerized system local to the automated store outlet that manages the automated store outlet, including the access units, locks, and sensor system of the automated store outlet and other functions of the ASO.

The automated store outlet includes an electronic display for displaying an electronic shopping cart of each customer representing the items removed from the one or more bays by the customer. Typically, there is an electronic display associated with each bay for displaying the electronic shopping cart of the customer accessing that bay, the shopping cart being continually updated and traveling with the customer as the customer moves from bay to bay during the shopping event.

The access unit includes a manual code entry device and/or a reader for reading or scanning credit or debit cards, machine-generated codes, such as barcodes and QR codes, RFID signals, NFC signals, and/or a biometric scanner for receiving customer identification. The automated store outlet may also include a motion detector, and a device that enables live communication between a customer and customer service representative. The lock may comprise a strike plate having a switch, wherein activation of the switch upon closing the door causes the door to be locked.

A device is associated with each bay that conveys audible or visible notifications or warnings to the customer that has accessed the bay. A camera may be associated with each bay for taking images of the customer while the customer is accessing the bay. Such images may be displayed on a display of the device and/or another display of the automated store outlet. Means for communicating between the customer and the customer service representative is also provided. A remote viewing system may permit viewing of the automated store outlet by remote customer service.

A camera may be disposed above each tray of each bay, so as to collect images of the customer's hand while removing items from the tray. A camera disposed above each tray of the bay may also be used as part of the sensor system, wherein an image recognition system detects the presence or removal of an item from the tray by comparing photographic images.

In accordance with the method of the present invention, a customer inputs customer identification into a door access unit associated with the bay of the automated store outlet. The door of the bay associated with the door access unit is unlocked after verifying the customer identification so as to provide access to the bay by the customer. Payment information of the customer may also be verified. The identity of each item removed from the bay by the customer is detected, and the removed items are added to an electronic shopping cart for the customer, which is displayed on a computer-controlled display unit of the automated store outlet. Once the bay door is closed, it is automatically locked. The purchase transaction of the customer is closed by charging the customer for the items in the customer's electronic shopping cart when the customer closes the transaction or after a predetermined period of inactivity by the customer.

The automated store outlet may include a check-in station for customer identification, payment, and the like. The one or more bays of the automated store outlet are normally locked to prevent access to the items within the bay. Typically, items are arranged within compartments of each tray. A plurality of sensors are arranged to correspond with the items held by the trays. The tray and item placement in each bay may be configured from a remote location. Use of an array of fixed sensors may be used, or sensors may be used which are manually placed in relation to each tray compartment and/or item within the bay.

The automated store outlet of the present invention may also include a beverage dispenser for dispensing drinks. A beverage cup or a component of a beverage may be provided within a bay for purchase. A beverage dispenser dispenses the beverage into the purchased cup, or creates the beverage using the beverage component. Alternatively, the beverage dispenser may only be activated by the computerized system once a beverage cup is removed from a tray or bay and purchased. An example of a beverage component comprises a K-Cup® used by a coffee maker and dispenser. The operation of the beverage dispenser may be selectively permitted by the automated store outlet, such as after a purchase, after proper customer identification and authorization, and the like.

Customer identification is input into the check-in station of the automated store outlet, such as inputting at least one of a customer identification code and/or password, customer's unique images or QR code image or the like, swiping an electronically readable card or electronic device, or providing biometric information of the customer, such as facial recognition, fingerprint, eye scan or the like. The customer identification is verified by the system.

Customer payment information is also input into the check-in station of the automated store outlet, and the customer payment information is verified by the system. The customer payment information may comprise inputting information related to previously created customer automated store outlet dedicated account, credit or debit card account information, or depositing cash into a cash receiving device of the automated store outlet. The customer may transfer funds to the customer's automated store dedicated account online or using the check-in station of the automated store outlet as well.

In accordance with the invention, the customer is qualified by the system to remove items from the at least one bay after first determining that the customer payment information is of a sufficient level to purchase items from the at least one bay at the automated store outlet.

After the customer has been identified, the customer's payment information verified, and the customer qualified, the customer is then allowed to shop at the automated store outlet. This requires unlocking a door to provide access to a bay. Typically, this requires that the customer provide identification information to an electronic unit associated with a lock at each bay door. This may be by means of an electronic unit which performs multiple scanning and reading and display functions simultaneously, including a motion detector, an electronic display screen, a keypad, two-way audio visual communication means, RFID reader, electronic code image reader, and a biometric scanner. The customer identification is verified before unlocking the door. Once the door is unlocked and opened, the system tracks the customer's activity at that bay.

It will also be understood that the customer identification and payment may be performed in other ways as well. For example, instead of using the check-in station, the customer may directly approach and use the door access unit associated with the bay of the automated store outlet and input his or her customer identification into the door access unit. This may comprise a code or password manually inputted, a biometric scan, the scanning of a machine-generated code or magnetic stripe, the reading of an RFID or NFC signal, or the like. This may be done, for example, by swiping or scanning the customer's credit card or debit card. The customer may also be wearing an electronic component worn by the customer, such as jewelry, which provides such an electronic code that can be read by the access device. Alternatively, the customer may obtain a machine-generated code, password, etc. from a software application on the customer's handheld device, such as a cell phone or tablet, which can be scanned by the access unit or otherwise entered therein so as to unlock the door and provide access to the items within that bay.

Cash money may also be deposited into a unit of the automated store outlet, such as the check-in station, or upon the customer receiving a code, password or machine-readable code to enter into a door access unit to gain access to one or more bays of the automated store outlet. The customer may have unspent money returned to him or her as part of closing the purchase transaction at the check-in station or other unit.

After verifying the identification of the customer, the customer is moved into a present mode status while shopping at the automated store outlet in order to speed up the identification process of the customer at each bay. This avoids the system needing to search for all potential past customers, members of the system, credit and/or debit card holder information, etc. which databases can be quite large and take time to completely search. Instead, such information can be kept in a much smaller database at the automated store outlet computerized system which can be searched very quickly for all customers present at that particular automated store outlet.

When an item is removed from the bay, such as from a compartment of a tray of the bay, the system detects the removal of the item from the bay. The system also identifies the removed item and sends the identification of the removed item to an electronic shopping cart for that customer at a computer located at the automated store outlet.

The detection of the removal of an item from the bay can be done by a variety of means. Typically, a sensor is associated with each item within the bay. For example, the sensor may comprise a light sensor disposed below the item and exposed to light, and thus actuated, when the item is removed from the tray. Typically, compartments are formed in the tray using horizontal and vertical dividers or prefabricated dividers, and an item and a photosensor is assigned to each compartment. As the items and sensors are arranged in association with the tray within the bay, removal of a particular item triggers a sensor and the system can determine exactly which item was removed from the tray within the bay. A plurality of compartments may be molded into a sheet of material comprising the tray of the bay. The tray may be generally opaque, but each compartment having a transparent area or aperture in general alignment with a photosensor of the compartment such that the photosensor is activated when an item is removed from that compartment. A light source, such as a pulsating light source, at a predetermined non-visible frequency or range of frequencies, such as an infrared LED, may be used to facilitate the detection of the removal of an item from a tray, as the system could distinguish this light source from ambient light sources.

Alternatively, the detection of the removal of an item from the bay comprises the steps of associating an RFID tag with each item on the tray. A corresponding RFID detector is utilized to detect the movement of the item away from the tray and from the bay. The RFID detector, in a particularly preferred embodiment, comprises an RFID antenna sandwiched between an upper and a base layer and forming a sensor tray which is positioned relative to the items in the bay so as to detect movement and removal of the item from the tray and bay.

An identification of the item removed from a tray or bay is displayed on the customer's shopping cart. This typically also includes the price for the item removed. The customer's shopping cart, including the identification of each removed item and its purchase price, may be displayed on a computer-controlled display unit associated with each bay of the automated store outlet. Upon accessing another bay, the customer's electronic shopping cart, including all items removed from all bays of the automated store outlet for that shopping event, is displayed on the display unit of that bay so as to travel with the customer from bay to bay of the automated store outlet to track all removed items for purchase from all bays of the automated store outlet until the customer's purchase transaction is closed. This enables the closing purchase transaction to be performed once as a single transaction for all items removed from all bays by the customer during a shopping event, which presents not only a convenience to the customer but also saves transaction fees.

In one embodiment of the present invention, a software application loaded onto or accessible through a handheld device, such as a cell phone or tablet, can be used to obtain a password or code. Upon entering or scanning the code or password into the door access unit, the door is unlocked and the customer is able to gain access to the items within the bay. The customer's electronic shopping cart may be transmitted to the handheld device of the customer and displayed on the display thereof while the customer is using the automated store outlet.

The accuracy of a transaction or identification or price of an item may be confirmed by scanning the machine-readable code on the removed item using a scanner of the automated store outlet, such as a scanner associated with the door access unit. If the customer returns the item into the bay, the item is removed from the electronic shopping cart of the purchaser. However, when the bay door is closed, it is automatically locked. The automated store outlet detects whether the doors of each bay is opened or closed at any given time, and tracks the opening of a door by a customer and assigns all items removed from that bay to that customer's shopping cart while the door is open.

The present invention allows multiple customers to shop at the automated store outlet simultaneously, however, only one customer can access a given bay at a time. Thus, while the first customer is accessing a bay of the automated store outlet, a second customer may input that customer's identification into a door access unit associated with the bay not being accessed at that time by the first customer. After verifying the second customer identification, the door of the bay associated with the door access unit that received the second customer identification is unlocked so as to provide access to the items within that bay. The system detects the identity of each item removed from the bay by the second customer and adds the removed items to an electronic shopping cart for the second customer. That electronic shopping cart travels with the second customer as the second customer moves from bay to bay and removes items for purchase. The second customer will be charged for the items in the second customer's electronic shopping cart when the second customer closes the transaction after a predetermined period of an activity by the second customer or when the second customer closes the transaction. The method and technology of the invention allows multiple customers to shop simultaneously and the system has the ability to distinguish the customers and charge them separately in a single transaction each.

After a customer has completed his or her shopping session, the purchase transaction is closed and the customer is charged for the one or more removed items. Closing the purchase transaction can comprise the customer closing the purchase transaction using the check-in station at the automated store outlet. The customer may request display of the removed items and their purchase prices by viewing the shopping cart at a computer-controlled display unit of the check-in station. Alternatively, the system will automatically close the transaction and charge the customer for the removed item after a predetermined period of customer inactivity at the automated store outlet.

A receipt may be provided for the one or more items purchased. The receipt may be printed for the customer or electronically sent to the customer, such as via email or the like. Purchase data from the automated store outlet is also relayed to a central control center via a wired or wireless network.

The current invention provides a real time video and audio communication, allowing consumers to communicate with the automated store outlet's customer service in real time. The customer may be able to request live customer service assistance while using the automated store outlet, which will be in the form of a live attendant at a remote location communicating with the customer via an audio link or an audio/visual link, such as through a display monitor of the automated store outlet.

Typically, the automated store outlet is monitored with surveillance devices, which may be also used as remote viewing devices by customer service to assist customers remotely. The surveillance devices may also provide security from theft and destruction of the automated store outlet.

The present invention may also include an algorithm that collects and analyzes consumer purchase habits. An alert is created when a customer's behavior is detected that conflicts with pre-established behavior rules. This may be used, for example, as a means for providing security and preventing theft or destruction of the automated store outlet or its items. This may also be used, for example, to detect the unauthorized use of a customer's account identification.

For refrigerated bays, containing items which can spoil if reaching a predetermined temperature, the automated store outlet may prevent a customer from opening a refrigerated bay door when the temperature within that bay has exceeded a predetermined temperature so as to prevent the customer from potentially purchasing items which may have been tainted or spoiled.

The automated store outlet of the present invention may electronically detect the presence and identity of all items within a bay, and create an inventory report. The one or more bays of the automated store outlet may be restocked as needed. The automated store outlet and method of the present invention may create a fulfillment report and pick list and track restocking activity, including at least one of accuracy of restocking in comparison to an item pick list and time to start and complete restocking.

A tray may be provided within at least one of the bays having items supplied by a single predetermined supplier. The purchase histories of items from that tray are tracked and analyzed and conveyed to the supplier. The present invention also may collect supplier product rebate data corresponding to items purchased from the bays of the automated store outlet in order to take advantage of supplier rebate programs.

The present invention may also track food item purchases in conjunction with a weight loss or health maintenance program of the customer. In accordance with such program, electronic messages may be transmitted to the customer on the weight loss or health maintenance program regarding eating time intervals or suggested food item purchases from the automated store outlet.

Advertisements may be displayed on a monitor associated with the automated store outlet. The advertisements may be related to the automated store outlet, the goods and items sold within the automated store outlet, or unrelated advertisements.

The use of this invention can overcome many of the limitation or the restrictions of the common kiosk or the company's micro-market as well as the limitation and restriction of typical vending machines.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

FIG. 15 is a bottom perspective view of a sensor tray used in accordance with an embodiment of the present invention;

FIG. 16 is an enlarged perspective view of area "16" of FIG. 15, showing details of the sensor tray of FIG. 15;

FIG. 17 is an enlarged perspective view of a photosensor plug in area "17" of FIG. 15;

DETAILED DESCRIPTION OF THE PREFERRED EMBODIMENTS

As shown in the accompanying drawings, for purposes of illustration, the present invention is directed to a system providing unattended, automated checkout store outlets for use in the sales and distribution of products and items to customers. As will be more fully described herein, each automated store outlet (ASO) is designed to be fully automated and unattended. However, the system provides interactive live solutions, allowing customers to interactively communicate with customer service agents and management via audio and/or video conferencing or chat or text chat. The present invention and its related method provide greater security than currently provided by current micro-markets and greater flexibility and more product offerings than are currently offered by conventional vending machines, while the transactions are still conducted without any need for attended personnel, as items for purchase are within bays secured behind locked doors and accessible only by prior verification of payment and customer information.

Figure 1:
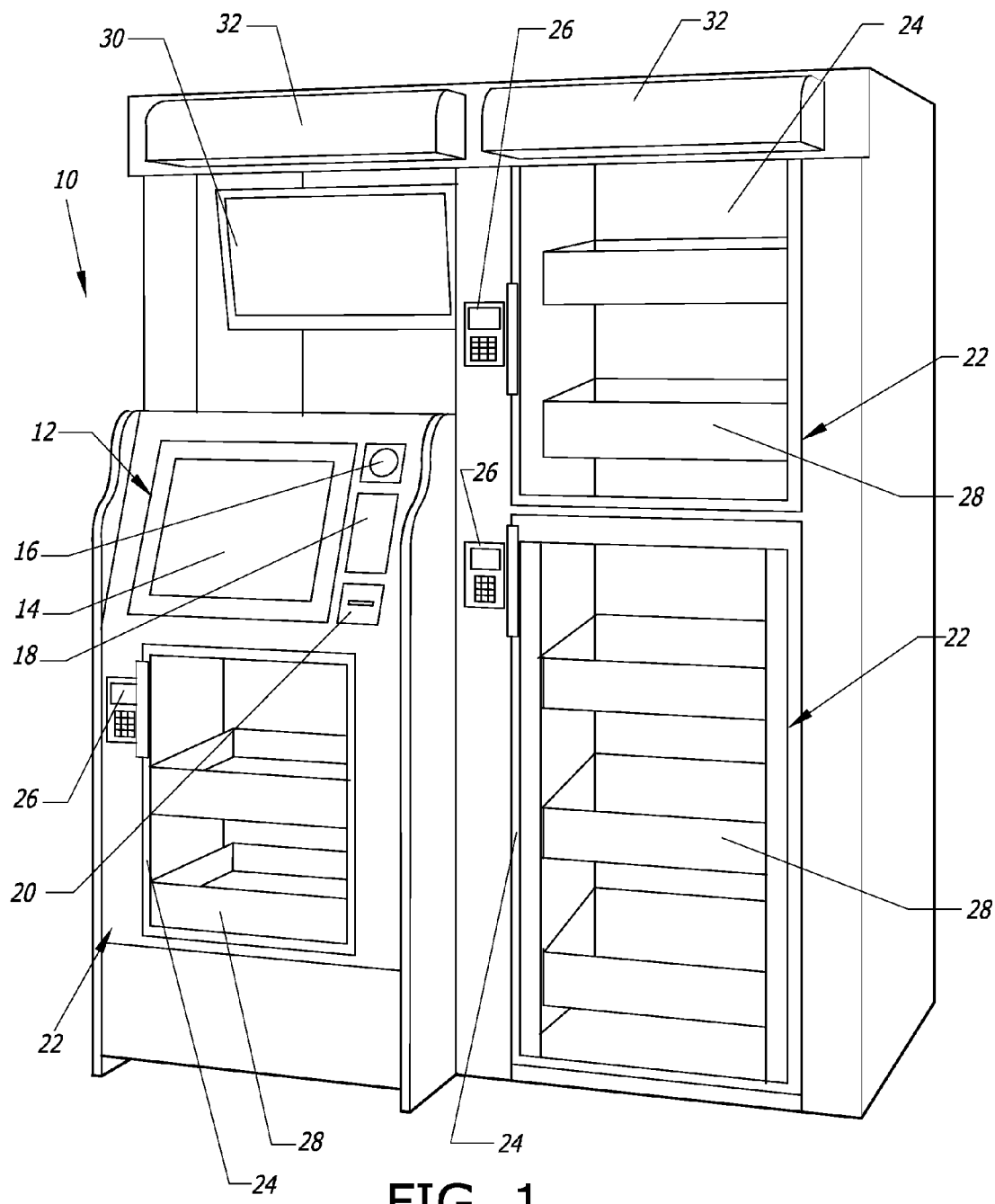
FIG. 1 is a front perspective view of an one check-in station, one bay automated store outlet embodying the present invention.

With reference now to FIG. 1, an exemplary automated store outlet (ASO) 10 is shown. The ASO 10 is an unattended, automated checkout kiosk or micro-market outlet. The ASO can be used for the sales of many types of food and beverage items as well as all kind of other suitable consumer products. The ASO includes a check-in station 12 where an individual can login personal identification information, select and enter payment type and information, be approved for transactions, interface with customer service, and close transactions. The check-in station typically includes an electronic monitor or screen 14, which in a particularly preferred embodiment is a touch screen so as to both display information as well as allow the customer to interact with and input data into the system. However, it will be appreciated that other data input means such as a mouse, keyboard, etc. could be used in connection with a non-touch screen for the same purposes. The check-in station 12 also typically includes a camera 16 and speakers used for identifying the customer and/or permitting the customer to communicate live with customer service representatives or the like.

As part of using the invention, a customer is identified. This can be done in several ways. For example, the user may simply enter in a customer identification code and/or password, such as using the touch screen monitor 14. Alternatively biometric information may be obtained from the customer utilizing, for example, the camera 16 which can be used for facial recognition purposes, or a scanner 18 which can be used for obtaining fingerprints from the customer so as to properly identify the customer. Scanner 18 can also be used to read customer's RFID card or customer Quick respond imaging reading as additional options to identify the customer. A card reader 20 is typically provided as part of the check-in station 12 as well. This can be used for identifying the customer and for the customer to provide payment information, such as in the form of a pre-issued dedicated member card for ASOs of the system, debit cards, credit cards, etc. The check-in station 12 can also include a mechanism for receiving deposited cash in the form of currency bills and coins in order to effectuate a transaction.

Each ASO 10 includes one or more bays 22 which contain items which are removable from the bay 22 for purchase. The bays 22 can be placed next to each other, in multiple numbers of configurations. Each bay 22 includes a normally locked door 24. Typically, the access doors 24 are comprised of glass or other transparent material such that the customers can view the contents of the bays 22 before opening the doors 24. All doors 24 are self-closing spring doors which will close automatically upon releasing the handle of the door.

In a particularly preferred embodiment, an electronic access unit, such as a scanner or data input device 26 is associated with the door 24 of each bay 22 which must be used by the customer in order to unlock the door 24 and gain access to the contents within the bay 22. This may be done after becoming identified, selecting payment information, and becoming qualified through the check-in station 12. The customer may enter a code, provide a fingerprint at the scanner 26, scan or swipe a card including the scanning of a QR image, RFID card, NFC or other electronic device, etc. at the electronic unit 26 so as to gain access to each bay 22 through the locked door 24.

When a customer inputs his or her customer identification and/or purchase information, such as by biometric scan, entering a password or code, scanning a machine readable code, swiping or scanning a credit or debit card or the like at either the check-in station 12 or the door access unit 26, the computerized system of the present invention must search through one or more databases to verify the customer's identification and/or payment information. Such databases can comprise thousands of customer profiles, and the authorization may take several seconds. In accordance with the invention, after a customer profile has been obtained, this profile is saved locally at the ASO in a temporary database so as to elevate the customer to "present mode", indicating that the customer is present at the ASO 10 and is currently shopping. Thus, as the customer accesses various bays 22, checks out and closes the transaction, or any other function the computerized system of the ASO can very quickly find the customer's profile.

Figure 3:
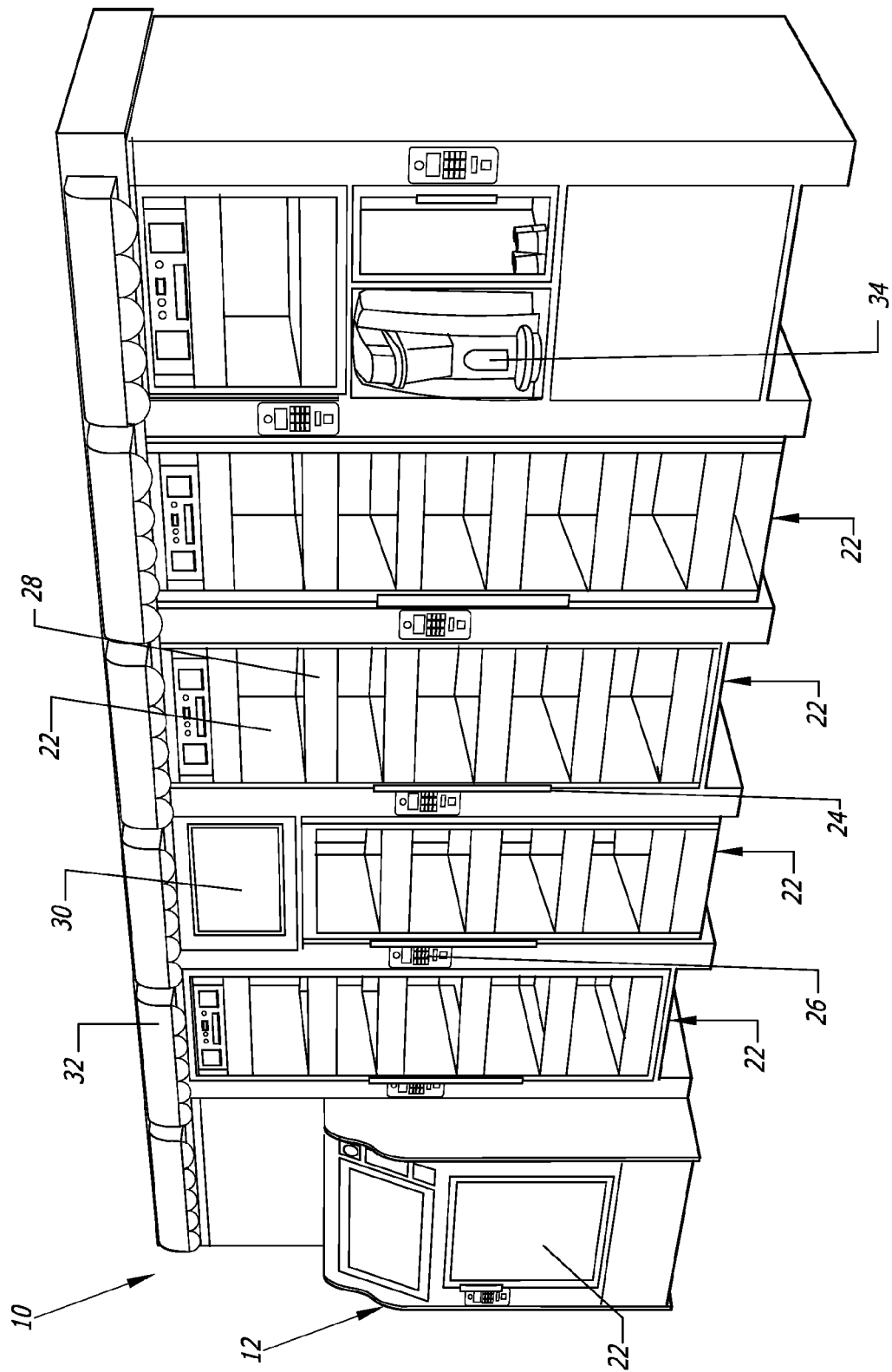
FIG. 3 is a perspective view of another automated store outlet having multiple bays, in accordance with the present invention.

As needed, the individual bays 22 may be refrigerated, be capable of holding and retaining frozen food, otherwise climate controlled, or provide no climate control, depending upon the items to be purchased therein. An ASO 10 having multiple bays 22, as illustrated in FIG. 3, may have some bays 22 which are refrigerated, while the other bays 22 are not. In accordance with the present invention, the ASO will monitor the temperature of bays, and particularly refrigerated bays, such that if the temperature exceeds a predetermined threshold, the bay door 24 will be locked and customers will not be able to access the contents of the bay 22 to remove items as they may be tainted, spoiled, etc.

Means are provided for retaining and presenting items to be purchased within the bays 22. Typically, trays 28 or other shelving is provided for these items. As will be discussed more fully herein, the ASO is able to detect the removal of every item from each bay 22 so as to charge the customer for each item removed.

With reference again to FIG. 1, the present invention contemplates the use of incorporating a monitor 30, which could provide advertising and marketing for various products and services. These products and services may be related to the ASO or the company providing and servicing the ASO, or may be related to other companies. The advertising monitor 30 may also be used to advertise items for sale within the ASO. Alternatively, the advertising monitor 30 may be used to advertise goods and services which are completely unrelated to the ASO 10 or the items for purchase therein. The advertising monitor 30 could also be used for describing to new customers how to use the ASO system. This can be done either at the advertising monitor 30, at the monitor 14 associated with the check-in station 12, or printed instructions could be provided on the ASO 10.

Canopies 32 are typically attached to the modular units containing the bays 22, check-in station 12, etc. for providing lighting, branding and marketing, and otherwise making the ASO 10 unit aesthetically pleasing. It will be appreciated that other types of awnings and facades can be used.

Figure 2:
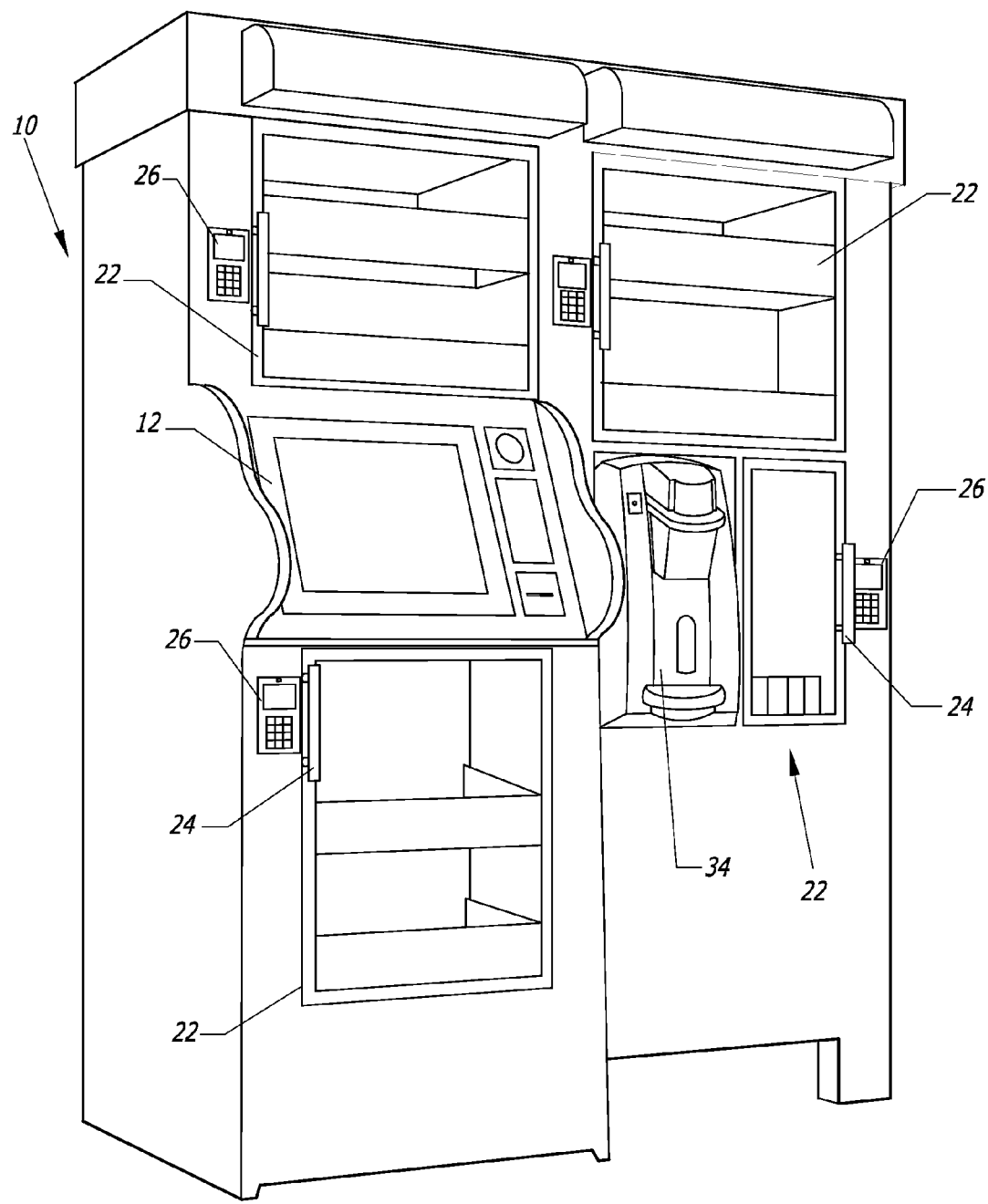
FIG. 2 is a front perspective view of another automated store outlet having a hot drink brewing dispenser embodying the present invention.

With reference now to FIG. 2, another ASO 10 is shown having a check-in station 12, as described above, and a plurality of bays 22 within two modular units. In this case, however, it will be seen that the modular bays 22 are of a different configuration and size than that illustrated in FIG. 1. Moreover, one of the bays 22 includes items related to a drink dispenser 34. The drink dispenser 34 typically comprises a coffeemaker, but can also provide hot water for making tea, cold water for making cold flavored beverages, etc. The coffee K-cups®, teabags, flavoring packets, cups, etc. would be accessed through the locked door 24 of the bay 22, and after retrieving and purchasing these items, the customer could make the desired beverage using the beverage device 34. The beverage device 34 may or may not be behind a closed and locked door 24. Other type of hot or cold single cup beverage dispensers 34 may be provided. Such dispensers are controlled by the ASO's computer system and dispense selected beverages only to qualified customers. In order to activate the beverage dispenser 34 the customer must have provided customer identification and payment information which was verified, such as by entering such information into an access unit 26 at the bay in which the beverage dispenser 34 is disposed, or into such an access unit which is electronically connected to the beverage dispensing device 34. At that time, the system of the ASO changes the machine mode from standby to active and the machine processes the customer's drink selections. The beverage dispenser device 34 reports the selection to the system that adds the sale to the customer's shopping cart. The beverage dispenser 34 may process one drink at a time, and then return to standby mode, until the next customer becomes verified and approved to use the dispenser 34. It is also contemplated by the present invention that the customer could be charged for a cup that is removed and/or a component which is required to make a beverage, such as a K-Cup®, tea bag, flavoring packet, etc. Upon removal of one of these items from the bay tray 28, the beverage dispenser device 34 could be activated to make and/or dispense a beverage corresponding to the beverage cup, beverage component, or the like.

The ASO 10 illustrated in FIG. 2 allows the operation of an automated, unattended coffeehouse. Customers are allowed to prepare their own hot or cold beverages, such as coffee or tea, independently. The brewing device 34 may be only activated after the customer has properly checked in and become qualified through the check-in station 12. The customer may also be able to purchase other products that are commonly sold in coffeehouses, such as muffins, cakes, other bakery items, etc. which can be obtained through the one or more additional bays 22.

Traditional coffeehouses, such as Starbucks and others, have become very popular and are visited frequently. However, in many cases, such coffeehouses are located a sufficient distance away from the customer that the customer must either walk several blocks to the coffeehouse or drive his or her car to the coffeehouse. Also, many times there is a long line of customers in such coffeehouses and it takes time to get service. Additionally, such coffeehouses are charging quite high prices for their products. There is a need for an automated coffeehouse kiosk or ASO embodied by the invention that can be conveniently located within lobbies, office buildings, airports, dorms, etc. which are fully automated, unattended, and provide quality coffee, tea, etc. at lower prices.

With reference now to FIG. 3, the ASO 10 of the present invention is modular and typically multiple bays 22 are provided in varying configurations as part of the same ASO 10, and a single check-in station 12, as illustrated in FIG. 3. Thus, for example, in larger buildings, airports, etc. where there is a greater need and sufficient space, a larger ASO having multiple bays 22 can be provided. However, in smaller buildings, dormitories, and the like a smaller ASO can be provided to meet the needs of that location. The modular ASO is very flexible allowing designing an ASO in deferent shapes and configurations. Therefore, the ASO may be as small as illustrated in FIG. 1 or bigger as illustrated in FIG. 3 or in any other size based on the location's requirements and the location physical configurations. The ASO 10 operates in the same fashion, regardless of the number of bays 22 and modular units provided.

Figure 4:
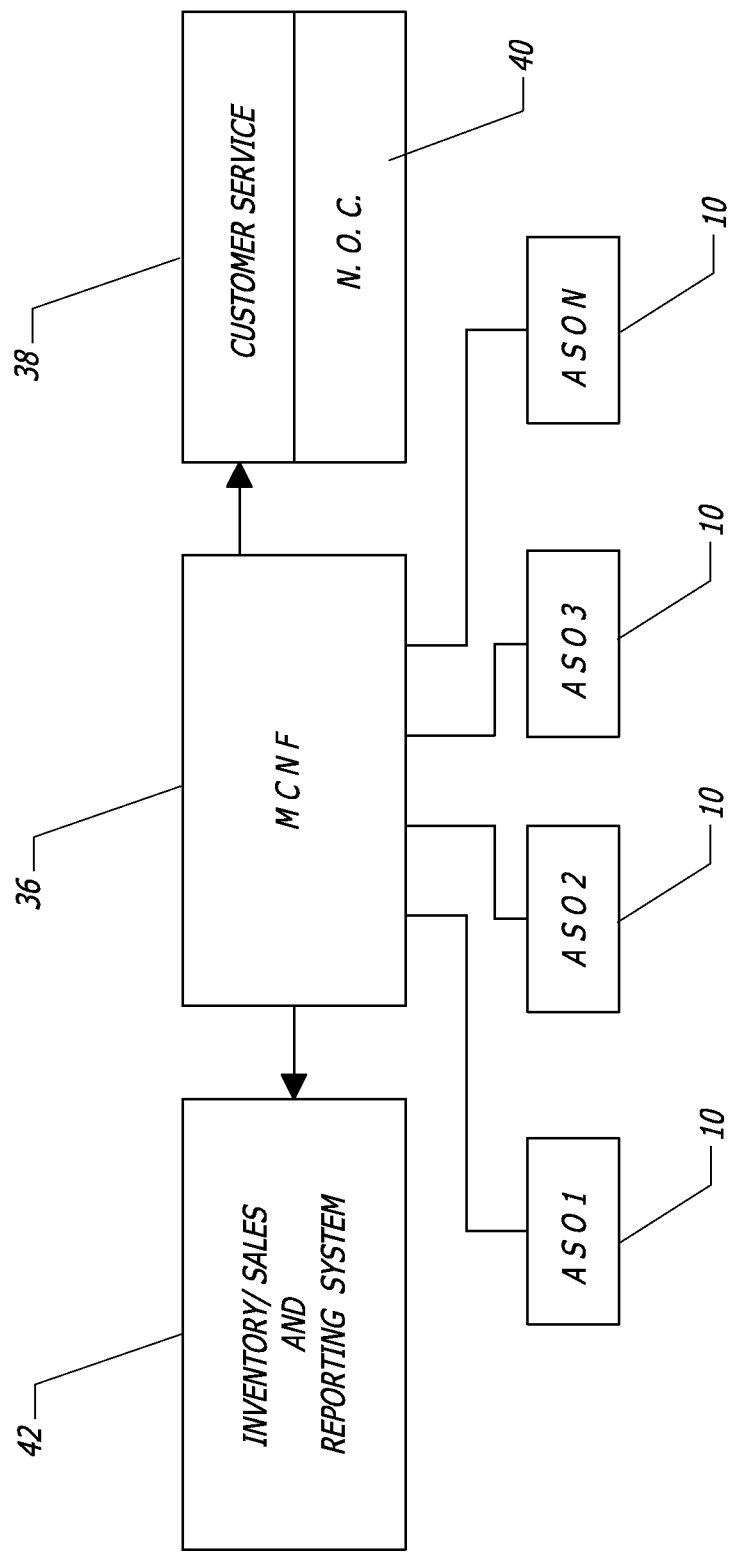
FIG. 4 is a diagrammatic view illustrating various aspects of the system of the present invention.

With reference now to FIG. 4, however, each ASO 10 (labeled ASO1 -ASON) are typically in constant communication with a central control center or main control network facility (MCNF) 36 to exchange data, information and perform activities. The MCNF 36 comprises one or more servers, such as in a cloud environment, designed to assist in the activities of all ASOs, as well as the customer service network 38, the network operation center (NOC) 40 and inventory, sales and a reporting system 42. The customer service network 38 allows customers to interface live with customer service staff. The MCNF 36 is typically tied to the company's website and allows customers to create accounts, add funds to their accounts, obtain company news, review personal activity records and/or statements, and other such related functions. Thus, a two-way communication network is established, using wired or wireless technologies, for the ASOs to relay information to the MCNF 36, NOC 40, customer service 38, or the inventory and sales and reporting system 42, and receive communication back in the form of customer service, surveillance, remote operation, etc.

The MCNF 36 is a central control center that manages all ASO locations as well as the company's administration and reporting needs. The MCNF hosts the company's Network Operating Center, the company's customer service and the company's websites. The MCNF communicates with each ASO's LCS 58 via the network connection, exchanges data and assists in the operation of each ASO. However, all local functions, mechanical and electrical, as well as all detection identification and qualification of each customer are mainly controlled by the local LCS of each ASO. However, the MCNF can utilize the software to manage the company's administration including all sales reports and inventory, restocking reports, customers' account activities and balances, member database and a variety of other functions and special programs. Additionally, the MCNF hosts and manages the company's websites which provide company information as well as allowing members to log on to their profile and obtain reports, add funds to their balance, interact with the company's special programs and communicate with company staff via chat, email or live video/audio.

The invention is able to detect the removal of an item from a tray 28 of a bay 22 by the customer who has gained access to the bay 22 through the electronic identification unit 26 associated with the lock of the door 24. This information is relayed from circuitry associated with each bay 22 to a main controller and local computing system (LCS) at each ASO for determining the exact identity of each item removed by that particular customer and charging that particular customer for the items removed. The main controller and LCS also control the functions of the check-in station 12. Thus, all functions of each ASO 10 are fully operated by the LCS located locally at each ASO. The LCS creates, saves and maintains activity reports and history logs at each local ASO. Thus, in the event of communication and network outages, the ASOs of the present invention can still operate and function as they are self-sufficient by containing the necessary circuitry, controllers, computers, software, etc. to perform transactions.

It is contemplated by the present invention that either via a website or a check-in station 12 at an ASO 10, a customer creates an account dedicated to the system of the invention. Funds are loaded onto the account and a dedicated card or electronic device may be issued to the customer. Alternatively, the customer may be provided a customer identification, PIN, password, etc. to enter in at the check-in station and/or electronic scanner units 26 to gain access to the ASO to make purchases, etc. The funds of the dedicated account may be replenished by means of debit cards, credit cards, wire transfers from bank accounts, or even cash deposited into the ASO. Since all of the ASOs 10 are managed and controlled by one network, customers who are members in a specific ASO can shop and use their member card or customer identification in any other ASO on the network, and the proceeds of the sale will be credited to the operator of the serving ASO.

Figure 5:
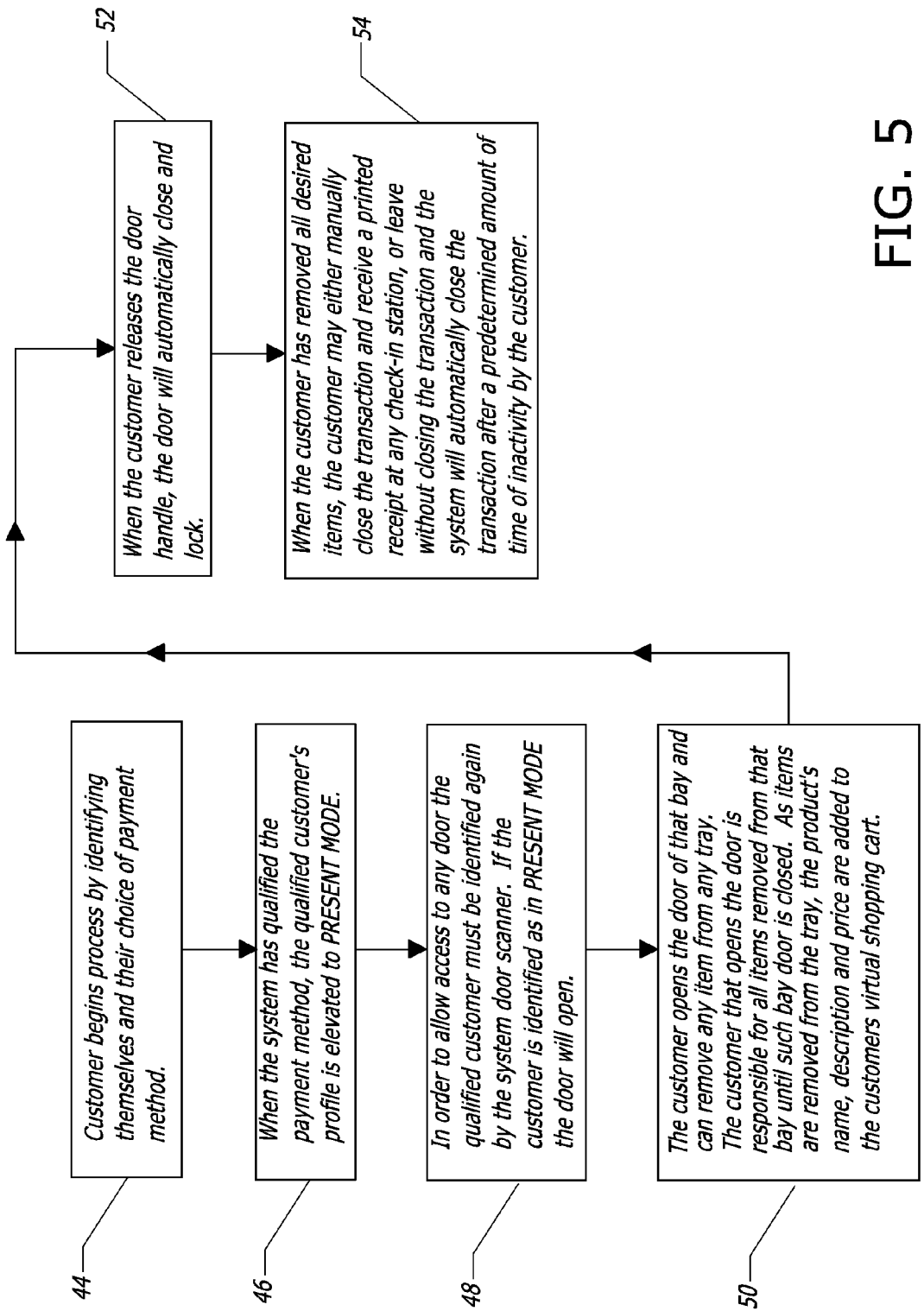
FIG. 5 is a flowchart depicting steps taken in accordance with the present invention.
Figure 6:
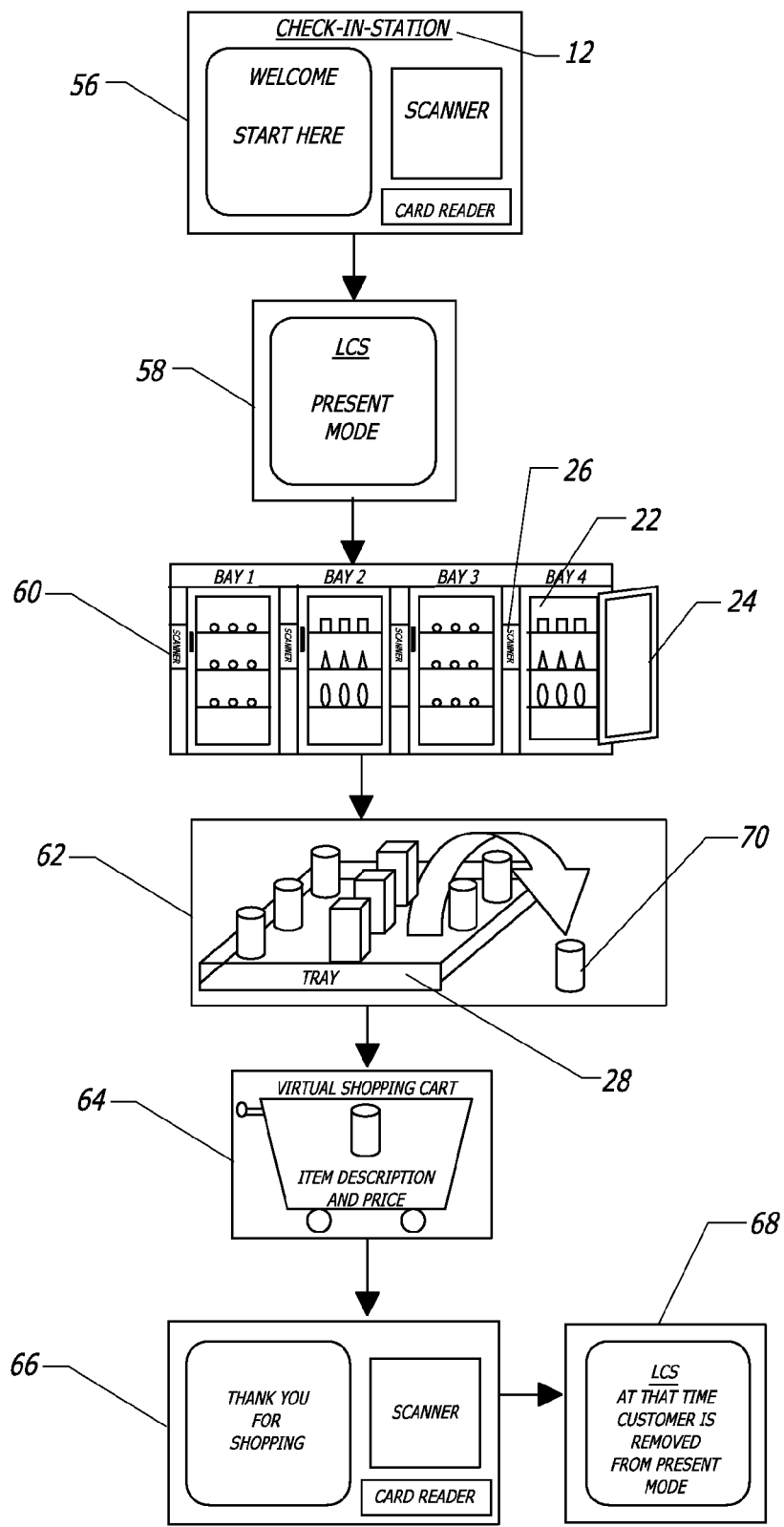
FIG. 6 is a diagrammatic view illustrating the operation and use of the present invention.

With reference now to FIGS. 5 and 6, a customer begins the process of using the present invention by identifying themselves and their choice of payment method 44. This may be done at the check-in station 12, as illustrated in step 56 of FIG. 6. The first step that a customer takes when the customer reaches the ASO 10 is to go through an identification and qualification process. During this process, the local computerized system identifies the customer and then qualifies the customer to shop at the ASO. A customer can be a member or a non-member. A member is a person who preregistered with the company and has a customized member card or identification code or the like which was issued to him or her by the company.

As mentioned above, the initial identification is usually accomplished at the check-in station. If the customer is an approved member, the customer will have with him or her his or her own customized member card (such as an RFID card, magnetic strip card, or other type of customized identification smart card) or signal such as NFC, or code from a handheld device. The customer will also typically have a personal identification number (PIN) which is already pre-associated with the member card. The customer scans his member card onto the scanner or card reader at the check-in station 12 and then enters his own PIN using the station's keypad or the station's touch screen. In some cases, the customer may be required to enter additional information such as a zip code, date of birth, the name of his or her pet or other information that may be saved in connection with the customer's profile for security purposes.

The present invention contemplates replenishing the issued member payment card with credits representing dollar amounts either online on the company website, or at the check-in station screen at any ASO using a credit or debit card or currency. Members may also authorize an ACH transaction to replenish their payment card.

Alternatively, if the customer is a member who previously scanned and registered his or her facial and/or fingerprint imaging, the customer can also be identified by the biometric data such as by scanning his or her face or fingerprint at the check-in station scanner. The system compares the facial, fingerprint, or other biometric image with the biometric images on record and identifies the customer.

As another option, the member customer may enter his or her user's name and password or the like, using the local check-in station's touch screen or other data entry mechanism. The system compares the information with the database, and if the system finds the information entered matches the database records, the system completes the identification process. Once again, in some cases, the customer may be required to enter additional information saved with the customer's profile for security purposes.

As yet another option, a member customer may download a company software application onto a handheld mobile electronic device, such as a smart phone or tablet, which allows the customer to be identified by using an image, such as a QR code image, downloaded to the customer's mobile device. Upon accessing the application from the mobile phone and after entering the customer's PIN and requesting the QR image, the QR image is pushed to the customer's smart phone number. A new QR image gets pushed to the customer's smart phone each time the customer accesses the application and requests an image. The smart phone number on file and the customer's PIN must match in order to receive the qualified QR image. The particular image is good for one session in the ASO. Upon obtaining the machine readable code, such as an QR code, the customer's profile gets elevated to present mode for a predetermined length of time, enabling the customer to go straight to any bay door and skip the check-in process at the check-in station 12, and instead have the machine readable code scanned at the door access unit 26 or the code or password manually entered therein so as to gain access to a particular bay 22 of the ASO 10. If the QR image does not get used for a predetermined length of time, the QR image expires.

Additionally, by using this option, the customer gets his or her active virtual shopping cart, in real time, directly on the mobile phone's display. Also, from time to time, the customer gets notices and promotional advertisements that are pushed to the customer's smart phone, using push notification functions or any other cellular technology.

If the customer is not a member and wishes to shop at the ASO using a credit or debit card, the customer can scan the card with the reader at the check-in station 12. The customer may also be required to enter additional information such as a billing zip code, date of birth, or any other information that may associate the person with the payment credit or debit card. Additionally, the customer may also be required to be scanned biometrically, such as providing a facial image from the check-in station's camera and/or a fingerprint.

If the customer wishes to use cash for a shopping session, the customer must enter the cash bills or coins into a cash acceptance receiving device that may be part of the check-in station. This loads the amount of cash received into the device into a temporary account. At that time, the check-in station will issue that customer a temporary card, a machine readable code printout, or a password or PIN that is associated with the temporary account to allow the customer to shop in the ASO.

In one embodiment, the device will issue on location at the ASO a card that is loaded with the funds in the same amount that the customer fed into the device, so long as the amount is over a minimum amount required. Alternatively, the machine may print a customized QR image, barcode, RFID tag card, or other image on a smart paper access card which is issued specifically for such transaction. In yet another alternative, a temporary access PIN may be provided to the customer, either instead of such printed image or smart card or in addition to these. The PIN may be generated by the machine or selected by the customer on a touch screen. The access cards, printed image, and/or PIN will allow the customer to access bay doors 24 and shop at the ASO.

Upon completing the current shopping session, the customer may insert or scan the temporary access card back into the machine to redeem cash in the amount of the remaining balance on the card (the remaining balance being the amount loaded onto the card less the cost of the items purchased during the shopping session) or keep the card for future use. Additionally, such types of cash access cards with preloaded specific dollar amounts may be offered for sale as gift cards or cash access cards for shopping at any ASO.

In the event that the system detects that any person may not meet certain security criteria, the system may require additional information or may deny access to such person.

After being properly identified and presenting an acceptable choice of payment, both of which are verified by the system, the system then qualifies the customer to remove items from any bay by determining that the customer payment information is of a sufficient level to purchase items from the ASO. The qualification process is necessary in order to confirm that the customer's account has sufficient funds available for an average shopping visit amount. The amount of an average shopping visit may be different in each location and can be preset on the system. Thus, after the identification process is completed, the system prequalifies the customer's member card or account, debit or credit card, or input cash for the average shopping visit amount. If the payment amount is not qualified, the system notifies the customer on the check-in station screen that there is not a sufficient amount in connection with the payment type selected in order to conduct shopping. Alternatively, the system may allow the customer to specify on the touch screen a lower qualification shopping amount based on the customer's intention to spend at this visit. If the unqualified customer is a member, the member customer may add funds to his or her account using a debit or credit card, ACH transfer, etc. to become qualified. If the customer is not a member, the customer may use a different debit or credit card that will be qualified or insert additional cash into the ASO. Otherwise, his or her access will be denied.

With reference again to FIG. 5, when the system has qualified the payment method, the qualified customer's profile is elevated to PRESENT MODE 46. With reference to FIG. 6, this is done by the local computer system 58.

Present mode means that the customer and his or her card or other payment information passed the identification and the qualification process and that he or she is present at the ASO and is qualified to open the bays' doors and shop at the outlet store. The customer's profile in the present mode includes the customer's personal information including the customer user name and PIN, the customer's RFID/NFC or magnetic swipe card information and PIN number, and also the customer biometric information and images on record, such as fingerprint and facial scanned images or other available and pertinent personal identification information.

In the event that the cash system issues a temporary access cash card, barcode or QR image access card, or the like, the system approves the card for shopping and elevates the card's credentials to present mode.

Figure 8:
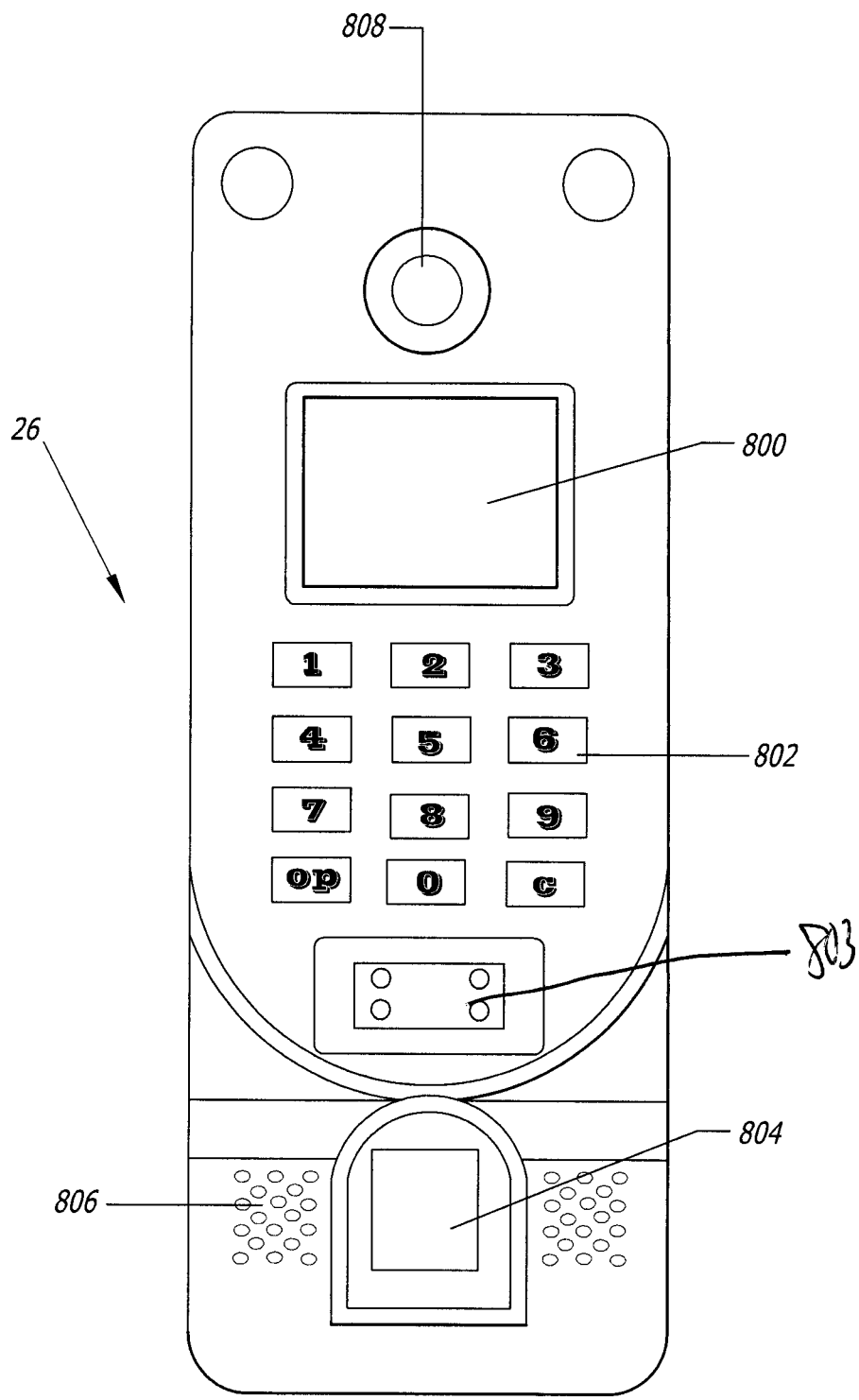
FIG. 8 is a front elevational view of a door access unit scanner, used in accordance with the present invention.

In one embodiment of the invention, when in the present mode, the doors to the one or more bays are either unlocked or can be selectively unlocked, such as by only depressing a button, switch, etc. associated with the door 24 and the lock illustrated in FIG. 8, and without the requirement of a second identity scanning by the door's scanner 26. However, this option may only be available in a very small ASO which enables a single customer to utilize the ASO at a given time. In such case of a relatively small ASO 10 having only a single bay 22, this is not a concern and this option may be suitable. However, this option presents a problem in ASO with multiple bays 22. If only one customer will be able to shop at such larger ASO at any given time, an unqualified individual other than the qualified customer can open a door 24 and access items within a bay 22 that will be wrongly charged to the customer who is in the present mode.

Accordingly, in a particularly preferred embodiment, in order to allow simultaneous access by multiple customers to shop and open multiple larger ASO's doors 24, each qualified customer must be identified again before opening any bay door 24 by the electronic door access unit 26 associated with each bay door 24. If the customer is identified as in the present mode and the proper identification is presented at the scanner 26, the door will open 48. Otherwise, it remains locked. Nevertheless, one customer can open one door at a time. Such customer is the responsible party for all removed item from such bay 22 until such bay's door 24 is closed and locked. However, multiple customers can shop at the ASO simultaneously, a single customer at a time being able to access a given bay through a locked door by providing the necessary customer identification at the door access unit. The invention tracks which customer opened which bay door and which items were removed from that bay while the door is open. Each customer's shopping cart is managed separately by the system, and travels with the customer from one bay to the other, keeping all of the items that are removed from multiple bays in one shopping transaction for each customer.

Only a customer that has his or her profile or his or her cash access card in the present mode can open a bay's door to remove products. In order to open any door, the customer must scan his or her card, facial or fingerprint or other biometric information, or enter his PIN into the door access unit 26 located by each door 24, as illustrated in step 60 of FIG. 6. The bay's door unlocks after the system confirms and verifies that a customer's profile is in the present mode, and the customer scanned his or her identity on the door access unit by the bay's door. At that time, the system activates the locking unit and unlocks the bay door, such as by retrieving a dead bolt to unlock the bay door.

The access units 26 and their components may be multisystem scanners which can perform an RFID/NFC scanning, barcode or QR code image reading, biometric facial or fingerprint scanning, or a manual entry of user name and PIN. The electronic scanner unit 26 of the present invention can accept any one of these methods or any combination thereof, or any other identification means. For example, customers that use their credit or debit cards to qualify may enter manually into the scanner unit a few digits, such as four or five digits, of the card that was used during the identification and qualification process, or enter a PIN that may be given to him/her during the identification and qualification process, or use a printed barcode or QR access card issued by the ASO to the customer during the check-in process. If the customer's credit or debit card is a smart card, the scanner may read the RFID, NFC or other identification technology as the customer scans that particular card onto each door's scanner to open any bay's door. As an additional security measure, the ASO may require the use of biometric facial, fingerprinting, or other imaging in addition to any of the foregoing. A customer's card or profile that is not in the present mode will not be able to gain access to open any bay's door.

With reference now to FIG. 8, an exemplary door access unit or scanner 26 is shown. The access unit 26 may include a display screen 800 for displaying notifications, information, or even the customer's shopping cart to the customer. A keypad 802 is also provided, such as for entering in PINS, passwords, codes or the like. A biometric scanner 804 or the like may be used to read fingerprints, detect individual eye characteristics, etc. A speaker 806 may be provided in the unit for audio notifications and communication. Component 808 may comprise a motion detector, a camera for biometric identification or audio/visual communication with a customer service representative, or other scanner. As described above, the door access unit 26 has a scanner or reader 803 capable of scanning or reading machine generated codes, such as QR codes, barcodes, or even reading credit cards or debit cards and the like.

Instead of issuing member cards, other electronic devices in the form of bracelets, rings, etc. which contain a smart RFID chip or any other RF technology may be issued to the customer. By wearing such bracelets or rings, etc. the customer member can merely pass the electronic device in the form of a bracelet, ring, etc. in front of the door access unit 26 or hold any bay's door handle and open the bay's door. By holding the door's handle, the door's access unit that is located near the door's handle will detect the customer's identification within the bracelet or the ring and allows the opening of the door.

After the computer system confirms that the information entered into the door scanner matches the information of the customer's profile that is in the present mode level, the computerized controller unlocks the particular bay's door. Alternatively, instead of the main controller or LCS performing such function, the present mode information can be downloaded and updated in real time to all door scanners with all profiles of customers and access cards which are elevated to present mode such that the information can be temporarily stored in the memory of each scanner for as long as the customer's or card's profiles exist in the present mode.

Thus, when the customer scans his or her card, provides biometric information, enters his or her PIN into the door scanner located by each door, the scanner obtains a match with the customer's profile identification information saved on the scanner's memory, and the scanner notifies the central controller and LCS of such a match and requests that the LCS unlock the door.

In this manner, only one person at a time can open a door 24 of a given bay 22. As such, that customer is the responsible party for all items that are removed from the bay as a result of him opening the door, while allowing multiple customers to shop at the ASO simultaneously. Having customers go through an identification and qualification process and be elevated to present mode also facilitates the second identification step at the electronic device scanner associated with each bay door. Instead of the system having to search a database for the identification code, password, fingerprint, etc. of all the members which belong to the ASO system, the local computer system of the ASO can merely search for the assigned and known identification codes, passwords, biometric information, etc. for those customers who are already in the present mode and currently present and shopping at the ASO. This cross-matching and determination can happen nearly instantaneously, whereas searching a large database of such information can take additional time.

Figure 9:
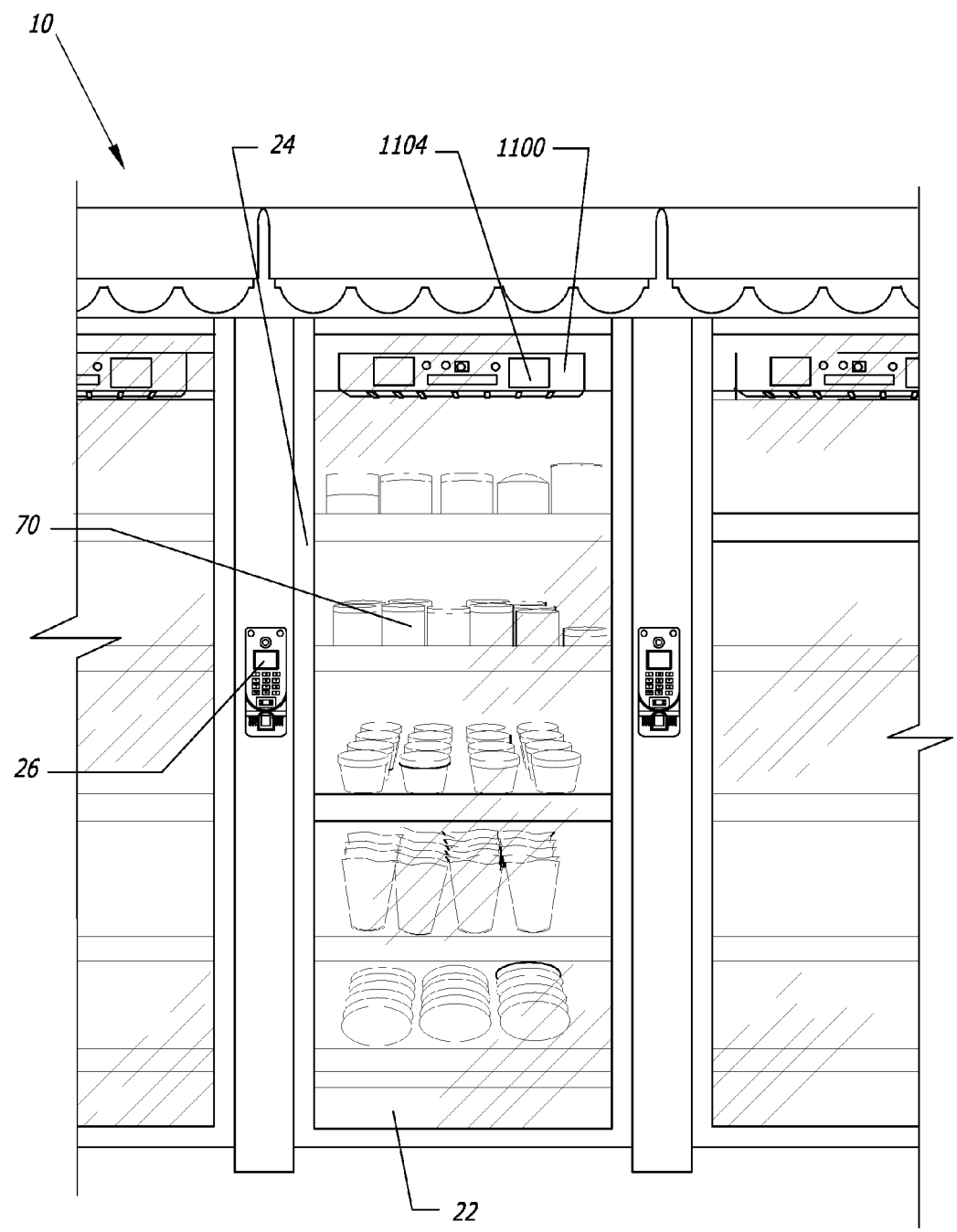
FIG. 9 is a front perspective view of a bay of an ASO of the present invention with the door closed.
Figure 10:
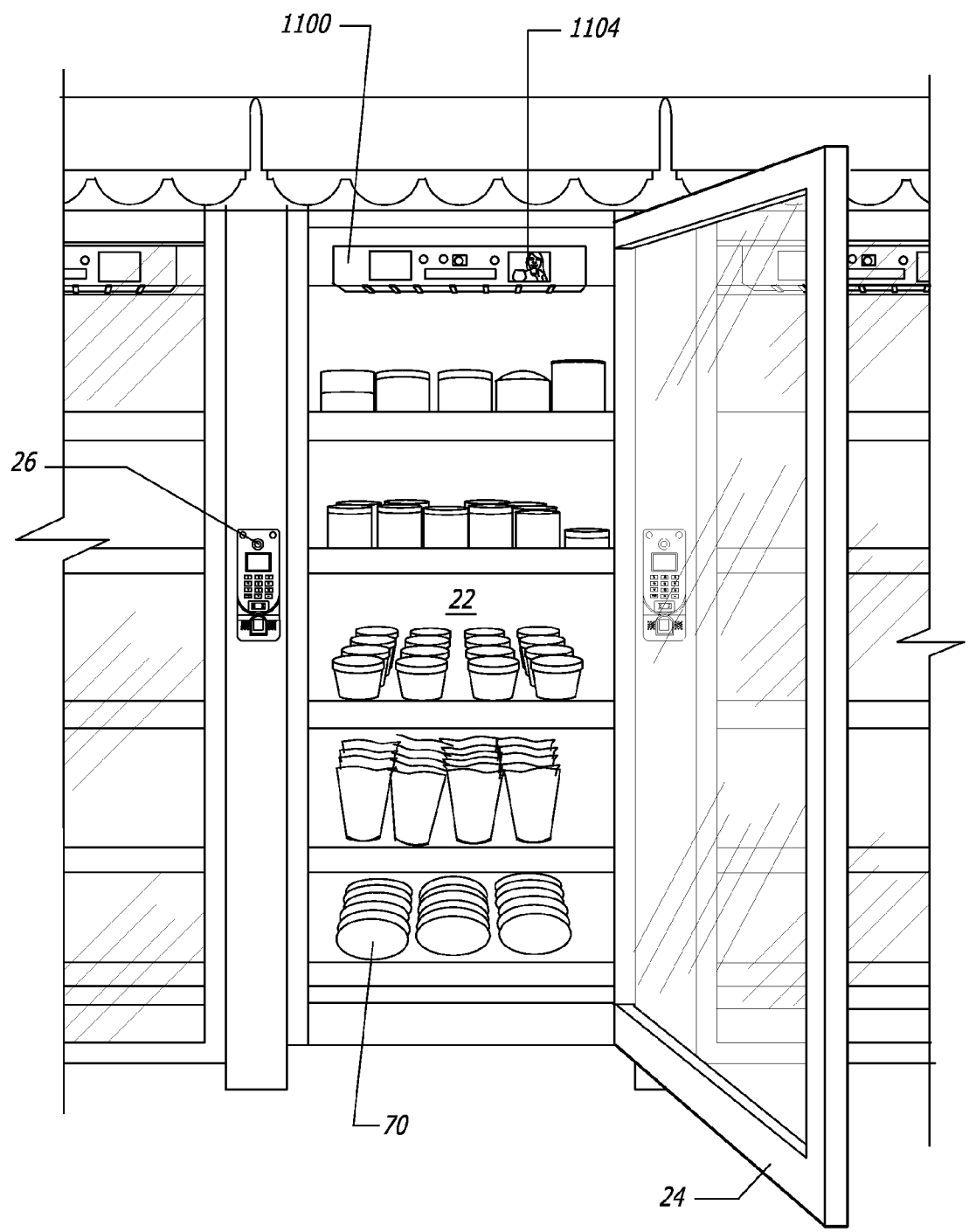
FIG. 10 is a front perspective view similar to FIG. 9, illustrating the opening of the bay door after verification of customer identification.

With reference now to FIGS. 9 and 10, FIG. 9 illustrates a plurality of bays 22 having their doors 24 closed and locked. However, as illustrated in FIG. 10, once the customer enters his or her customer identification into the door access unit 26, and this information is verified, the customer is able to open the door 24 and gain access to the items 70 therein.

Figure 11:
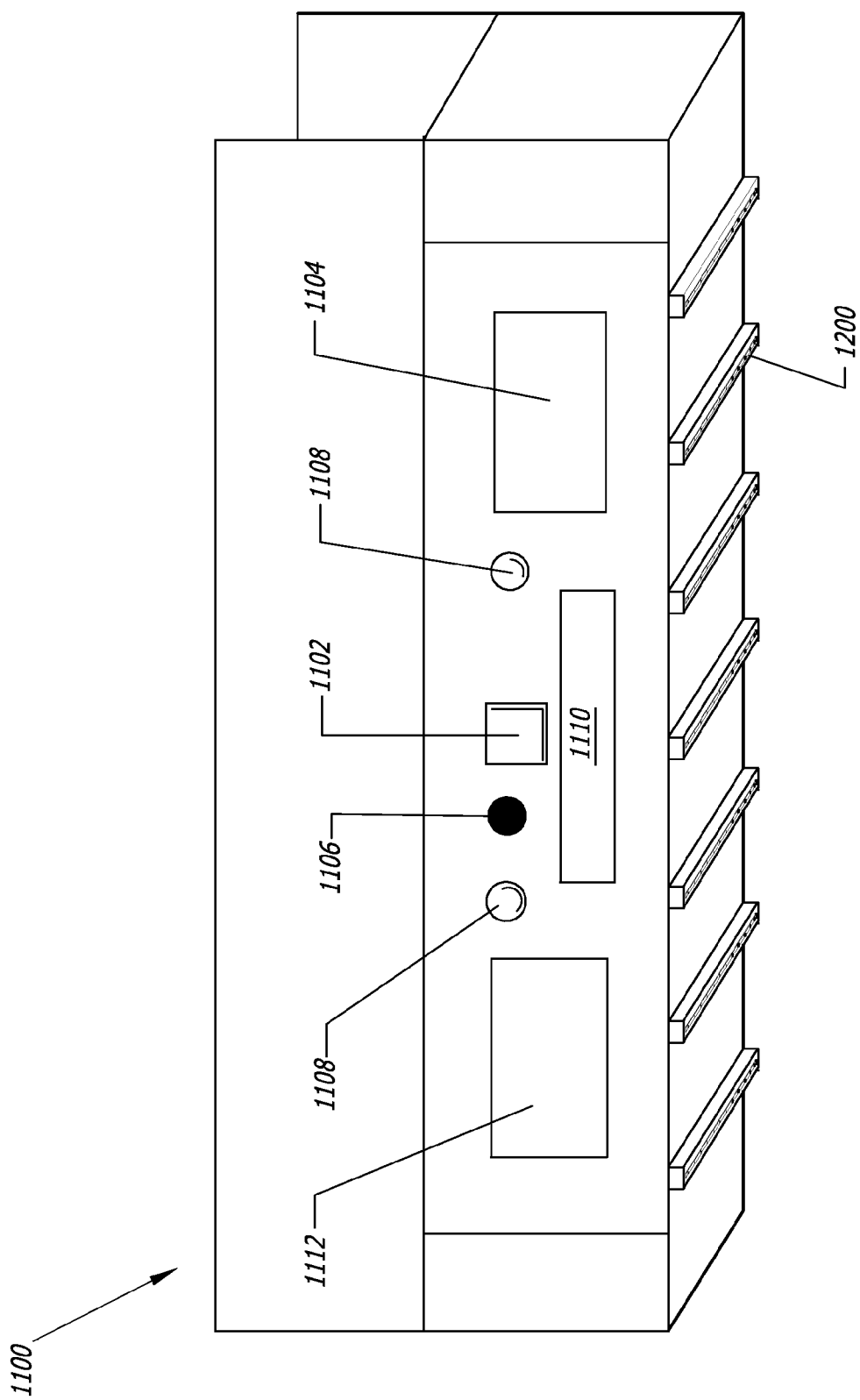
FIG. 11 is a perspective view of an AMP unit used in accordance with the present invention.

With reference now to FIGS. 9-11, each bay 22 may include an activity monitoring panel (AMP) 1100. Each AMP features a camera 1102, which is typically a video camera, and a display 1104. When the customer opens the door 24 and gains access to the bay 22, the camera 1102 is activated such that a video image of the customer is shown on the display 1104, as shown in FIG. 10. The customer who opens the door can see himself or herself on the video display 1104, and the video is typically recorded and saved on memory associated with the ASO. This creates a log of the customer who opened the bay's door and activities which may have occurred while the door to the bay was open. Other visual indicators, such as an LED 1106 may be illuminated once the door 24 has been opened or when the system detects suspicious activity. Audible notifications can be made through speakers 1108, and visual notifications and messages through display 1110. Through display 1112 the customer's shopping cart may be displayed, showing all of the items which have been removed by that customer from the one or more bays of the ASO 10. The customer's shopping cart is automatically updated when items are removed or returned to the bay's tray. The speakers 1108 and display 1110 may provide audible or visual promotional information, operational instructions, or even warnings when the customer's balance runs out of money or when any misconduct is detected. Also, such messages can announce promotional information and/or specials. The LED 1106 may be used to blink to provide a visual warning or notification when the system detects suspicious activity. In extreme cases, the speakers 1108 may play an alarm sound while the LED 1106 blinks.

When the customer scans his or her identification to open a bay's door, the customer's shopping cart may appear both on the door's scanner display 800 as well as the display 1112 of the AMP of the bay to which door has just been accessed and opened by the customer. When the customer moves from one bay to another, the shopping cart is updated and also travels with the customer and shows all the items that have been removed during the current shopping transaction.

The invention may also include a common behavioral rules algorithm, which alerts the system when a customer's behavior conflicts with the pre-programmed system's behavioral rules. In such cases, the system may use the AMP 1100 to play an audio warning message, display a written character message or activate an alarm as well as the customer service's remote viewing feature.

Typically, the automated store outlet is monitored with surveillance in order to provide security from theft and destruction of the automated store outlet. Additionally, such surveillance devices may be equipped with remote viewing features, allowing customer service to remotely view the store location and assist customers with live assistance while they are shopping at the ASO. Such surveillance may include cameras, speakers, and digital displays which may be separate from or a part of the door access units 26 or AMP 1100.

The system may also incorporate motion detectors that alert the system when a motion is detected immediately adjacent to the ASO or a portion of the ASO, such as near a bay 22. The door access unit scanners 26 may include such a motion detector and/or the AMP 1100. The detection of motion may activate certain aspects of the ASO, such as illuminating one or more bays of the ASO, turning on surveillance equipment, cameras, etc.

The door access unit 26 may also be able to scan identification codes of the item itself, such as UPC barcodes or the like. This can be used by the customer to verify the identity of a product and its price. This may also be used in order to return an item to its appropriate spot within the bay 22. Such scanning of items may also be used during inventory fulfillment. Scanning a product's UPC or other code may also display additional information about the product, such as ingredients or other characteristics.

In some cases, the system may require the customer who desires to return an item to a tray of a bay to scan the UPC or any other type of identification code that is printed on the item, by using a nearby scanner, in order to facilitate the return and to remove that item from the customer's shopping cart. At that time, the customer will be required to open the door and scan the UPC or any other type of identification code that is printed on the item and then return the product or item to its proper location on the tray. The system will verify that the scanned item matches the product's assignment which is associated with the compartment that the item was returned to and issue the credit to the customer. If the customer wishes to return a product or item after the transaction is closed, the return may require customer service assistance.

The activity history of each sensor is saved on the local computer system (LCS) of the ASO. Therefore, at any time a specific sensor report can be generated showing all removals and/or replacements associated with such sensor as well as the information of the customer who removed the item or replaced the item and the date and time that this occurred.

If the system detects suspicious behavior, the system may use audio and/or visual messages requesting that the customer scan the one or more items that were removed from the trays by using the nearby scanner, in order to confirm the accuracy of the transaction. Such a request may be with a live customer service agent.

Figure 12:
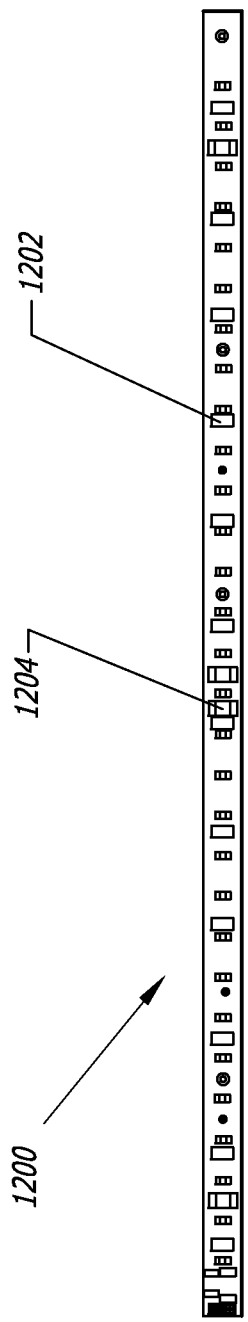
FIG. 12 is a top view of an LED strip having a plurality of electronic components and LEDs thereon and used in accordance with the present invention.

With reference now to FIG. 12, light strips 1200 may be disposed on a lower portion of the AMP in order to eliminate the items on the tray or within the bay below the AMP 1100. Such light strip 1200 may include various electronic components, including visible LED lights 1202, and non-visible LED lights 1204, such as infrared LEDs. Such infrared LEDs 1204 may be repeatedly pulse-illuminated in order to improve detection thereof by sensors. Such light strips 1200 are also on the bottom of the trays.

Upon identifying the customer and opening the lock of that bay's door, a display screen of the electronic door access unit 26 may display the customer's remaining balance and the customer's current virtual shopping cart. When the door closes, and is locked the screen clears again waiting in standby for the next customer to enter an ID and be authorized before presenting such information to that customer.

If a customer does not have sufficient funds in his account or if the customer's shopping amount exceeds the amount that the card was qualified for during the check-in process, a message will be provided to the customer, such as on the door access unit's display, AMP display or other display of the bay or ASO, notifying the customer that he has exceeded his authorized shopping amount. Customer service may be notified and be able to intervene via a video or audio connection. The customer will be allowed to provide a different payment option or supplement the existing payment option in order to continue to shop at the ASO.

With reference again to FIGS. 5 and 6, the customer that accesses and opens the door to that bay can remove any item from the bay's trays. The customer that opens the door is responsible for all items removed from that bay until the door is closed and locked. As items are removed from the bay, the product's name, description and price are added to the customer's virtual shopping cart 50, which may be displayed on the door access unit's display screen as well as on the AMP display screen. This is illustrated in steps 62 and 64 of FIG. 6. As the customer removes an item 70 from the tray 28, sensors detect the removal of the item 70 and the system is able to determine exactly the product name, description and price of that removed item 70 so as to add it to the virtual shopping cart 64. As described above, the virtual shopping cart may also be provided in real time on the user's mobile electronic device, such as a smart phone, display screen, as well as on a screen associated with the electronic unit scanner 26, the AMP 1100 and/or the display screen 14 associated with the check-in station 12. This may be automatically displayed, or only displayed if requested by the customer.

Thus, as the customer removes an item 70 from the tray 28 of the bay 22, the system detects, in real time, which product was removed and logs such product as a "pending sale item" in the virtual shopping cart of the identified customer that opened that door. The system detects the removal and identifies the products that get removed based on the preconfigured database information of each compartment of the tray. Detection of the removal of products can be accomplished by using any optical or electrical sensor system or any digital measurement system and/or by using any RFID or NFC identifying tag system as well as any other suitable sensor technology.

If the customer returns the item 70 to the tray 28, the system in real time removes that item from the customer's virtual shopping cart. In some cases, if the customer wishes to return the item to the tray before closing the door, the customer must return the item to the same location that the item was removed from. In some cases, if the customer does not return the item to the right location, credit may not be issued for such return and an alarm and/or voice announcement will request the customer to move the item to the correct location. The misplaced item will be logged and if not corrected by the customer, such compartment's product may be automatically updated by the software. If the software is unable to update the database, the software issues a notice to the maintenance crew indicating such misplaced product. In the use of some sensors, such as RFID tags or the like, the location of each product is less critical and such functions are modified accordingly based on the situation of each occurrence.

As indicated above, the customer's shopping cart will travel with the customer from one bay to the other and shown on one or more displays associated with that bay so as to show all of the pending sale items which were removed from each bay, until the current transaction is closed. A customer may remove multiple items from multiple bays and be charged for these items under a single transaction. Furthermore, since there is typically a single transaction fee involved with each credit card or debit card transaction, the ability to consolidate the removal of all products from multiple bays into a single transaction saves cost to the operator of the ASO since only one credit/debit card transaction is processed and only one fee is charged instead of a fee each time one or more items are removed from each bay.

With reference again to FIG. 5, when the customer releases the door handle, the door will automatically close and lock 52. In a particularly preferred embodiment, the glass door 24 in front of each modular bay 22 is a biased, self-closing spring door which will close automatically upon releasing the handle of the door. When the door is fully closed, the locking mechanism detects that the door is completely closed, and then at that time the system activates the electric deadbolt to lock the door.

Figure 13:
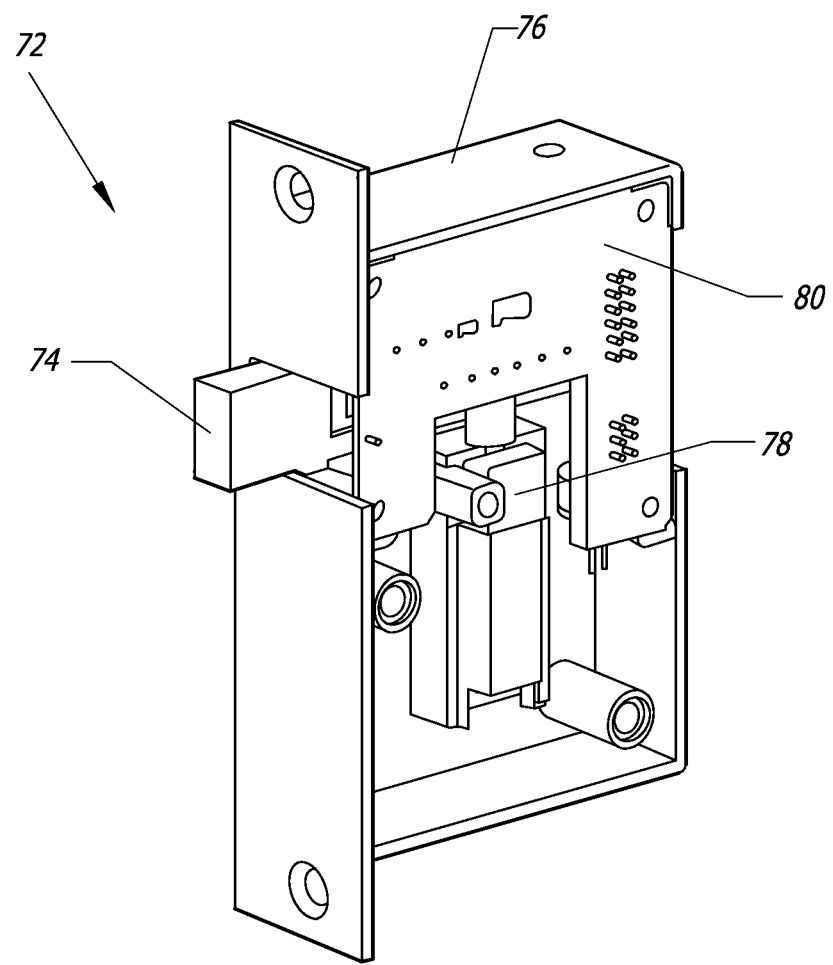
FIG. 13 is a perspective view of an exemplary locking mechanism used in accordance with the present invention.

With reference now to FIG. 13, such an electronically actuated deadbolt lock 72 is shown. A deadbolt 74 is selectively moved from an open to a closed and locked position as dictated by electrical current, electrically generated signals, etc. In one embodiment, the door includes a metal magnetic strike plate designed to accommodate the deadbolt 74 of the electrical locking mechanism 72, as well as to activate a reed switch in the lock when the door is fully closed. The electrical locking mechanism 72 as illustrated in FIG. 8 may include a unit case 86, the deadbolt 74, motor and gears 78 for moving the deadbolt 74, and circuitry 80, including any limit switches, magnetic reed switches, etc. for detecting the closing of the door, receiving signals from a computerized controller, etc. Typically, limit switches, reed switches or the like detect the position of the door at all times. The magnet on the strike plate is positioned to activate the reed switch when the door is fully closed, and at that time the control board activates the motor to slide the deadbolt and lock the door. The locking or unlocking of the bays' doors is typically based on commands from the main central control board 90.

If the customer wishes to open the same door, after it is closed and locked, the customer must repeat the above-indicated steps. That is, the customer must scan his or her card, electronic device, provide a biometric scan, enter a proper code, etc. while in the present mode. Once again, the central control board or LCS activates the motor and gears 78 and pulls back the deadlock 74 so as to unlock the door and allow the customer to open the door and remove items from the bay 22.

With reference again to FIG. 5, when the customer has removed all desired items and is finished shopping, the customer may either manually close the transaction and receive a printed receipt at the check-in station, or leave without closing the transaction and the system will automatically close the transaction after a predetermined amount of time of inactivity by the customer 54. As illustrated in FIG. 6, the customer may return to the check-in station and present identification to view the virtual shopping cart and close the transaction and obtain a printed receipt, if desired. Upon scanning the customer's ID card, or providing other identification into the check-in station, the system displays the particular customer's virtual shopping cart which lists all the items that the customer has removed from the one or more trays within one or more bays under one pending transaction. The customer may review this list and then click exit to complete the transaction. By clicking exit or okay, the customer acknowledges the accuracy of the virtual electronic shopping cart at the time that the system closes that shopping transaction. If the customer initiates a dispute with the live customer service agent regarding any items listed in the electronic shopping cart, the customer service agent will resolve the dispute and the transaction will be closed by customer service. If live customer service is not available, the transaction will be closed and the customer will be requested to submit the dispute to customer service by phone, email, or other available communication method.

However, if the customer wishes to not spend time to review and close a transaction, the customer may simply walk away from the ASO and after the system detects that the customer is no longer active within the ASO for a predetermined period of time, the system closes the particular shopping session automatically, and charges the customer for the items removed and shown in the virtual electronic shopping cart. In such case, instead of a printed receipt, a receipt may be sent electronically to the customer, such as via email, text, etc. This is particularly desirable for the customer who elects not to manually close the transaction at the check-in station 66. After the transaction is closed, the software and LCS computer system removes the customer from the present mode 68.

As indicated above, the method of requiring a second identification and verification at each door of each bay allows multiple numbers of customers to shop at the ASO simultaneously. The system, in real time, differentiates between each customer's virtual shopping carts based upon the customer's access to a given bay and the removal of given items within that bay, and accurately charges each one of the customers for the products that each customer removes from each tray after opening the bay's door. The purchase data from the ASO is relayed to a central control center, such as the MCNF 36 illustrated and described above in FIG. 4.

Also, as mentioned above, in small ASOs, when only one person can shop at a time, the door scanner electronic units may not be required. In such situation, the identified and qualified customer is assumed to be the only person that opened a door during the one person shopping session and that the customer has removed items from the one or more bays. Thus, the identified and qualified person is the responsible party for all products removed from any tray and bay during the shopping session.

In such case, the shopper may be required to unlock a given bay door by depressing a button, such as a lit green button. The other doors will remain locked to prevent third parties from opening the doors and removing items from other bays. Thus, only one door can be open at any given time for security purposes. If there is only one bay with one door, such may not be necessary and the door will be unlocked for the customer immediately upon becoming identified and qualified.

In such case, in order to prevent more than one customer attempting to log in at a given time and/or to force the customer to manually close a transaction, a motorized card reader might be used to hold the customer's member card, credit card, or debit card until the shopping session is completed and the customer closes the transaction manually using the check-in station's touch screen and the customer's account is charged. This will require that the customer manually close the transaction by viewing the virtual shopping cart and approving the transaction. After the transaction is closed and the customer's account billed, the motorized card reader releases the customer's card and the system shifts to standby mode ready for the next customer. In the event that the customer uses biometric scanning, an RFID or other swipeable card, the customer merely closes the transaction by pressing the okay or other such indicating button at the check-in station's touch screen and after charging the customer's account, the system will shift to standby mode ready for the next customer. A printed receipt or an electronically emailed receipt will be provided to the customer.

Figure 7:
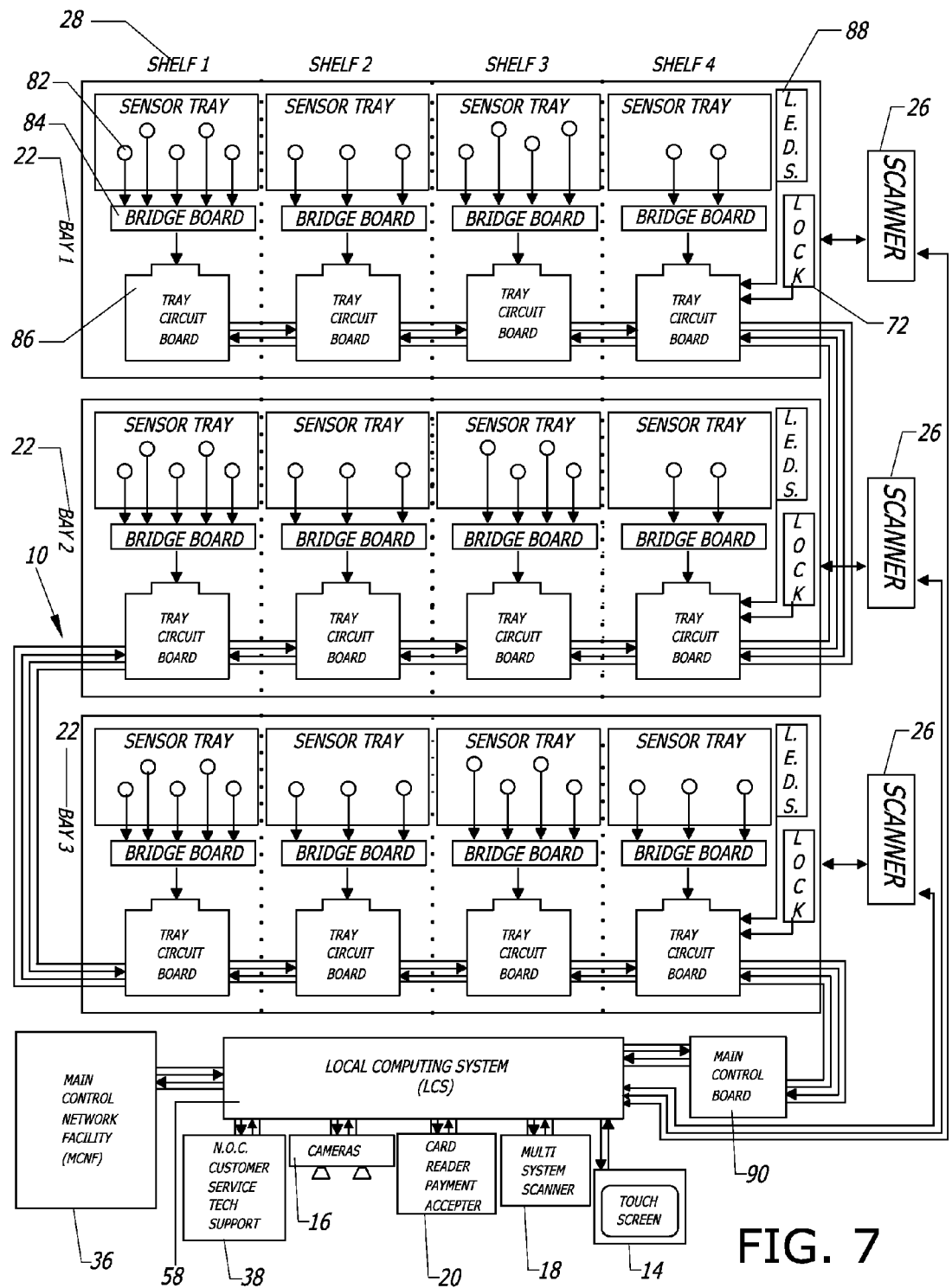
FIG. 7 is a diagrammatic view illustrating various components of a typical automated store outlet of the present invention.

With reference now to FIG. 7, a schematic diagram is shown illustrating the interconnection of the various components of a typical ASO 10. Three bays are shown for purposes of explanation and illustration. Each bay is shown with four shelves or trays 28. Each bay 22 is shown with the corresponding electronic scanner unit 26, lock 72, and LED lights 88.

The check-in station 12 components of a display screen 14, camera 16, scanner 18 and/or card reader payment accepter 20 is shown communicating with the local computing system (LCS) 58. The LCS 58 communicates with the MCNF 36, NOC, customer service tech support unit 38, etc. However, as discussed above, the fundamental functions of the ASO may be performed locally at the ASO 10 to prevent the ASO from not being able to function and perform transactions in the event of network disruptions, which would otherwise occur if the system were based on a cloud or remote computing system. Moreover, in order to ensure the ability to service customers efficiently and to have the fastest function responses at all times and in order to avoid down time due to Internet interferences and outages, the ASO computing system's LCS is locally placed. Nevertheless, when the network is operating, the LCS is in constant communication with the MCNF, which is a cloud-based or remote computing system, to exchange data and to facilitate transactions, as well as to download or upload all settings, configurations, reports and/or other technical or administrational data. The LCS conducts multiple functionalities simultaneously in the operation of the ASO, which includes identification and qualification of customers, the operation of the locking mechanisms and detection of removed items, applying charges, surveillance video, as well as all other customer interactive media functions such as video and audio live conferencing. Therefore, the LCS 58 consists of at least one suitable high grade computing system to accommodate such functionalities locally, without delays, and the outages or interferences that may occur by using only a cloud or other remote computing systems.

As will be more fully discussed herein, each shelf or tray 28 includes a sensor tray 82 containing one or more sensors which detect when an item is removed from the shelf or tray 28. This is relayed, typically via a bridge board 84 to a local tray circuit board 86 and then further, to a main circuit board 90 which directly interfaces, or is even part of, the LCS 58. The tray circuit boards 86 may be interconnected in series, as illustrated, or may all be directly connected to the main control board 90 and LCS 58. However, given the arrangement illustrated in FIG. 7, if a single sensor tray, bridge board, tray circuit board or the like malfunctions, this malfunction does not affect the operation of the remaining trays or shelves 28, and particularly the other bays of the ASO 10.

The ASO's electrical functionalities are controlled by the main control board 90 and the tray circuit boards 86, which together communicate with software programs operated by the LCS 58 and the MCNF 36. Upon detecting any changes, such as removal or placement of products on or off the trays 28, a signal is generated, reporting, by a serial data string, RS 485 or other protocol, such activity to the main control board 90. The center or main control board 90 communicates with the LCS 58 which utilizes a local database to determine which item was removed from or placed on and applies such activity to the proper present customer's virtual shopping cart.

Additionally, the main control board 90 and tray circuit boards 86 or a circuit board located in the AMP 1100 activate the bright mode LED lights 88 and 130 whenever the system shifts to purchase mode or when any bay's door is opened. The LED light may dim when the bay's door is closed. Also, a control board, such as the main control board 90 or another control board such as an LED top control board within the AMP 1100, controls the locking mechanism's open and close position.

A control board, typically within the AMP 1100 also manages the climate control of each refrigerated bay. The climate control system enables the bay to comply with the requirements of the health and food authorities which relate to the display and sale of perishable food items. Sensors are used to detect the temperature inside the bays, and the control board is used, in conjunction with the refrigeration unit, to control the temperature inside the bay. Each refrigerated bay contains a PCB control board and a climate control system. When the temperature in a refrigerated or frozen bay rises over a predetermined temperature, corresponding to a temperature dictated by the health and food authorities, the system indicates that information via the main control board to the LCS. The LCS will keep the door of that bay locked in order to prevent sales of items from that refrigerator/freezer until the situation is fixed by the operator. If the bay's temperature, however, does not reach the predetermined critical level, but exceeds a desired level, the system may activate the bay's fan to exhaust heat, and otherwise activates the refrigeration system to refrigerate and/or freeze the contents of the bay as needed.

Software operates the NOC and customer service interfaces 38. Such interfaces include the interactive features allowing the customer to communicate live through audio and video conferencing with the company's customer service or the network operating center. By touching the proper area on the touch screen monitor 14, a customer can initiate an audio and video conference call with customer service. Customer service agents appear live on the screen and help customers' needs. Additionally, the software allows the customer service representative to remotely lock or unlock doors, turn on or off the LED lights, charge or credit a customer's account, add funds to a customer's account when the customer wishes to replenish their account balance, etc. Furthermore, customer service has access to the remote viewing function allowing customer service to view the ASO site remotely such as via a display, camera, or the surveillance system.

Each ASO is equipped with surveillance video cameras. The surveillance video cameras may be affixed to the front fascia of the ASO structure. Such cameras are used to film and record the activity in front of the bays and within the area surrounding ASO. It is contemplated that in addition to such surveillance system one or more display screens be provided, such as within each bay, that show what the surveillance video camera is filming, including the user who has opened the bay door and the one or more items that are removed from the bay. Additionally, one or more cameras may be provided in each bay, such as under each tray, and under the AMP 1100 to film and record the customer's hand movements and the removal or placement of each item from the tray or bay. Such cameras may be activated only when the system detects motion, and such video may also be displayed on the AMP's video display while the door is open to that bay. All video sessions are stored on a local computer or DVR and can be viewed locally or remotely. If any bay's door is opened without the proper command from the main control board 90, a security alarm is activated and customer service remote viewing is turned on. All customers' activities are fully logged in or saved. In the event that any tampering is discovered, management can view the activities log and the video recording to determine who tampered with the system. Thus, such a system can also be used to confirm a customer's removal of items from the ASO.

In one embodiment of the present invention, the ASO 10 includes a motion detector. The motion detector may be part of the identification scanner 26, or may be independent and placed at one or more locations throughout the ASO. The motion detector will detect motion of someone approaching or passing by the ASO. In this case, the detection of motion by the motion detector can be used to power on the lights of the ASO, such as the LED lights 88 within the various bays 22, turn on an initial prompt screen at the screen 14 of the check-in station 12, activate the advertising monitor 30, and the like. Moreover, the detection of motion by the motion detector can be used to activate the surveillance video cameras and systems, and actuate live remote viewing for security purposes or even customer service purposes.

All doors are closed and locked, such as using lock 72 of FIG. 13, until such time that a present qualified customer opens any bay's door. A qualified customer can only open one door at a time. Such customer is the responsible party for all items that get removed out of the bay during that time until the door is closed and locked. If any mechanical malfunction or tampering restricts the door from fully closing for more than a predetermined length of time, an alarm will be activated and customer service remote viewing turned on and activated.

Moreover, if qualified customers remove from the trays 28 items that the combined cost exceeds the amount that the customer is qualified for, audio messages may be played through the AMP 1100 requesting the customer return the last items that created the negative balance and exceeded the amount that the customer was qualified for. The customer's profile will be removed from the present mode restricting the customer from opening any additional doors and the local door alarm will activate as well as a remote viewing video and/or audio session will be activated allowing customer service agents to intervene and to request the customer to return the excessive items until the customer balance is sufficient to purchase such items. Additional security measures may be applied as needed.

The system of the present invention may also include a flag warning program, which is used as a warning method against an individual that has tampered with the ASO or conducted any other wrongdoing while shopping at the ASO. One or more flags are issued to the individual for each warning. If that individual receives a predetermined number of warning flags, the person will be restricted from shopping at any ASO and may be prosecuted by the local authorities.

Figure 14:
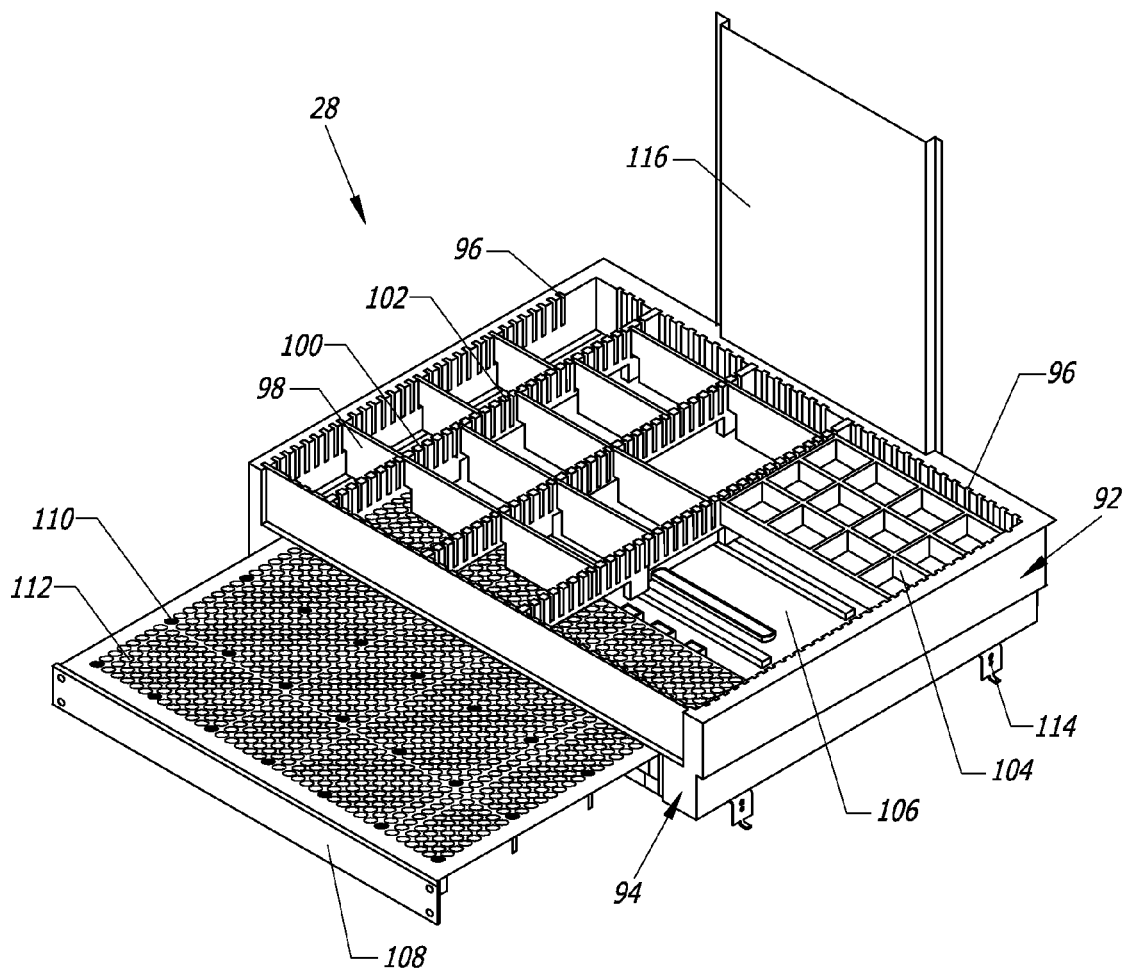
FIG. 14 is a perspective view of a tray used in accordance with the present invention.

With reference now to FIG. 14, in one embodiment, each tray or shelf 28 has an upper portion 92 and a base portion or unit 94. The upper unit 92 is substantially enclosed and has a plurality of spaced apart grooves 96 formed in a wall thereof. The spaced apart grooves allow the selective positioning of horizontal and vertical dividers 98 and 100. As can be seen, at least one of the dividers includes spaced apart grooves 102 for the insertion of the other divider, in this case the horizontal divider 98. The benefit of the horizontal and vertical dividers 98 and 100 is that the size of the compartment for each item can be varied, such that the tray 28 can accommodate items of different sizes. It is also contemplated by the present invention that prefabricated dividers 104 be used which provide a compartment of a fixed size.

For example, the prefabricated divider 104 may be useful for coffee K-Cups®, teabags, or other items of a set and given size. The larger dividers 98 and 100 can be used to form compartments which accommodate items of various sizes, including sandwiches, salads, boxed items, medicine, beauty products, etc. The dividers rest upon a shelf or platform 106, which may be glass, plastic or other clear or light permeable material, which bisects the upper and lower units 92 and 94. Such platform 106 may be polarized in order to only allow light beams from a light source at a given angle or range of angles, and so as to block light beams that may be reflections or are coming from an external source and could falsely trigger light sensors below the platform 106. A polarized platform 106 enables either a visible light source or a non-visible light source positioned at a desired angle, such as immediately above the tray, to activate photosensors below the tray/platform when an item is removed from a compartment. Without the polarized platform 106, reflected light or light which comes into the compartment at various angles could possibly trigger the photosensor, if the item within the compartment is not completely covering the photosensor, thus possibly triggering false activation of the photosensor when an item has not been removed from that compartment.

In the embodiment illustrated in FIGS. 14-18, a sensor rack 108 having one or more sensors disposed therein is positioned within the base unit 94 of the tray 92. Photosensors 110, including IR sensors or receivers, may be disposed within one or more of an array of holes 112 sized and configured to receive the photosensors 110. The photosensors 110 are positioned such that there is a photosensor associated with each tray compartment. Thus, as the item overlies the light sensor 110, the light sensor is occluded from the light source positioned above the tray 92 and the photosensor is not activated. However, once the item is removed, light is received by the photosensor 110, which generates a signal which is received by the tray circuit board 86, and which is relayed to the main control board 90, and LCS 58. It will be understood that the photosensor may comprise an infrared sensor, which detects the presence of an infrared-generated light, such as from infrared LEDs or other light source positioned above the tray 92.

Typically, LED lights are placed above each tray, such as attached to the bottom of the AMP 1100 or the tray immediately above the tray in question. The LED lights can serve a dual purpose in illuminating the items within the tray below the LED lights as well as triggering the photosensors when the items are removed from the compartments of the tray. Removal of the item from the compartment of the tray exposes the photosensor, which sends a signal and is detected by the computer system, which has previously assigned an item to that compartment, and adds that item, and its cost, to the customer's virtual electronic shopping cart. In order to further prevent the possibility of reflected light or ambient light activating photosensors when the item has not been removed from a compartment, or has been placed or replaced into the compartment at a less than ideal position, LED light sources, such as the LED strip 1200 illustrated in FIG. 12 may include both visible light LEDs 1202 as well as non-visible light, such as typically infrared, lights 1204. The photosensor would comprise an infrared photosensor or receiver and detect the infrared light emitted from the infrared LED 1204 when an item is removed from a compartment of the tray. This may be done instead of, or in conjunction with, the polarized sheet of material above the photosensors. Most ambient light within enclosed lighted buildings is emitted in wave lengths ranging from 400NM to 700NM. Commonly used infrared LEDs emit light in wave lengths from 880NM to 1040NM, which is typically out of the range of regular ambient light. By using the appropriate sensors that only detect infrared light, the detector will not give a false reading from ambient light but will be sensitive to infrared light from the infrared LED 1204 shining from above the tray, and the sensor will achieve a proper detection.

However, if the ambient light also includes sunlight, the item detector can be exposed to a much wider range of wavelengths including infrared light from sunlight. Although an infrared sensor or receiver will not detect ambient light wavelengths, it will detect the infrared wavelengths from sunlight and false detection could result. Thus, the system of the present invention pulses the infrared light emanating from the infrared LED, such that the sensor and computerized system can discriminate infrared light pulsed from the infrared LED and sunlight as the infrared wavelengths from the sunlight do not pulse. The computer simply monitors pulsing infrared light to determine if the light was emitted by the infrared LED and ignores the steady infrared light from sunlight or any other source.

However, infrared light from intense ambient sunlight can still pose a problem for item detection by washing out the infrared light emitted by the infrared LED. This problem can be mitigated by reading the analog level of the infrared light and adjusting the detection threshold based on the presence of infrared light from sunlight. A reference detector which is always exposed and not covered by any item monitors the level of ambient infrared light from sunlight and other sources, and the computer compensates by adjusting these thresholds for proper detection.

Brackets 114 or the like are used to attach each shelf or tray 28 to the inside of each bay 22. A cover 116 may be used to position wires, leads, etc. extending from one tray 28 to another, or to the main control board 90.

With reference now to FIG. 15, a bottom view of an exemplary sensor array 108 in accordance with one embodiment of the present invention is shown. It will be seen that the sensor array 108 includes a grid or array of apertures. Each row of apertures 118 is identified, such as with an ascending numeral as illustrated. Each column of apertures is similarly labeled, such as with alphabetical characters. Thus, each aperture of the array has a unique alpha-numeric designation representing the cross-section of the column and row for that aperture. This can be more clearly seen in FIG. 16.

As illustrated and described above, a photosensor 110, which may be disposed within a plug, as illustrated in FIG. 17, is disposed within a given and assigned aperture for the item within a compartment above which an item will be placed. Thus, typically, every aperture will not have a photosensor. Instead, depending upon the type of items and variety of different types of items in the compartments above, the photosensors 110 will be spaced so as to be generally centered with respect to the compartment and the item to be positioned within the compartment so as to be occluded from a light source shining from above the tray 28. FIG. 17 illustrates such a photosensor 110, or a photosensor disposed within a plug, in an inverted orientation, such that the opening of the photosensor is at the bottom of the illustration and lead wires 122 are connected to at least one bridge board 124 so as to relay the signal to the tray's circuit board 86.

Figure 18:
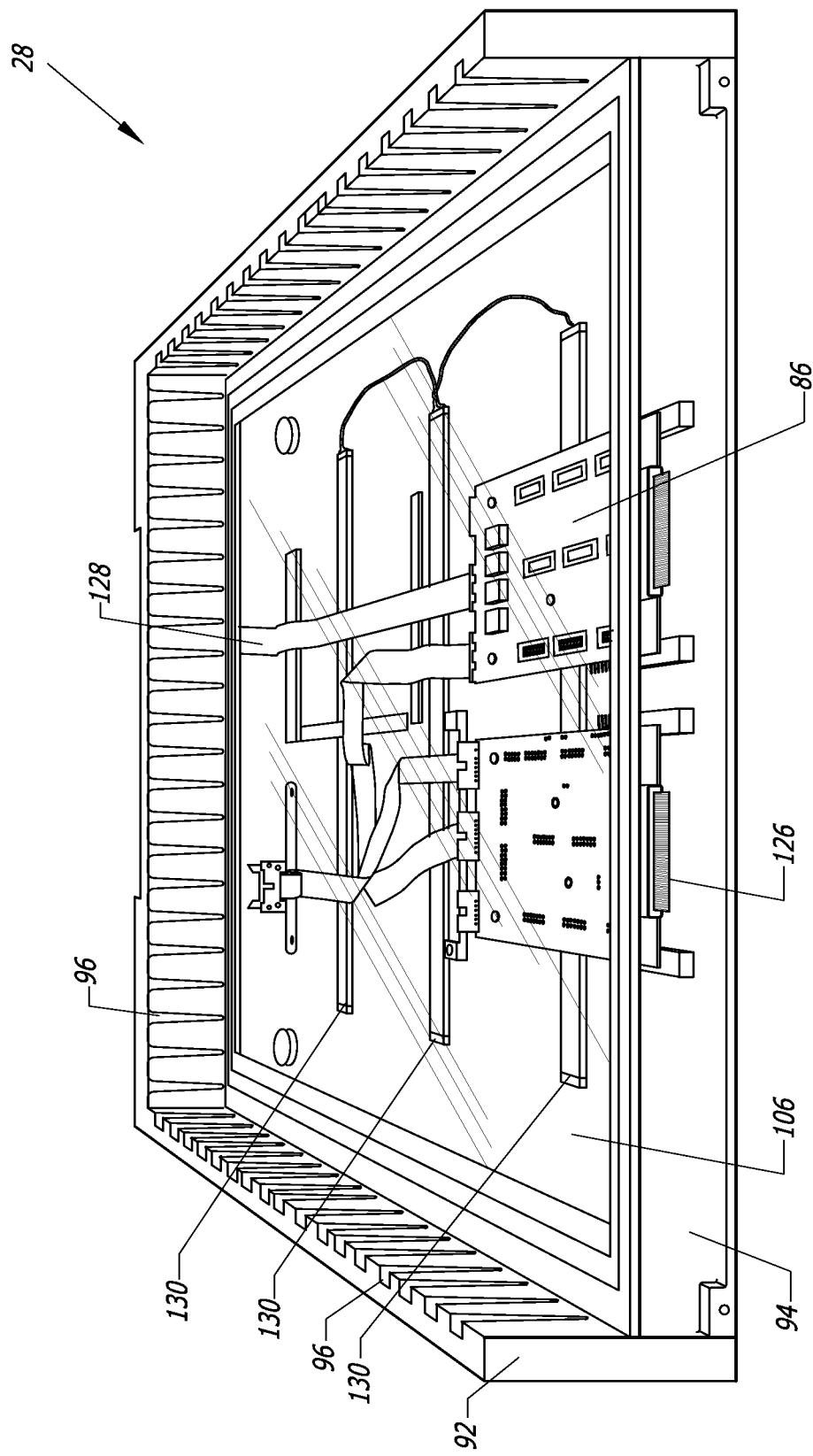
FIG. 18 is a perspective view of a portion of the tray, used in accordance with the present invention.

With reference now to FIG. 18, the base unit 94 of the tray 28 includes one or more tray circuit boards 86 disposed therein. A male bridge board plug 126 is insertable into the female receptacle socket 124 to form a bridge board when the sensor array tray 108 is slid into position so as to interconnect the one or more tray circuit boards 86 with the sensor board array 108. Ribbon wires 128 or the like provide interconnection and communication to the main control board 90.

Typically, LED lighting strips 130 are operably attached to the bottom of each tray 28 so as to illuminate the tray immediately below it. Of course, LED lighting strips or other sources of light can be provided to the uppermost tray, or to all trays 28. As indicated above, such sources of light can be visible and/or invisible light, such as infrared light so as to activate infrared photosensors or the like.

Figure 19:
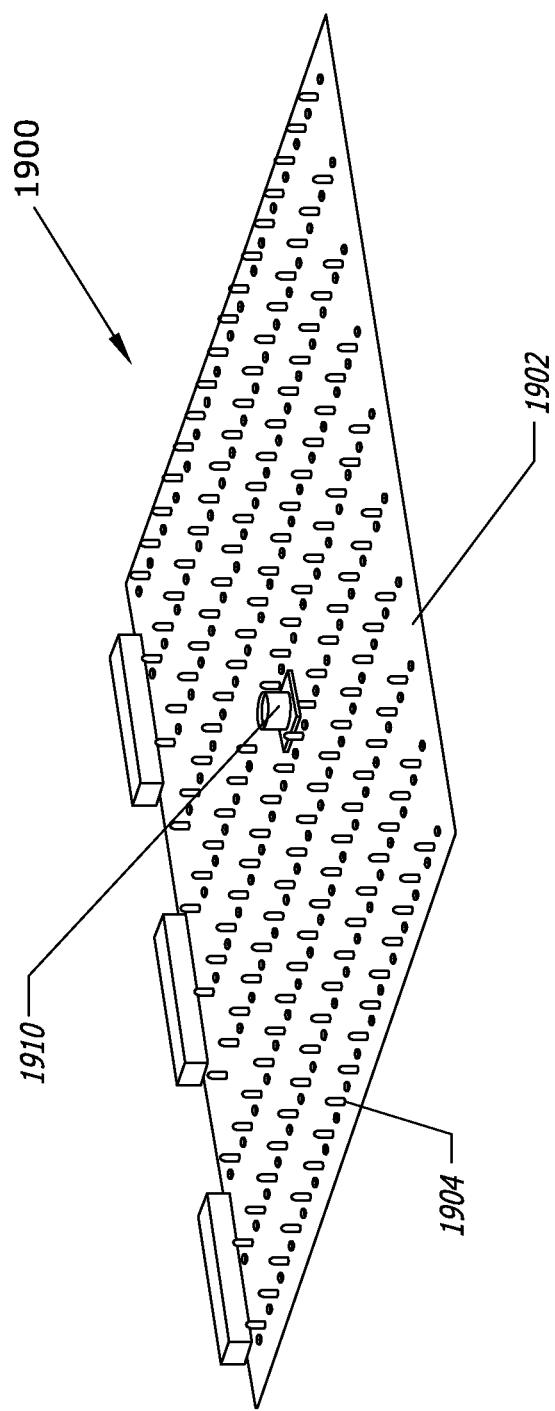
FIG. 19 is a bottom perspective view of a dual-sided printed circuit board used in accordance with the present invention.
Figure 20:
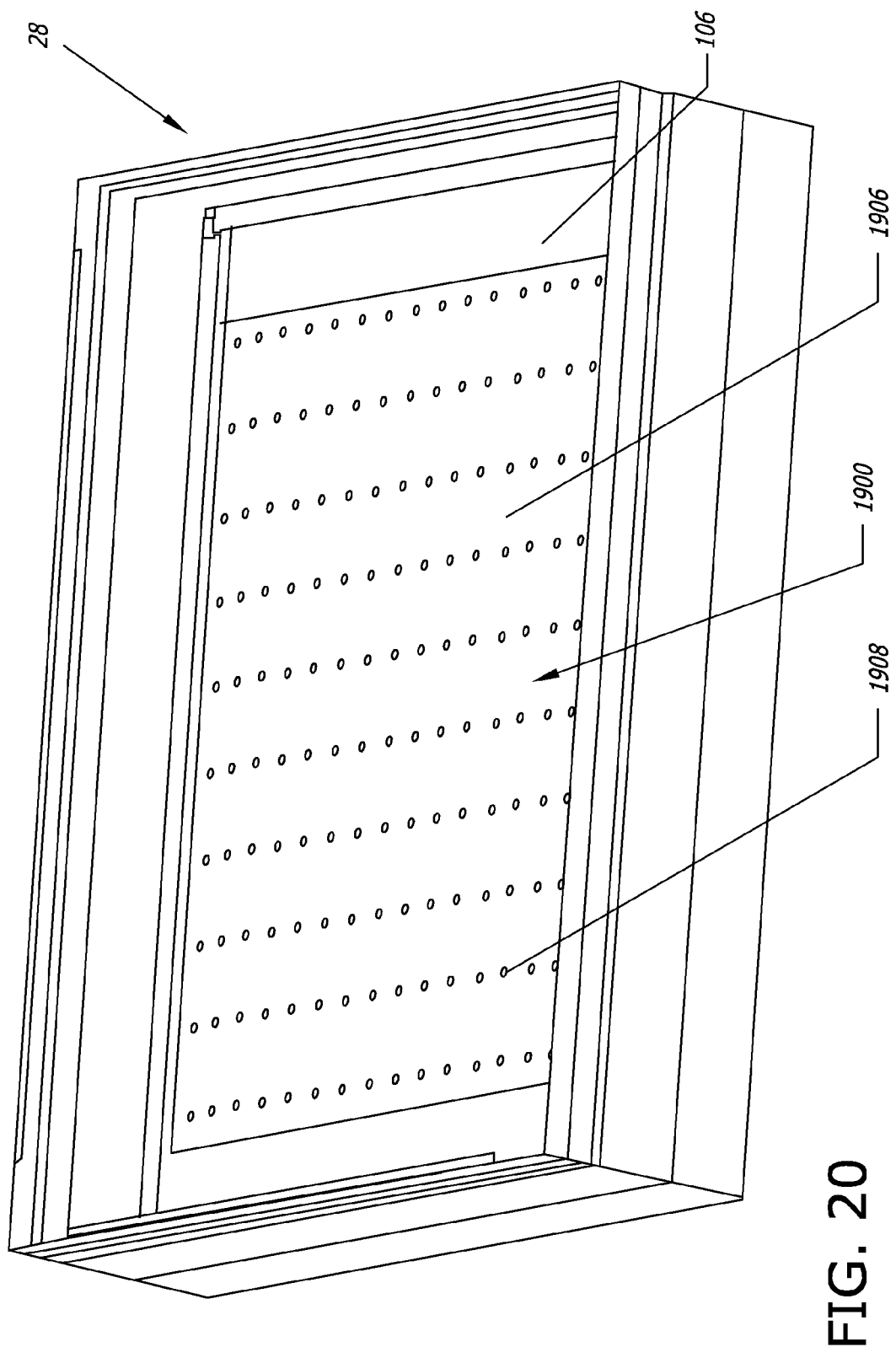
FIG. 20 is a top and front perspective view of a tray, illustrating the top surface of the dual-sided printed circuit board of FIG. 19 therein.

With reference now to FIGS. 19 and 20, as an alternative to the manual setting of the photosensors, as shown in FIGS. 14-18, a dual-sided printed circuit board (PCB) 1900 forming what is referred to herein as an automated tray and sensor system. The PCB is connected to the main circuit board with a wire connection (not shown). The bottom surface 1902 of the DUAL-SIDED PCB includes an array of light emitters 1904, such as LEDs, and typically infrared LEDs, as described above. The LEDs 1904 are spaced apart from one another and arranged in an array so as to cover at least a portion, and typically substantially the majority, of the bottom surface of the PCB 1900. These LEDs 1904 are oriented downwardly so as to shine on the tray below. Similar to that described above, the array of LEDs 1904 may include both white light visible LEDs and infrared LEDs so as to illuminate the product as well as serving as a light source for activating and triggering the photosensors in the tray below when an item is removed from a compartment.

With reference now to FIG. 20, an exemplary tray 28 is shown illustrating the top surface 1906 of the PCB 1900, upon which are arranged a plurality of photosensors 1908 in an array. The photosensors 1908 may be visible light or non-visible light sensors, such as infrared light sensors. They may be generally equally spaced apart from one another, or arranged in a pattern. The pattern forming the array of photosensors 1908 may correspond with an arrangement of compartments in the tray 28.

The PCB 1900 may be placed and disposed below the platform 106, or may include a clear, translucent, polarized or non-polarized sheets of material disposed above the upper surface 1906 and the lower surface 1902 of the PCB 1900. Such sheets may be comprised of a plastic material, which sandwich the dual-sided PCB 1900 and which can be inserted into a bottom portion of a tray 28, such that the upper surface exposing the photosensors 1908 is disposed upwardly into the tray, and the lower surface 1902 containing the LEDs 1904 is facing downwardly so as to face the tray below the PCB 1900.

When using the manual photosensor tray arrays, as illustrated in FIG. 15, the system will direct the location's placement of each sensor under each compartment or pusher by providing the address of the proper hole under that specific compartment. If a preformed compartment tray is used, the system will provide a predetermined format that specifies the location's placement of each sensor under each compartment according to that specific style tray. A system may be used wherein a tray's configuration appears on a screen and the operator can select and "drag and drop" or manually enter the product's description and information into the correct compartment of each tray as it is displayed on the screen. Alternatively, the operator can first set up the configurations of the ASO on the computer system and then apply the physical setup of the ASO and its trays.

However, the assignment of sensors for each compartment under each product item is done automatically when using the automated tray and sensor system illustrated in FIGS. 19 and 20. No manual setting of the sensors is required. When the automated tray system is used, the operator does not need to place sensors manually and the system will assign one or more sensors to each compartment based on the electrical detection the PCB detects when the products are placed into each compartment. If a preformed compartment tray is used, the system may select and apply a predetermined sensor format that was previously designed and has been saved on the system. Initially the operator accesses the setting and configuration program on the MCNF and creates the format setting of that ASO. This includes specifying the number of bays as well as the number of trays and the configuration of the compartments within each tray. Then, the operator may physically set up the trays and placed all product items in each compartment, After the selection of the sensor's format, the system displays the compartment's format on the screen and the operator can select, "drag and drop" or manually enter the product's description and information into the correct compartment of each tray as it is shown on the screen. The system and the tray configuration are then saved on the MCNF and downloaded to the LCS of that particular ASO. Any changes to such configuration can be done by making the changes to the format on the MCNF and then downloading the changes to the proper LCS. Alternatively, a configuration file can be obtained from the MCNF and then manually loaded to the proper LCS.

Under certain protocols, each PCB device must be registered with the system in order to provide proper communication between the system and the PCB device. Such registration requires that the system will receive a signal from the PCB device in order to identify the PCB device and register its identification (ID) within the system. In order to facilitate this registration during setup, a signal can be generated from each tray by exposing a sensor within the tray to ambient or infrared light, allowing the system to detect the activity and save the ID information of such PCB device. The automated tray and sensor system eliminates the need to use many of the elements that are included as part of the manual operating tray. The PCB and its operation methods automatically accomplish all of those manual functions.

Figure 21:
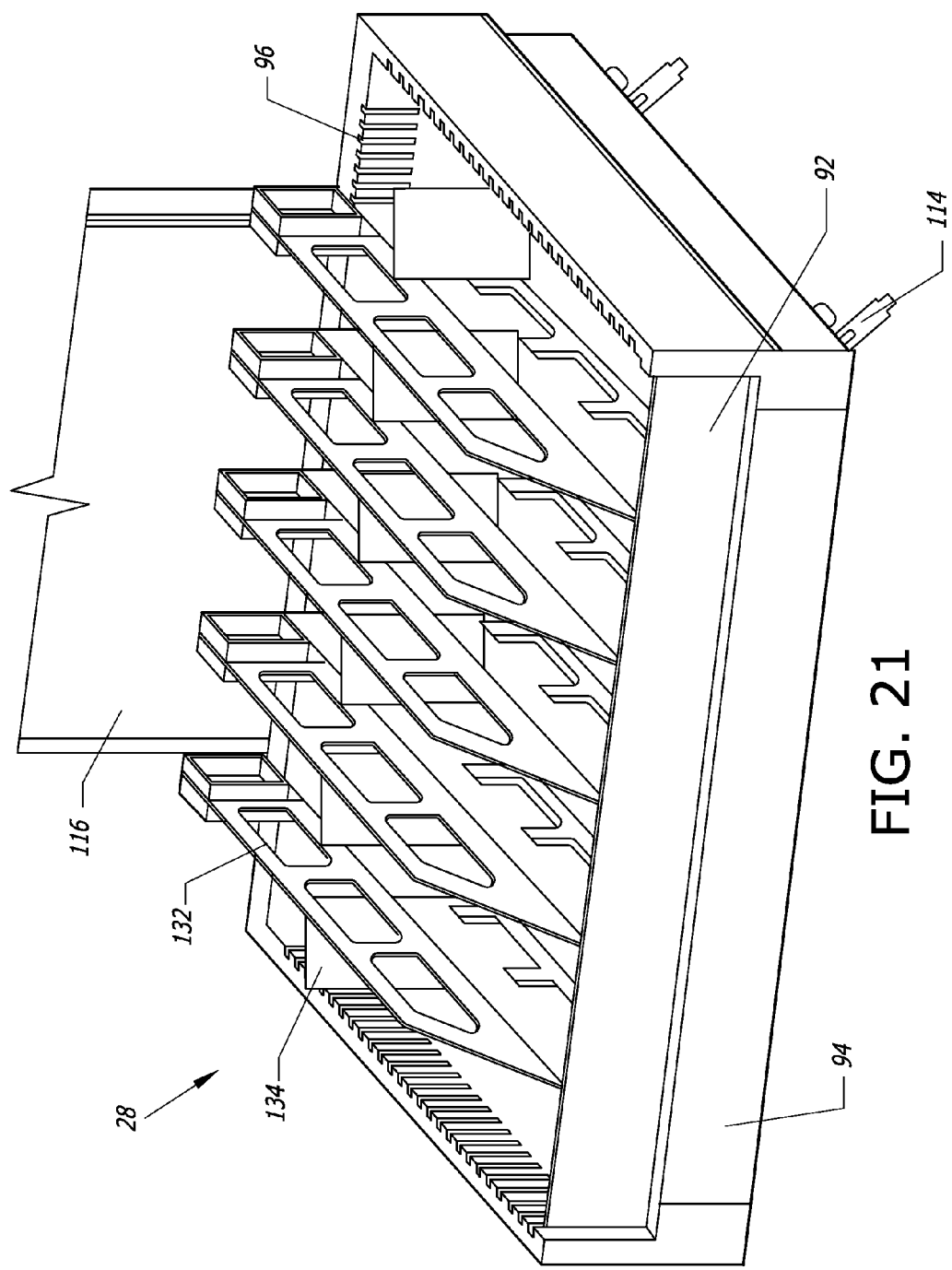
FIG. 21 is a perspective view of a tray having dividing rails and pushers, used in accordance with the present invention.
Figure 22:
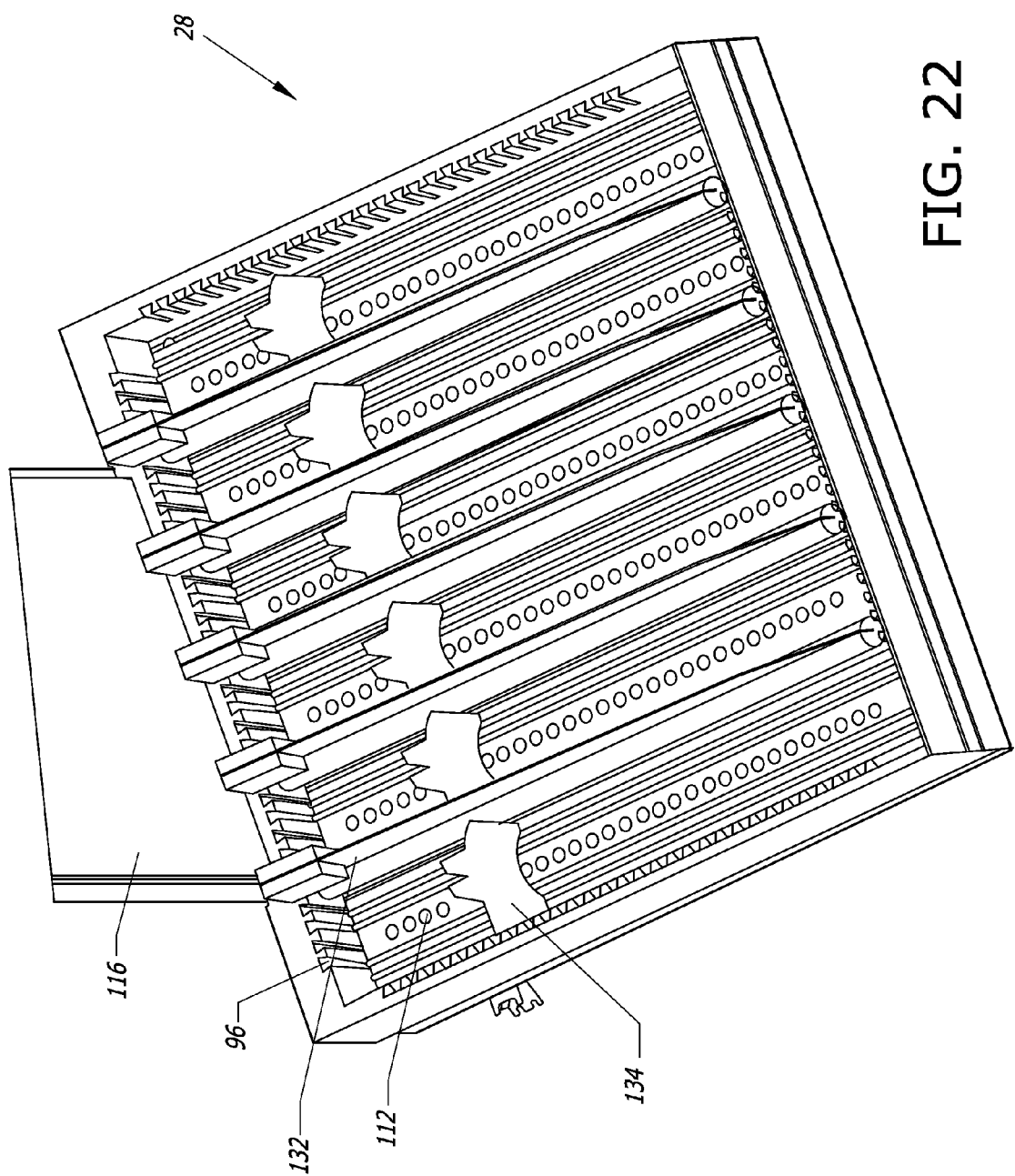
FIG. 22 is a top view of the tray of FIG. 21.
Figure 23:
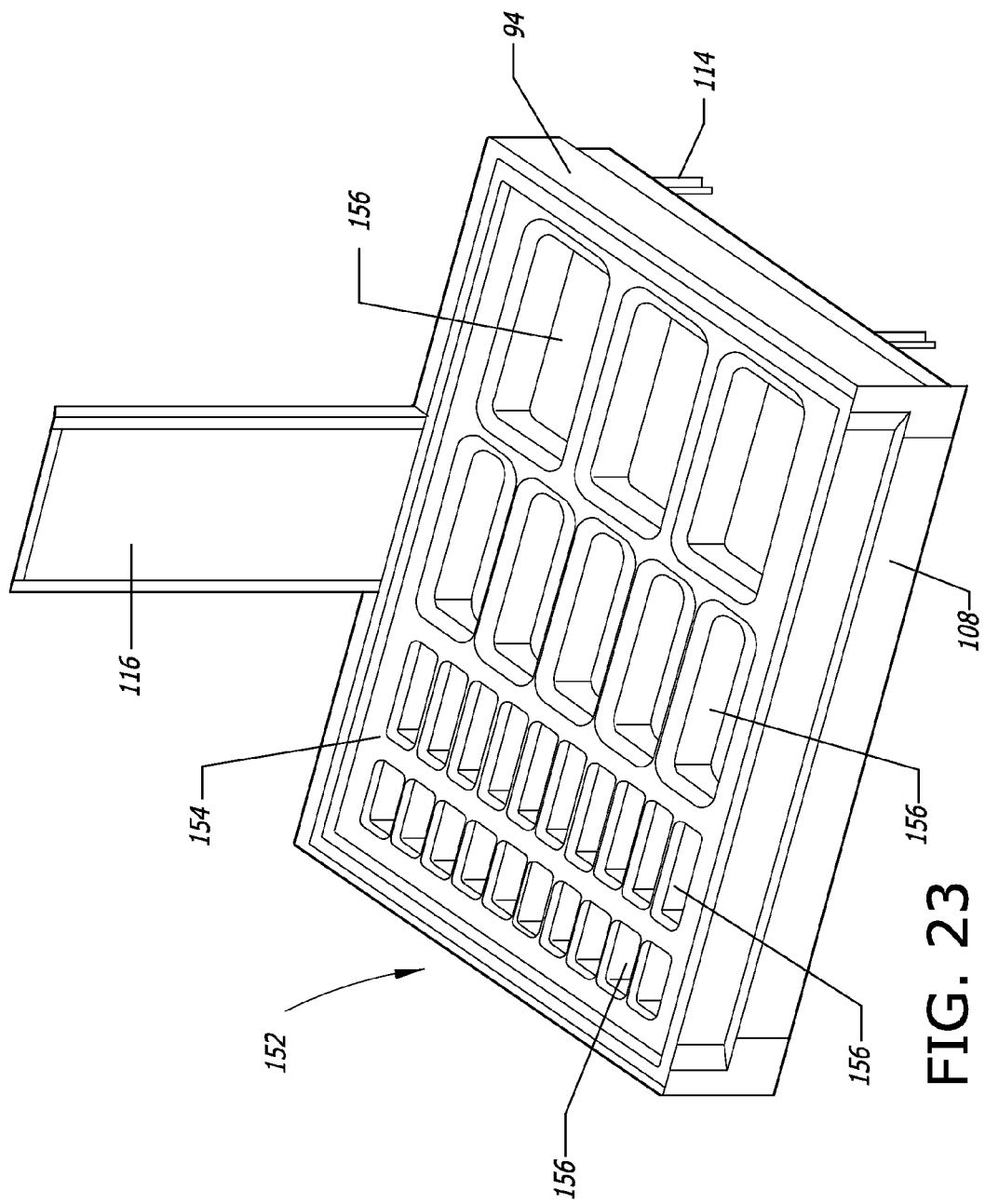
FIG. 23 is a front perspective view of a tray used in accordance with the present invention having molded compartments.

Above the platform 106 or top sheet of the PCB, the compartments can be provided, whether they be preformed or created using the vertical and horizontal dividers, as illustrated and described above. In the case of bottles, cans, or other items which can be positioned in line or in a stacked manner, and pushed forward after the removal of one of the bottles, cans, etc., a rail divider and biased pushing mechanism is provided within the tray 28, as illustrated in FIGS. 21 and 22. Rails 132 are inserted into the grooves 96 so as to form vertical dividers of a predetermined width corresponding to the item to be inserted between the rails. Thus, the rails 132 cooperatively form compartments therebetween. A slider-pusher unit 134 is biased, such as by a spring, to move forward towards the front of the tray 28, and push the row of cans, bottles, etc. towards the front. It will be appreciated that the number of rail dividers 132 can be modified according to the size of the can or bottle, so as to accept larger bottles or cans. Similarly, the slider-pusher 134 can be modified so as to be able to push the bottles, cans or any other items adequately, such as by attaching an extension member, providing a larger pushing surface for the slider-pusher 134, etc.

It will be seen from FIG. 22 that the slider-pusher 134 moves from a back end of the tray 28 towards a front end of the tray. As it does so, one or more sensors disposed therebelow are exposed. A photosensor 110 may be disposed in the aperture which is towards the front of the tray 28, such that as the can or bottle is removed from the front of the row of bottles and cans, the photosensor is activated within a fraction of a second, as the pusher-slider unit 134 pushes the remaining row of bottles and cans towards the front of the tray 28. Alternatively, a row of photosensors 110 can be disposed along the length of the row of bottles and cans, and the photosensors actuated upon removal of the front-most can or bottle, exposing an aperture and photosensor at the rear. However, the photosensors which are rearward of the bottles, cans or other products being pushed by the pusher can be occluded from the light source, such as by the spring of the pusher or a housing or mask which is moved by the pusher as products are removed from the tray.

It will be understood by those skilled in the art that the tray used to hold the items or product within the bays of the unit can be of varying configurations and materials. Such trays can be "universal" in nature such that the size and configuration of the compartments for holding the products can be manually changed and configured. A single tray per bay may be used, or multiple trays for each bay or shelf may be used, including combinations of "universal" configurations, pushers, fixed compartments, etc. It will also be understood that the materials used in connection with such trays can vary and include plastic, metal, etc. The important aspect of the invention is that the tray is able to removably hold the items to be dispensed and be designed so as to work with the sensor system to track when the item has been removed from a particular compartment of the tray, or an item has been removed from a tray of the bay with or without individual compartments.

With reference now to FIGS. 23-26, another type of tray 152 used in accordance with the present invention is illustrated. The tray 152 comprises a sheet of material having a plurality of item compartments 156 molded therein. The molded sheet of material 154 can be placed within the wall 94 of the tray, and be disposed above a sensor array, such as the previously illustrated and described photosensor arrays, such that there is at least one photosensor 110 disposed relative to each compartment 156, so as to determine when an item has been removed from that compartment 156. It has been found that in some cases with a "universal" tray having configurable compartments that the product or item within the compartment either does not adequately cover the photosensor below the compartment or the item has a degree of movement within the compartment such that when the item is moved it does not adequately cover the photosensor. However, a tray having molded compartments, as illustrated in FIGS. 23-26 and the accompanying description therewith, can more securely hold the item in place and better ensure that the item is disposed and rests over the photosensor or other sensor so as to reduce or even eliminate the possibility of the sensor being inadvertently actuated, such as by movement of the item within the compartment.

One way of forming the tray 152 illustrated in FIGS. 23-26 is by using a sheet of thermoplastic material and thermoforming the plastic sheet into the desired mold having the plurality of compartments 156. In order to create the molded sheet of material 154, the plastic sheet is heated to a pliable forming temperature, and then formed to a specific shape of a mold, and trimmed to create the desired tray 152 or tray insert. It will be understood that the tray 152 can be formed by vacuum forming as well, wherein the sheet of material is heated to a forming temperature and stretched onto a mold and forced against the mold by a vacuum. The sheet of material, once cooled, retains a desired degree of rigidity.

In one embodiment, the molded tray 154 is comprised of a material which is light permeable such that light passes therethrough into the photosensors disposed below in the photosensor array rack 108, so as to detect when an item is removed from the compartment 156. It is also contemplated that only a portion of the tray, such as a lower portion of each compartment of the tray, be light permeable or include an aperture 155. The remainder of the tray can be comprised of a light impermeable material or painted or otherwise covered with a light impermeable substance. In this manner, light which may come from outside of the bay, from the sides of the tray, or other leakage of light will not actuate the photosensors, but only the removal of the product from the compartment will allow sufficient light to reach the photosensor so as to be actuated.

Figure 24:
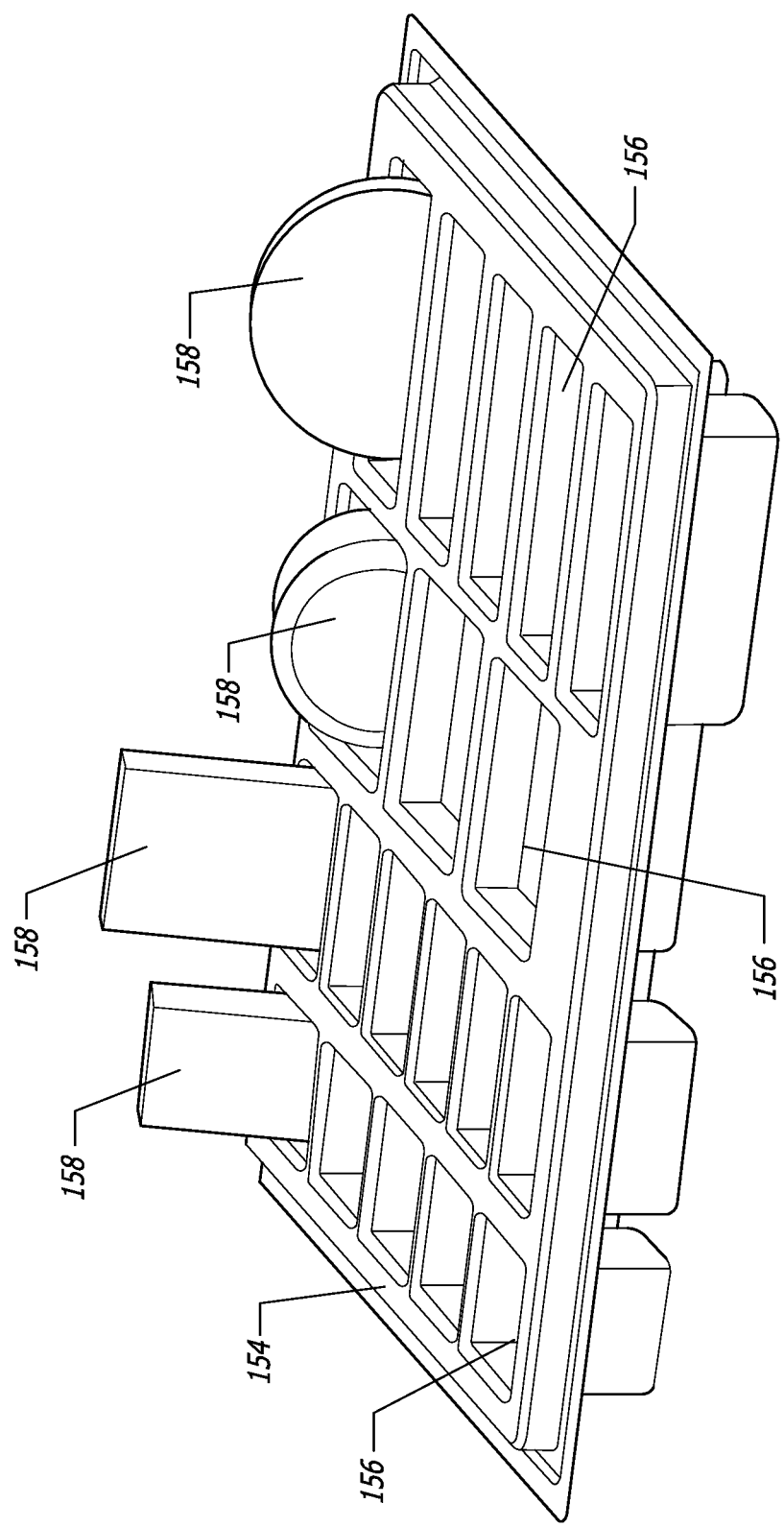
FIG. 24 is a front perspective view of an exemplary molded sheet of material comprising the tray, having a plurality of different objects disposed within the different molded compartments, in accordance with the present invention.
Figure 25:
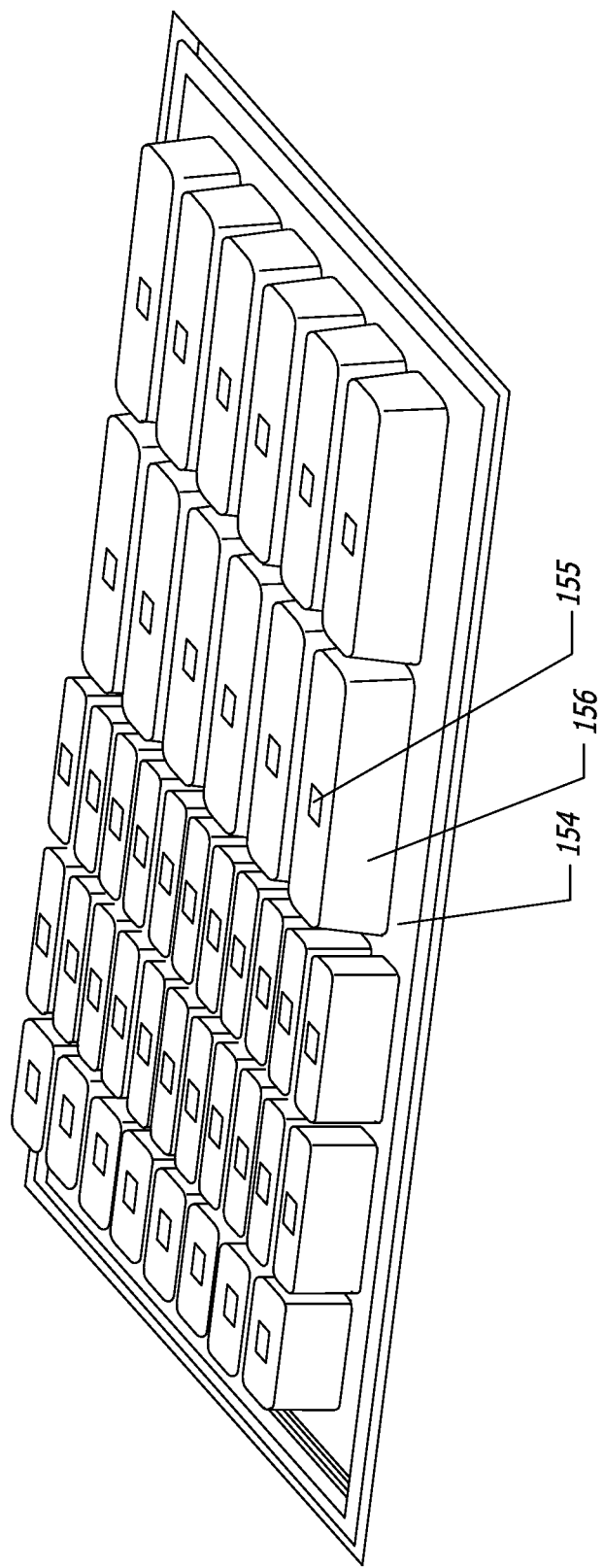
FIG. 25 is a bottom perspective view of a molded sheet comprising a tray of the present invention, having apertures or light transmissive portions.

With reference now to FIG. 24, a molded sheet of material forming the tray 154 is illustrated. It will be seen in FIGS. 23-26 that the sheet of material 154 can have molded therein compartments 156 which are of different sizes and configurations. These enable the removable insertion of items 158 which are different in size and configuration. Typically, the molded compartments at least generally conform to at least a portion of the item 158 to be held within the compartment 156. For example, if the compartment were to hold a generally spherical item, such as an apple, an orange, etc., then the compartment could be formed in a semi-spherical shape. However, if the object were generally cubical, then the compartment 156 could be formed so as to be generally cubical and slightly larger than the item to be inserted therein.

With reference again to FIG. 24, it can be seen that the object on the upper left of the illustration is generally rectangular in configuration. The corresponding molded compartment 156 is of a size and configuration so as to generally conform to at least a portion of the object 156, such that the item 158 may be removably inserted into the compartment 156. It will be appreciated that a compartment may be molded so as to be generally rectangular or square in configuration, yet hold therein items or products which are generally spherical, disk-shaped, or otherwise have a round or curved configuration, but the round, spherical, curved, etc. portions of the product are capable of being nested and disposed within the otherwise square or rectangular compartment in such a manner so as to hold the product therein and prevent the sensor from being actuated until the product is removed from the compartment. The molded compartments 156 can be of different dimensions and configurations, as illustrated in FIG. 24, so as to accommodate items 158 which have a different configuration. Thus, the generally disk-shaped item 158 in the far right portion of FIG. 24 is inserted into a compartment 156 which is of a lesser width but elongated in length as compared to the compartment 156 which is intended for the generally rectangular item 158.

It is contemplated by the present invention that the molded compartments 156 substantially conform to a portion of the item to be held therein, typically a lower portion of the item to be held within the compartment. Thus, in the instance where there are known items which are going to be regularly offered through the automated store outlet of the present invention, molds can be made to represent at least a portion of those items, typically a lower portion thereof, such that those compartments 156 of that particular tray insert 154 may be specific for that item. This can assist both the individual stocking the bay of the automated store outlet, as well as the customer who removes an item and later returns the item, as it will be easier to know which compartment or set of compartments 156 that the object was removed from as the general size and configuration will match that of the item which was previously removed.

However, it will be understood that the compartments 156 need not be substantially conforming to the lower portion of the item to be held therein, but instead can be of more general dimension and configuration so as to accommodate more than one type of item therein. Such a molded tray insert 154, while presenting some limitations as to the types of goods which the molded compartments 156 can accommodate, also can significantly lessen the amount of time and labor required to otherwise create the compartments such as that illustrated in connection with FIG. 14 which are more universal in nature due to the interconnection of the vertical and horizontal dividers which can create compartments of a wide variety of sizes so as to accommodate a wide variety of different items placed therein. Use of the molded compartments 156 also reduces significantly, or even eliminates, the possibility of the sensor, such as a photosensor, from being inadvertently actuated by shifting or movement of the items, such as when a bay door is opened and closed, a user's hand bumps a product, etc. which without the molded compartments could cause the product or item to shift sufficiently so as to permit light to reach the photosensor and activate the sensor, leading to the system counting the item as having been removed by the user. Use of an opaque, painted, or otherwise non-transmissive sheet 154, the incorporation of the areas or portions which are light permeable, or the apertures, 155 further reduces potential error.

Figure 26:
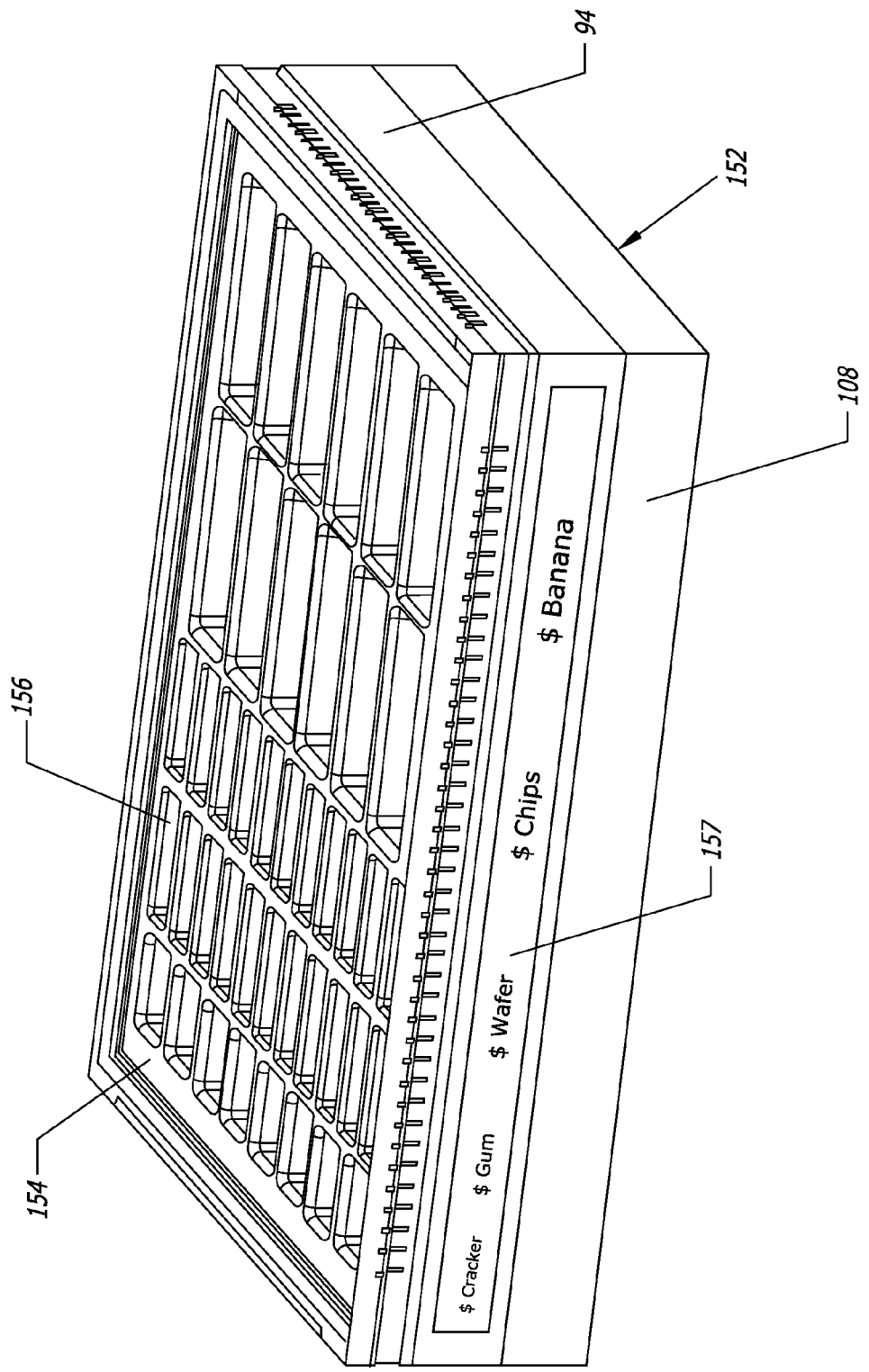
FIG. 26 is a front and top perspective view of a tray used in accordance with the present invention.

With reference now to FIG. 26, the invention contemplates incorporating one or more digital displays 157 as part of the tray for identifying the items within the tray and the cost thereof (illustrated in FIG. 26 by designations such as cracker, gum, wafer, chips, and banana with the $ designating the price of the item). The digital text displayed on the display unit 157 could be changed over time to reflect changes in the prices of these items or the items stored within the tray.

Using the photosensor system described above, as soon as an item is removed from a compartment, so as to expose the photosensor 110 to a light source, a signal is generated. The system knows which photosensor 110 was activated, and the compartment to which it was assigned. From the specific compartment, and the previously arranged items with respect to the tray and sensor tray 108, the system is able to determine exactly which item was removed from which compartment, identify the item, and provide its cost to the customer in the virtual shopping cart. If the customer returns the item back to the compartment from which it was removed, then the shopping cart will delete that item from the shopping cart and not charge the customer for that item.

It will also be appreciated that the present invention could utilize other sensor technologies. For example, the bottom sensor in FIGS. 21 and 22 may consist of reed switches and the pusher unit may have a magnet attached to its bottom. Each position of the pusher 134 will activate a reed switch below. Based on the indication of which reed switch is activated, the system will determine the number of product units that remain in the slider-pusher compartment row.

Of course, the sensor tray can also be made to include RFID antennas and/or an NFC system or any other sensor technology which is capable of accurately and very specifically detecting the removal of a particular item from the tray 28. Utilization of different sensor technology will provide for the identification of each item removed, such as the removal of a tag attached to an item within the reading distance of an NFC or RFID sensor. However, the system when restocked has the items arranged so as to correspond with sensors within the tray 28 of that particular bay 22 so that the location and identity of the items may be tracked.

Figure 27:
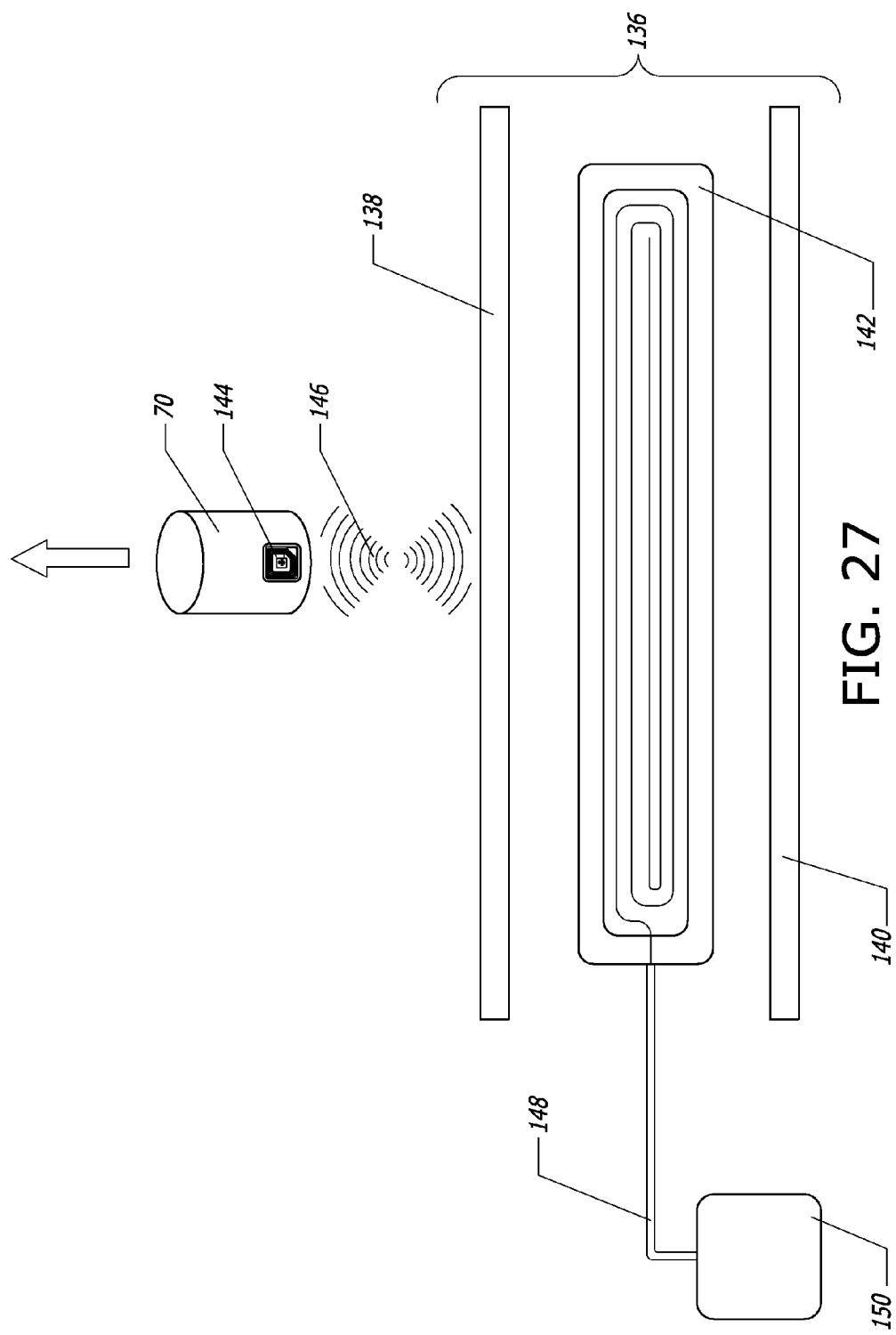
FIG. 27 is a partially exploded and diagrammatic view of the detection of an item removed from an RFID-based sensor tray, in accordance with the present invention.

With reference now to FIG. 27, an RFID sensor tray 136 is shown. The sensor tray 136 typically includes a cover 138, a base 140, and an RFID antenna device 142 sandwiched between the cover 138 and base 140 so as to form a single unit. This unit, which is typically generally rectangular, replaces the sensor tray 108 illustrated in FIGS. 15-20. Typically, it would still be slid into the appropriate slot or compartment of the base 92 of the tray 28, such as below the shelf 106. The tray 28 may still include dividers and compartments, as illustrated and described above with respect to FIG. 14, and tray circuit boards 86, as illustrated in FIG. 18, for other purposes such as controlling the degree of lighting within the bay, acting as an interface with the scanner or reader 26 associated with each bay 22, etc.

With continuing reference to FIG. 27, items 70 are disposed and arranged in the tray, typically within divided compartments, but utilizing the RFID technology of this embodiment this is not necessarily the case. Each item 70 has an RFID tag 144 attached thereto. When the item 70 is removed from the tray, as shown by the upward directional arrow in FIG. 27, a signal 146 indicates that the item 70 and RFID tag 144 have been removed, which is detected by the RFID antenna 142, which sends a signal via a cable 148 to an RFID reader 150. Typically, the RFID antenna device 142 periodically sends a signal 146 to detect the presence of the RFID tags 144 on the items 70 associated with that tray. When an item 70, and thus its attached RFID tag 144, is removed, this removal is detected and the signal sent to the reader 150.

The reader 150 may receive input from multiple RFID antenna devices 142. Typically, there is a single RFID antenna device 142 associated with each sensor tray 136, which is used for each tray 28 within a given bay 22. Thus, for example, one or two readers 150 may be required for each bay 22 depending upon the number of trays 28 within the bay 22. The reader 150 then relays this information to the LCS 58.

The identity of the item 70 is determined. This may be due to its placement within a compartment on the tray 136, the fact that all items on a given tray 136 are the same, or the RFID tag 144 specifying the identity of the item 70, or by any other satisfactory means. In this manner, the identity of the item and its cost is provided to the customer in the virtual shopping cart 64.

Alternatively, a product image recognition software system (PIRS) may be used to detect the presence, placement or the removal of products on or off the trays. Such PIRS will utilize a built-in camera, such as the camera 1910 illustrated in FIG. 19, which may be affixed to the bottom of each tray, the bottom of the AMP unit 1100, or in such other suitable place so as to be able to take images of the entirety of the items and/or compartments of a tray. In accordance with this PIRS system, the camera will produce photos of the tray below, showing the existing products on the tray. The PIRS will continuously analyze the photo images to determine the type and the quantity of the product items that exist on the tray. When changes occur, due to the removal or placement of product items, the system will report such changes to the LCS. If the information indicates that products have been removed, the LCS will add the products to the customer's virtual electronic shopping cart and apply charges. If the information indicates that the products have been added to the tray, the LCS will either credit the customer's shopping cart or update the inventory accordingly.

In addition to the PIRS requirements, the same camera, or a secondary camera, may be used to take photographic images and/or video in order to document the customer's hand movement while such customer removes or places items from or on the tray below. Such could be displayed on one of the electronic displays associated with the ASO, such as the AMP 1100 associated with that bay. Alternatively, or additionally, such video or photographic images may be saved at least temporarily in order to be able to confirm, if necessary, that a customer removed or replaced an item from the tray if a billing dispute were to arise.

With reference to FIGS. 2 and 3, a beverage dispenser 34 may be incorporated into an ASO. In many type of prior art retail settings, when a K-Cup® coffee cup or tea bags or the like are placed on open shelves, customers very often take more than one K-cup® or tea bag, even when they purchase only one drink. Such situations cause losses to the operator. In the present invention, the beverage component, such as the K-cup® or tea bag, are secured behind a locked door and each removal of a K-cup® or tea bag or the like generates a charge to the customer. Alternatively, computerized brewers or soft drink dispensers may be used. Such dispensers can be programmed to communicate with the LCS and notify the LCS of the type of drink purchased in order to charge the customer accordingly. Such brewers and soft drink dispensers can be used only by qualified customers that first become verified using the nearby scanner or door access unit.

The present invention contemplates that an ASO may be placed within hotel facilities, such as an ASO within a lobby of the hotel. In fact, a small ASO can be placed within each hotel room. The customer's room key may be used to check in and shop at the ASO, while the cost of each purchase is added to the customer's room charge. Upon checking in, the hotel guest may scan his or her room key and may enter his or her last name or answer other identification questions on the check-in screen. After qualifying, the hotel guest/customer may proceed to open the bay's door by using the room key, biometric method, PIN codes, or other identification methods. All transactions and cost will be reported in real time to the hotel accounting system in order to charge the guest's room account accordingly.

Figure 28:
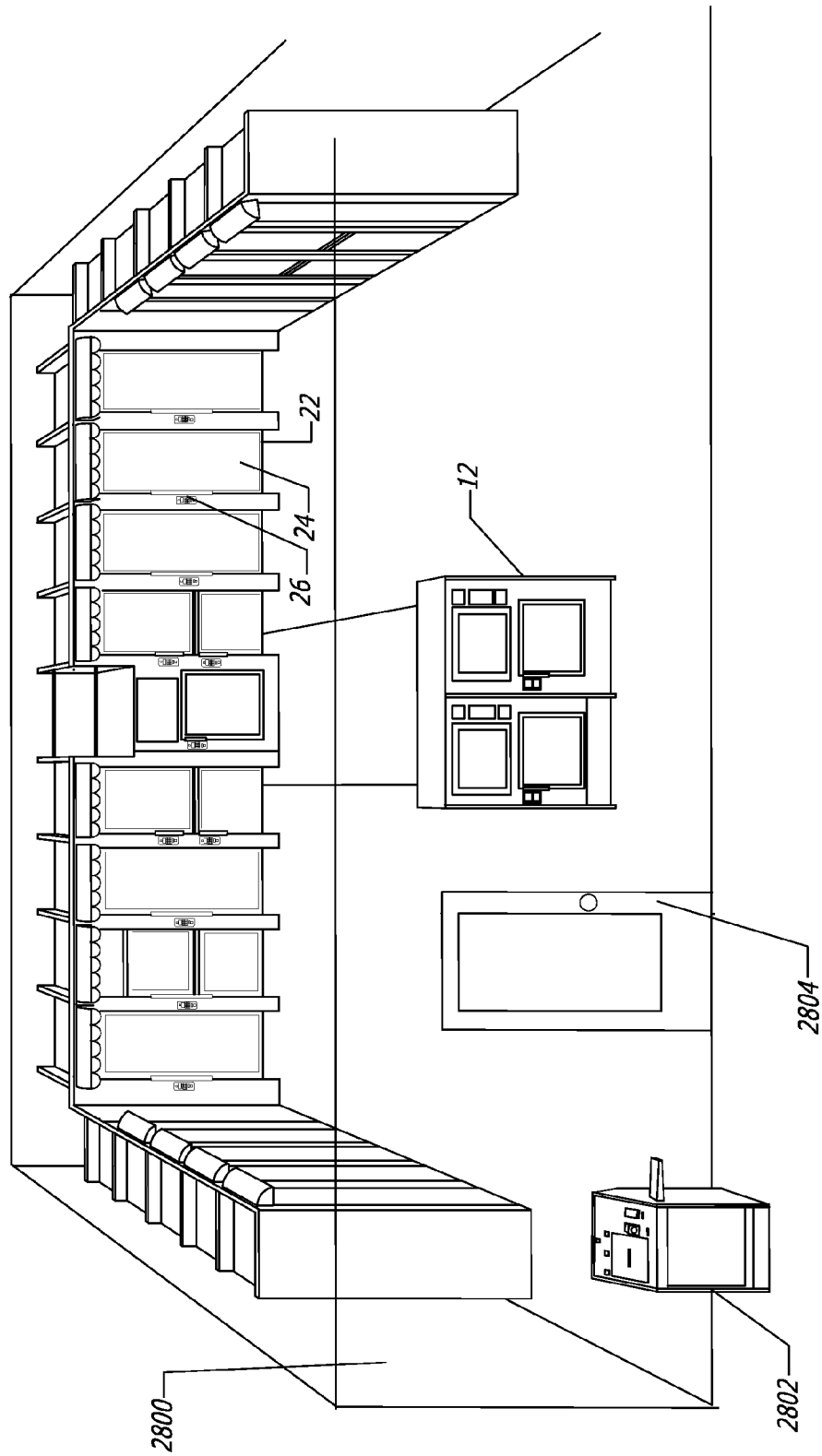
FIG. 28 is a perspective and diagrammatic view of a larger micro-market system incorporating multiple check-in stations and multiple modular bays, in accordance with the present invention.
Figure 29:
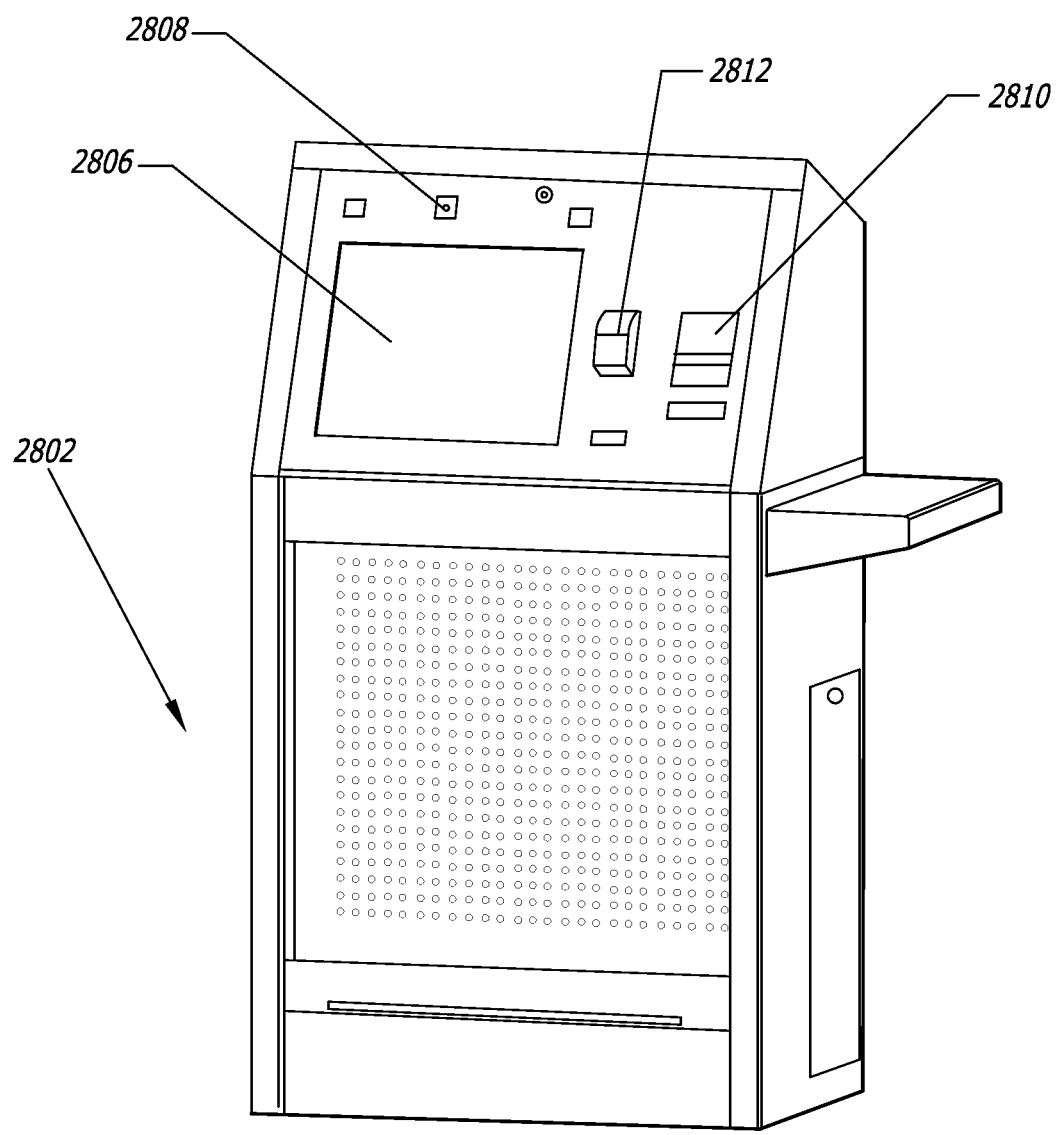
FIG. 29 is a front perspective view of a check-in station or stand alone kiosk used in accordance with the present invention.

With reference now to FIG. 28, it is contemplated by the present invention that the ASO be configured so as to create a variation of mini-market or convenience store 2800. This can allow companies to operate consumer outlets such as mini-markets, neighborhood markets and convenience stores or other general store-type outlets in an unattended and fully automated fashion. This can be, for example, in a strip mall, in a dedicated room of a building, a sufficiently large open area of a building, etc. Such a mini-market or convenience store 2800 may be fully enclosed, such as illustrated in FIG. 28, so as to be self-contained. One or more check-in stations or kiosks 2802 will be provided for customer identification and payment authorization and qualification. Such check-in station or kiosk 2802 may be located in a room in front of an automated door or turnstile, which leads to the shopping area of the mini-market. Alternatively, a door 2804 may be selectively unlocked after the customer is identified and qualified. Such entry is only allowed to customers that have first checked in and become qualified by the stand alone kiosk. After checking in, the customer may proceed to a secondary door or turnstile and scan his or her identify to gain entrance into the mini-market shopping area.

The mini-market shopping area, as illustrated in FIG. 28, comprises multiple bays 22 that operate the same as that described above. Multiple customers may shop within the mini-market, gain access to and remove items from bays 22 as desired, with the ASO system tracking the removal of each item from each bay by each customer who accesses that particular bay through the locked door 24. As only one customer can access a given bay 22 at any given time, multiple customers may shop simultaneously while an accurate record is kept of each customer's purchased items.

After finishing the shopping session or event, the customer may use an internal station 12, or scan again to open the door or turnstile 2804 in order to exit the shopping area. At that time, the customer may just walk away and the transaction will be completed within a predetermined length of time, or proceed to the stand alone kiosk, either within the mini-market 2800 or the kiosk 2802 outside the mini-market 2800 to close the transaction and redeem the remaining balance on that account, if so desired. When the customer uses notes and coins (cash) in order to become qualified to remove items from the bays 22 of the ASO within the mini-market 2800, the remaining balance can be redeemed and disbursed at one of the stand alone kiosks 12 or 2802 at that time. The internal stations 12 within the shopping area may allow the customer to communicate with customer service, add funds to their account, or use any of the additional services that are provided by the mini-market.

The stand alone computerized kiosk 2802 may be used not only as a check-in station to interface with the system, but also allow members as well as credit/debit card users and cash customers to shop in the ASO, pay bills, conduct money transfers, serve as an ATM, purchase event tickets and other suitable services.

Thus, in addition to ready-to-eat food and beverage business type locations with smaller ASOs, the invention can also be used to operate a self-checkout, automated neighborhood market or convenience store or any other type of store which offers off-the-shelf consumer goods. The invention and its method allows consumers to enter the store's facility using various identification systems, as described above, and conduct their shopping by using the invention's method, to open bays' doors inside the store and to remove products from the trays 28 therein. The system recognizes the customer who opens the door and removes the items, as well as identifying which items were removed and then charges the customer for the cost of the removed items accordingly.

Such automated establishments can be used twenty-four hours a day, seven days a week without the expense of employees being present and within a convenient, automated and easy-to-use self-checkout friendly environment. These types of automated checkout, automated minimarket or convenience stores can offer various types of consumer goods and be very desirable in residential neighborhoods, colleges, military bases, airports, office complexes, malls and any other areas that are open or generally accessible to the general public twenty-four hours a day. Accordingly, such needs for quick, unattended, automated checkout stores that can operate around the clock without the expenses of attending personnel are very desirable and can be fulfilled by this invention.

As far as security measures, one or more turnstiles may be provided to control customer access and exiting, or a locked door or the like in order to enter a large ASO mini-market or neighborhood store. The locked doors, turnstiles, etc. may be used to require the customers to scan their cards, provide other identification, etc. in order to enter and exit the ASO and in order to identify customers who removed items in values that exceed the initial balance on their card or account before beginning the shopping session.

Using the exterior kiosk 2802, or even an interior check-in station 12 or kiosk either in the mini-market arrangement or in connection with any ASO, or in connection with a website associated with the operation of such mini-market or ASO, the system allows transferring of funds from one card or account to another as well as allowing a person to load funds onto another individual's account or card. For example, parents can load funds to their child's accounts or employers can load funds to the cards of one or more employees so that the child or employees can purchase items through the ASO, mini-market, etc.

In addition to the above, the invention and its software provide an extensive inventory control program and replenishment/fulfillment program. This allows the operator of the ASO to have, in real time, a full reading of all products that are present in each one of the trays or shelves 28, and to generate a replenishment report in the form of a pick list for each ASO, as needed.

The universal tray and sensor arrangement, as illustrated in FIGS. 19 and 20, allows the system to automatically detect the removal of any item from the trays and automatically associates the product with the shopping cart of the customer that opened the bay's door. Additionally, such technique allows a local and remote reading of all trays in order to determine the existence of products and create a real time "on-the-shelf" inventory report. Upon request, or automatically on a prescheduled time, the system scans all trays and creates a fulfillment report and sends it to the operator as well as the operator's agents. Such reports include a list of all products that the operator is required to deliver to that location in order to restock the shelves and bring each product on the shelves to the programmed par level that must be kept to support the daily operation. Upon entering a restocking mode, the operator scans a barcode or other type of code generated by the system and printed on the pick list. After the system verifies the validity of the pick list, the system scans all trays within one or all bays and the system generates an inventory file, indicating the inventory of all items that currently exist in each compartment within the scanned area or throughout the ASO. At that time, all locks or the locks of a particular portion of the ASO are open for restocking. Upon resetting, the system provides a complete reading of all trays' compartments again and creates a file showing the changes before and after the restocking session. The file can be used to confirm that restocking was done accurately and the fulfillment was done according to the pick list that the system generated and sent to the operator. Also, such features allow the operator to manage the fulfillment process, including obtaining reports of the starting and ending time of the fulfillment/restocking, as well as other reports as needed. After resetting, the system changes back to standby or purchase mode.

The present invention allows dedicating one or more trays to a selected product supplier, in order to monitor all sales and analyze data of product items sold from such one or more trays. This data can automatically be sent to the supplier(s) for a marketing study and for the collection of rebate and/or fees from the suppliers. For example, the system can accumulate reports and data of all type of cola-type drinks that were sold between certain dates and send such reports to the operator or directly to a soft drink supplier in order to facilitate rebate programs or for other marketing use. Compartment trays may be fabricated in customized designs in order to promote sales of specific items during promotional periods.

The present invention is also able to utilize the information obtained from all of the customers' various product item purchases in order to track and analyze items which qualify for rebates to the operator or supplier of these products to the ASO. For example, a soft drink provider may provide a given amount of rebate, such as ten cents, for each can or bottle of soda of that manufacturer which is sold through the ASO. Such information can be collected and sent to the manufacturer for a rebate to the owner or operator of the ASO periodically.

The system of the present invention may also include a software program that collects and analyzes customers' purchase habits, including type of products, calorie levels, time of the day, and other categories which are analyzed based on the customers' gender, age and other characteristics. Such information may be used to enhance the product selection in the ASO and for other marketing use. Furthermore, the system can also use such data to provide bonuses, discounts, or bundled pricing to customers based on spending amount, type of products purchased, time of purchase and other criteria.

As part of the method of the present invention, the ASO and system may also be used in conjunction with a weight loss and health maintenance program which will be available to members of the ASO. Such program will provide members who enroll dietary tips and recommendations for consumption of certain food products and/or even suggested eating times. Throughout the day, the members will receive such notifications and recommendations, and the system of the present invention will maintain records of all intake calories, sugar, carbs, etc. Also, the system may have more extensive programs and food consumption formats than a system maintaining records for food consumption and exercise activity. Also, exercise activity, such as through a corresponding website. Also, the programs may have a dietary algorithm that analyses the data and provides data results and tips on the website. Customers may use such programs while visiting the ASO as well as online away from the ASO. Furthermore, the system may also issue reminders to encourage participants to come to the ASO for a meal or snack within certain predetermined hours, in order to keep a proper eating schedule. Such reminders may be sent via emails, texts, or via calls that play prerecorded messages.

Software is used to manage the entire operation of the ASO including all administration activity and reports. All activities are reported, via network connection, such as the Internet, to the main control network facility (MCNF) 36.

The system may also include a dashboard program which can summarize the activity of multiple ASOs and provide, in real time, a visual reporting dashboard format, showing the activities within multiple ASO locations. The dashboard may show the total revenue of the day, the number of specific type of products sold, the current number of specific products on the shelves, and real time sales and transactions as they occur.

Aside from being used as a store and shopping system, the system of the present invention could be used in any environment which requires maintaining records of individuals who remove items from shelves and the identification of the items removed. Such environments may be within schools, companies, laboratories, hospitals and pharmaceutical facilities, or within any other establishments or facilities, in order to track the removal of the inventory of parts and accessories, supplies or any other items. The system records the identification of each person that removed items from the bays and trays, including the date and time and maintains a full inventory of all products placed on or removed from the universal trays and provides full restocking reports as needed.

Although several embodiments have been described in detail for purposes of illustration, various modifications may be made without departing from the scope and spirit of the invention. Accordingly, the invention is not to be limited, except as by the appended claims.

What is claimed is:

1. A method for distributing items from a computer-controlled, automated store outlet, comprising the steps of:
providing a computer-controlled, automated store outlet machine having a plurality of bays under one computerized system which contain items removable from each bay for purchase by a customer in a purchase transaction, the automated store outlet machine further including at least one tray on at least one shelf disposed within each bay of the plurality of bays for holding the items, at least one sensor arranged within each tray for detecting removal of individual items from each bay, a bay door for each bay providing access for the customer to selectively and manually remove items contained in the at least one tray on the at least one shelf within the bay prior to purchase by the customer, an electronic door access unit associated with each bay door and including a display screen, and an activity monitoring panel included with each bay and having a display;
receiving customer identification from the customer into the door access unit associated with a particular bay of the plurality of bays of the automated store outlet;
unlocking the bay door of the particular bay associated with the door access unit after receiving the customer identification from the customer to provide the customer with physical access to the items contained within the particular bay prior to purchase by the customer;
detecting using the at least one sensor the manual removal by the customer of items from each tray within the particular bay, and identifying the removed items based on a database of information for each item in each tray within the particular bay;
adding each removed item to an electronic shopping cart for the customer in response to the detecting and identifying of each removed item using the at least one sensor;
displaying the electronic shopping cart to the customer, including an identification of each removed item and a purchase price for each removed item, on at least one of the display of the activity monitoring panel of the particular bay and the display screen of the door access unit associated with the bay door of the particular bay, prior to purchase of the removed items by the customer;
locking the bay door of the particular bay after the customer has completed removing items from the particular bay; and
closing the purchase transaction of the customer after the last bay door of the plurality of bays opened by the customer are closed and locked and after the customer closes the transaction manually or after a predetermined period of inactivity by the customer by charging the customer for the items removed from the plurality of bays by the customer.

2. The method of claim 1, including the step of receiving payment information from the customer into the electronic door access unit including at least one of information relating to a previously created customer automated store dedicated account, biometric information, credit card or debit card account information, or cash deposited by the customer into a cash receiving device at the automated store outlet.

3. The method of claim 2, including the step of qualifying the customer to remove items from the particular bay after determining that the customer payment information is of a sufficient level to purchase items from the particular bay.

4. The method of claim 1, wherein the receiving customer identification step includes the step of receiving at the door access unit at least one of a customer identification code and/or password, an electronically readable card or electronic device, or biometric information of the customer.

5. The method of claim 1, wherein the at least one sensor comprises a light sensor disposed on each tray that is exposed to light when the item is removed from the tray of the particular bay.

6. The method of claim 1, including the steps of detecting using the at least one sensor the return of one or more items by the customer to the at least one tray disposed within the particular bay prior to purchase of any removed items by the customer, and removing each returned item from the electronic shopping cart of the customer in response to the detecting of each returned item.

7. The method of claim 1, including the step of relaying customer purchase data from the automated store outlet to a central control center.

8. The method of claim 1, including the step of providing live customer service assistance to a customer through a speaker and/or display of the automated store outlet.

9. The method of claim 1, including the step of monitoring the automated store outlet with surveillance devices.

10. The method of claim 1, wherein the detecting the removal of the item from the bay step comprises the steps of associating an RFID tag with each item in the bay, and utilizing a corresponding RFID detector to detect the movement of the item from the bay.

11. The method of claim 1, wherein the at least one tray disposed within each bay includes divided tray compartments, each compartment having associated therewith a single item and a single sensor associated with an item placed in the tray compartment.

12. The method of claim 1, wherein the detecting step comprises detecting at the at least one sensor, in response to removal of the item, light pulsed from a pulsating light source disposed on a tray.

13. The method of claim 1, including the step of molding a plurality of compartments into a sheet of material comprising each tray of each bay.

14. The method of claim 1, wherein each tray within each bay is opaque and includes a plurality of compartments for holding items, each compartment having at least one of a transparent area or aperture in general alignment with a photosensor of the compartment such that the photosensor is exposed to light when an item is removed from the compartment.

15. The method of claim 1, wherein the receiving customer identification step includes the step of receiving into the door access unit at least one of a password or QR code obtained and displayed on a mobile electronic device of the customer.

16. The method of claim 15, including the step of transmitting and displaying the electronic shopping cart of the customer on the mobile electronic device of the customer in real-time while the customer is using the automated store outlet.

17. The method of claim 1, including the step of preventing a customer from opening the bay door when a temperature within the bay has exceeded a predetermined temperature.

18. The method of claim 1, including the steps of electronically detecting the presence and identity of all items within a bay, and creating a sales report, a picklist, and an inventory report.

19. The method of claim 1, including the step of tracking and analyzing purchase history of items supplied by a predetermined supplier from the at least one tray and conveying the purchase history to the supplier.

20. The method of claim 1, including the step of collecting supplier product rebate data corresponding to items purchased from the bays of the automated store outlet.

21. The method of claim 1, including the step of detecting whether the bay door of each of the bays is at least one of open or closed.

22. The method of claim 1, including the step of restocking one or more bays of the automated store outlet, and tracking restocking activity, including at least one of accuracy of restocking in comparison to an item pick list and time to start and complete restocking.

23. The method of claim 1, including the step of tracking food item purchases in conjunction with a health maintenance program of the customer.

24. The method of claim 23, including the step of transmitting electronic messages to the customer on the health maintenance program regarding at least one of eating time intervals, calorie count, or suggested food item purchases.

25. The method of claim 1, wherein the detecting step includes the steps of taking images of the items using one or more cameras of the automated store outlet, and analyzing the images to determine if changes have occurred due to removal and return of the items by the customer.

26. The method of claim 1, including the step of identifying or confirming accuracy of the purchase transaction by receiving a machine readable code on the removed item into a scanner of the automated store outlet.

27. The method of claim 1, including the step of configuring tray and item placement in each bay from a remote location.

28. The method of claim 1, wherein the receiving customer identification step comprises receiving customer credit card or debit card data into a device associated with the bay door of the particular bay.

29. The method of claim 1, including at least one of receiving deposited money from the customer into a unit of the automated store outlet to replenish the customer account or receiving at least one of a code, password, biometric information or machine readable code or card to be used at the door access unit to gain access to the bays of the automated store outlet.

30. The method of claim 29, including the step of returning unspent money to the customer as part of closing the purchase transaction.

31. The method of claim 1, including the steps of providing at least one of a beverage cup or a component of a beverage within the particular bay for purchase, and providing a beverage dispenser for at least one of dispensing the beverage into the beverage cup or creating the beverage using the beverage component.

32. The method of claim 31, wherein the operation of the beverage dispenser is selectively permitted by the automated store outlet.

33. The method of claim 1, wherein the receiving customer identification step includes the step of receiving into the door access unit an electronic code associated with an electronic component worn by the customer.

34. The method of claim 1, wherein the closing purchase transaction step is performed once as a single transaction for all items removed from all bays by the customer during a shopping event.

35. The method of claim 1, wherein the detecting step includes detecting at the at least one sensor, in response to removal of items and based on a predetermined detection threshold, light from an infrared light source disposed on a tray above or beside the items, reading data from a photosensor in the automated store outlet constantly exposed to ambient light, and adjusting the predetermined detection threshold based on readings from the photosensor.

36. The method of claim 1, wherein the receiving customer identification step includes receiving into the door access unit at least one of a code, a fingerprint, biometric information a card, a QR image, an RFID card, and/or an NFC signal from another electronic device to gain access to each bay through the bay door.

37. The method of claim 1, including the steps of detecting using the at least one sensor the identity of each item removed from each bay by a plurality of customers simultaneously accessing individual bays of the plurality of bays of the automated store outlet, the plurality of customers at most equal to the number of the plurality of bays, adding the removed items to an electronic shopping cart for each customer, and charging each customer respectively for the items in the electronic shopping cart for each customer when the purchase transaction is closed for that customer.

38. The method of claim 1, including the step of providing within the at least one tray of each bay a plurality of rails forming compartments divided therebetween each holding a row of slidable items, a spring-biased pusher for moving the items held in the compartments forward toward the customer as each item is removed by the customer, and a plurality of sensors arranged within the at least one tray for tracking the removal of each item in each row of items, wherein each sensor is activated as each item is removed from the row of items and pushed forward towards the customer.

39. The method of claim 1, wherein the at least one sensor positioned within each tray comprises an infrared photosensor that is exposed to infrared light when an item is removed from a compartment associated with the infrared photosensor, and wherein the infrared light is emitted from an infrared light source positioned across the sensor.

40. The method of claim 1, wherein the automated store outlet is in electronic communication with a remote central control center.

41. The method of claim 40, including the step of utilizing the central control center to at least one of download software, firmware and planogram updates to the automated store outlet, verify customer identification, process customer payments, and/or generate sales and other activity reports.

42. A method for distributing items from a computer-controlled, automated store outlet machine, comprising the steps of:

provided a computer-controlled, automated store outlet having a plurality of bays containing items removable from each bay for purchase by a customer in a purchase transaction, the automated store outlet further including at least one tray on at least one shelf disposed within each bay of the plurality of bays for holding the items, a plurality of sensors arranged within each tray for detecting removal of individual items from each bay, a bay door for each bay providing physical access for the customer to manually remove selected items contained within each bay prior to purchase by the customer, a door access unit associated with each bay door, and an activity monitoring panel included with each bay and having a display;

receiving customer identification from the customer into the door access unit associated with a first bay of the plurality of bays of the automated store outlet;

unlocking the bay door of the first bay associated with the door access unit after receiving the customer identification from the customer to provide access to the items contained within the first bay to the customer prior to purchase by the customer;

detecting using a first sensor of the plurality of sensors the manual removal by the customer of items from the at least one tray within the first bay, and identifying removed items based on a database of information for each item in each tray within the first bay;

adding each removed item to an electronic shopping cart for the customer in response to the detecting and identifying of each removed item using the first sensor;

displaying the electronic shopping cart to the customer, including an identification of each removed item and a purchase price for each removed item, on the display of the activity monitoring panel of the first bay, prior to purchase of the removed items by the customer;

locking the bay door of the first bay after the customer has completed removing items from the first bay;

receiving customer identification from the customer into a second door access unit associated with the bay door of a second bay of the plurality of bays, wherein the second bay is different from the first bay;

unlocking the bay door of the second bay to provide access to the items contained within the second bay to the customer for the same purchase transaction prior to purchase by the customer;

detecting using a second sensor of the plurality of sensors the manual removal by the customer of items from at least one tray within the second bay, identifying removed items based on the database of information for each item in each tray within the second bay, and adding each removed item to the electronic shopping cart of the customer in response to the detecting and identifying of each removed item using the second sensor such that the electronic shopping cart travels to the second bay and includes removed items from both the first bay and the second bay;

displaying the electronic shopping cart to the customer on a display of the activity monitoring panel of the second bay, including identification and purchase prices for removed items from both the first bay and the second bay, prior to purchase of the removed items by the customer;

locking the bay door of the second bay after the customer has completed removing items from the second bay; and closing the purchase transaction of the customer after the bay door of the first bay and of the second bay are locked after the customer closes the transaction manually or after a predetermine period of inactivity by charging the customer for the items removed from the plurality of bays by the customer and displayed in the electronic shopping cart of the customer.

43. A method for distributing items from a computer-controlled, automated store outlet machine, comprising the steps of:

providing a computer-controlled, automated store outlet machine having a plurality of bays containing items removable from each bay for simultaneous purchase by a first customer in a first purchase transaction and a second customer in a second purchase transaction, the automated store outlet further including at least one tray on at least one shelf disposed within each bay of the plurality of bays for holding the items, a plurality of sensors arranged within each tray for detecting removal of individual items from each bay, a bay door for each bay providing access for the first and second customer to selectively remove the items contained within each bay prior to purchase by the first and second customers, a door access unit associated with each bay door, and an activity monitoring panel included with each bay and having a display, the computer-controlled, automated store outlet machine allowing multiple customers at most equal to the number of bays to simultaneously shop from the bays in the automated store outlet and charging each customer respectively;

receiving customer identification from the first customer into the door access unit associated with a first bay of the plurality of bays of the automated store outlet;

unlocking the bay door of the first bay associated with the door access unit after receiving the customer identification from the first customer to provide access to the items contained within the first bay to the first customer prior to purchase by the first customer;

detecting using a first sensor of the plurality of sensors the manual removal by the first customer of items from the at least one tray within the first bay, and identifying removed items based on a database of information for each item in each tray within the first bay;

adding each removed item to an electronic shopping cart for the first customer in response to the detecting and identifying of each removed item using the first sensor;

displaying the electronic shopping cart to the first customer, including an identification of each removed item and a purchase price for each removed item, on at least one of the display screen of the door access unit and the display of the activity monitoring panel of the first bay, prior to purchase of the removed items by the first customer;

locking the bay door of the first bay after the first customer has completed removing items from the first bay;

closing the first purchase transaction of the first customer after the last bay door opened by the first customer is locked by charging the first customer for the items removed from the plurality of bays by the first customer and displayed in the electronic shopping cart of the first customer after the first customer closes the transaction manually or after a predetermined period of inactivity by the first customer;

concurrently with the first purchase transaction, receiving second customer identification from the second customer into a second door access unit, the second door access unit being associated with the bay door of a second bay of the plurality of bays, wherein the second bay is different from the first bay;

unlocking the bay door of the second bay to provide access to the items contained within the second bay to the second customer simultaneously to when the first bay is being accessed by the first customer;

detecting using a second sensor of the at least one sensor the manual removal by the second customer of items from each tray within the second bay, identifying removed items based on the database of information for each item in each tray within the second bay, and adding each removed item to a second electronic shopping cart for the second customer in response to the detecting and identifying of each removed item using the second sensor; and closing the second purchase transaction after the last bay door opened by the second customer is locked by charging the second customer for the items in the second electronic shopping cart after the second customer closes the transaction manually or after a predetermined period of inactivity by the second customer.

44. A method for distributing items from a computer-controlled, automated store outlet machine, comprising the steps of:

providing a computer-controlled, automated store outlet having a plurality of bays containing items removable from each bay for purchase by a customer in a purchase transaction, the automated store outlet further including at least one tray disposed within each bay of the plurality of bays for holding the items, a bay door for each bay providing access for the customer to selectively and manually remove items contained within the bay prior to purchase by the customer, an electronic door access unit associated with each bay door and including a display screen, and an activity monitoring panel included with each bay and having a display;

receiving customer identification from the customer into the door access unit associated with a particular bay of the plurality of bays of the automated store outlet;

unlocking the bay door of the particular bay associated with the door access unit after receiving the customer identification from the customer to provide the customer with physical access to the items contained within the particular bay prior to purchase by the customer;

receiving a machine readable code on each item manually removed by the customer from the particular bay into a scanner of the automated store outlet, and identifying the removed items based on a database of information for each item;

adding each removed item to an electronic shopping cart for the customer in response to the identifying of each removed item using the scanner;

displaying the electronic shopping cart to the customer, including an identification of each removed item and a purchase price for each removed item, on at least one of the display of the activity monitoring panel of the particular bay and the display screen of the door access unit associated with the bay door of the particular bay, prior to purchase of the removed items by the customer;

locking the bay door of the particular bay after the customer has completed removing items from the particular bay; and closing the purchase transaction of the customer after the last bay door of the plurality of bays opened by the customer is closed and locked and after the customer closes the transaction manually or after a predetermined period of inactivity by the customer by charging the customer for the items removed from the plurality of bays by the customer.

* * * * *